United States Patent
Amino et al.

(10) Patent No.: US 12,159,556 B2
(45) Date of Patent: Dec. 3, 2024

(54) PEELING DETECTION LABEL

(71) Applicant: LINTEC CORPORATION, Itabashi-ku (JP)

(72) Inventors: Yumiko Amino, Funabashi (JP); Naoki Taya, Saitama (JP)

(73) Assignee: LINTEC CORPORATION, Itabashi-ku (JP)

(*) Notice: Subject to any disclaimer, the term of this patent is extended or adjusted under 35 U.S.C. 154(b) by 582 days.

(21) Appl. No.: 17/442,752

(22) PCT Filed: Mar. 19, 2020

(86) PCT No.: PCT/JP2020/012252
§ 371 (c)(1),
(2) Date: Sep. 24, 2021

(87) PCT Pub. No.: WO2020/203344
PCT Pub. Date: Oct. 8, 2020

(65) Prior Publication Data
US 2022/0180773 A1   Jun. 9, 2022

(30) Foreign Application Priority Data
Mar. 29, 2019   (JP) .................. 2019-067373

(51) Int. Cl.
*G09F 3/00* (2006.01)
*C09J 7/24* (2018.01)
(Continued)

(52) U.S. Cl.
CPC ............ *G09F 3/0292* (2013.01); *C09J 7/243* (2018.01); *C09J 7/385* (2018.01); *G09F 3/0341* (2013.01);
(Continued)

(58) Field of Classification Search
CPC ........ C09J 7/29; C09J 7/385; C09J 2203/338; C09J 2301/122; C09J 2433/006;
(Continued)

(56) References Cited

U.S. PATENT DOCUMENTS 11,479,695 B2 * 10/2022 Amino ................. B32B 27/34
2016/0288968 A1   10/2016 Wang
(Continued)

FOREIGN PATENT DOCUMENTS

CN   101248150 A   8/2008
EP   1 231 150 A1   8/2002
(Continued)

OTHER PUBLICATIONS

Machine Translation of JP 2004-170776A (Year: 2004).*
(Continued)

*Primary Examiner* — Patricia L. Nordmeyer
(74) *Attorney, Agent, or Firm* — Oblon, McClelland, Maier & Neustadt, L.L.P.

(57) ABSTRACT

The present invention relates to a peel detection label that is a laminate having a backing, a pattern layer formed on a part of a surface of the backing, and a pressure sensitive adhesive laminate in this order, the pressure sensitive adhesive laminate having at least an intermediate layer and a pressure sensitive adhesive layer, wherein a tensile modulus Et at 23° C. of the backing is 50 MPa or greater and 1000 MPa or less.

20 Claims, 2 Drawing Sheets

(51) Int. Cl.
  *C09J 7/38* (2018.01)
  *G09F 3/02* (2006.01)
  *G09F 3/03* (2006.01)
  *G09F 3/10* (2006.01)

(52) U.S. Cl.
  CPC .......... *G09F 3/10* (2013.01); *G09F 2003/023* (2013.01); *G09F 2003/0255* (2013.01); *G09F 2003/0257* (2013.01); *G09F 2003/0272* (2013.01); *G09F 2003/0276* (2013.01)

(58) Field of Classification Search
  CPC .............. C09J 2475/006; C09J 2433/00; C09J 2467/00; C09J 2467/006; C09J 2475/00; B32B 7/022; B32B 7/12; B32B 27/08; B32B 27/308; B32B 27/32; B32B 27/36; B32B 27/10; B32B 2307/51; B32B 2307/54; B32B 7/06; B32B 2255/205; B32B 2264/102; B32B 2264/108; B32B 2307/4026; B32B 27/18; B32B 27/22; B32B 2270/00; B32B 2307/408; B32B 2307/41; B32B 2307/412; B32B 2307/538; B32B 2307/75; B32B 2519/00; B32B 23/08; B32B 27/28; B32B 27/281; B32B 27/285; B32B 27/286; B32B 27/288; B32B 27/302; B32B 2307/732; B32B 3/28; B32B 27/304; B32B 27/306; B32B 27/325; B32B 27/34; B32B 27/365; B32B 27/40; B32B 2255/10; B32B 2255/26; B32B 2307/748
  See application file for complete search history.

(56) References Cited

U.S. PATENT DOCUMENTS

| 2017/0140676 A1 | 5/2017 | Iwasawa et al. |
| 2017/0283660 A1 | 10/2017 | Tanaka |
| 2018/0022965 A1 | 1/2018 | Igarashi et al. |
| 2019/0077996 A1 | 3/2019 | Wang |

FOREIGN PATENT DOCUMENTS

| EP | 2280047 A1 * | 2/2011 | ............ C08F 212/08 |
| JP | 2001-301106 A | 10/2001 | |
| JP | 2003-345255 A | 12/2003 | |
| JP | 2004-2825 | 1/2004 | |
| JP | 2004170776 A * | 6/2004 | |
| JP | 2004-285243 A | 10/2004 | |
| JP | 3141346 U | 4/2008 | |
| JP | 2010-281948 A | 12/2010 | |
| JP | 2017-179241 A | 10/2017 | |
| JP | 2018-104499 A | 7/2018 | |
| WO | WO 2019/039306 A1 | 2/2019 | |

OTHER PUBLICATIONS

Combined Chinese Office Action and Search Report issued Oct. 19, 2022, in corresponding Chinese Patent Application No. 202080024640.X (with English Translation of Category of Cited Documents), 10 pages.

Japanese Office Action issued Dec. 19, 2023 in Japanese Patent Application No. 2021-511443 (with unedited computer-generated English translation), 14 pages.

Extended European Search Report issued Nov. 11, 2022 in European Patent Application No. 20784650.2, 8 pages.

International Search Report issued on Jun. 23, 2020 in PCT/JP2020/012252 filed Mar. 19, 2020, 3 pages.

* cited by examiner

PEELING DETECTION LABEL

CROSS-REFERENCE TO RELATED APPLICATIONS

The present application is the national stage of international application PCT/JP2020/012252, filed on Mar. 19, 2020, and claims the benefit of the filing date of Japanese Appl. No. 2019-067373, filed on Mar. 29, 2019.

TECHNICAL FIELD

The present invention relates to a peel detection label.

BACKGROUND ART

Packages, for example, of pharmaceutical products or food products are required to have high security for safety, and tampering prevention labels are used to check whether packages have been opened once. In addition, tampering prevention labels are also used to prevent unauthorized opening of filling containers of hazardous materials, such as chemical vials and fuel tanks; sealed letters; decorated boxes; and the like; as well as to prevent unauthorized use of identification photographs of identification cards, such as passports.

Furthermore, tampering prevention labels are used also for labels attached to expensive electronic devices, precision mechanical parts, and the like for the purpose of preventing tampering with labeled contents, use for imitation means by peeling a label of a genuine product and attaching the label to another product, or the like.

For example, Patent Document 1 discloses a tampering prevention label or sheet characterized by being composed of a polystyrene film having a thickness of 10 µm or greater and 40 µm or less and a heat resistant pressure sensitive adhesive layer laminated on one surface of the polystyrene film, the heat resistant pressure sensitive adhesive layer having a pressure sensitive adhesion strength specified in JIS Z0237 of 15 N/25 mm or greater at 80° C.

In addition, for example, Patent Document 2 discloses a tampering prevention label characterized by having a printed sheet and a filler sheet, the printed sheet formed by printing a release layer having releasability on a back surface of a transparent film in a predetermined pattern and forming a printed layer so as to cover the back surface of the transparent film and the back surface of the release layer, the filler sheet formed by forming a pressure sensitive adhesive layer on a front surface and a back surface of a filler layer having a property of irreversibly elastically changing, in which the printed sheet and the filler sheet are integrally composed by pressure sensitive adhesion strength of the pressure sensitive adhesive layer on the surface of the filler sheet.

CITATION LIST

Patent Literature

Patent Document 1: JP 2010-281948 A
Patent Document 2: JU 3141346

SUMMARY OF INVENTION

Technical Problem

In the tampering prevention label or sheet described in Patent Document 1, an attempt to peel the polystyrene film results in breaking the polystyrene film, and this exhibits a tampering prevention function. However, a part of a broken substrate layer or the pressure sensitive adhesive layer of such a peel detection label remains on an adherend and contaminates the adherend, which has been a problem with such a peel detection label known in the art.

In addition, Patent Document 2 discloses that the tamper prevention label described in Patent Document 2 is a label enabling peeling to be distinguished without leaving the pressure sensitive adhesive on the adherend, but no mention is made about pattern expressibility when the label is peeled at a low speed.

The label is assumed to be peeled at a lower speed when peeled for the purpose of tampering or the like. Thus, from the viewpoint of tampering prevention function, a peel detection label enabling clear detection of presence or absence of peeling also when the label is peeled at a lower speed is desired.

The present invention has been made in view of the circumstances described above, and an object of the present invention is to provide a peel detection label causing no adhesive residue to an adherend and further exhibiting excellent pattern expressibility also when the peel detection label is peeled at a low speed.

Solution to Problem

The present inventors have found that the above problems can be solved by providing a peel detection label that is a laminate having a backing with a specific tensile modulus, a pattern layer formed on a part of a surface of the backing, and a pressure sensitive adhesive laminate in this order, the pressure sensitive adhesive laminate having at least an intermediate layer (C) and a pressure sensitive adhesive layer (Z).

That is, the present invention relates to [1] to [12] below.

[1] A peel detection label that is a laminate having a backing, a pattern layer formed on a part of a surface of the backing, and a pressure sensitive adhesive laminate in this order, the pressure sensitive adhesive laminate having at least an intermediate layer (C) and a pressure sensitive adhesive layer (Z), wherein a tensile modulus Et at 23° C. of the backing is 50 MPa or greater and 1000 MPa or less.

[2] The peel detection label according to [1] described above, further satisfying Requirement (1) below:
Requirement (1): when the pressure sensitive adhesive layer (Z) of the peel detection label is attached to an adherend and then the peel detection label is peeled from the adherend, interfacial detachment occurs between the backing and the pattern layer, whereby presence or absence of peeling of the peel detection label from the adherend becomes visually detectable.

[3] The peel detection label according to [1] or [2] described above, wherein the backing is a polyethylene-based resin film, a polypropylene-based resin film, an ethylene-vinyl acetate copolymer-based resin film, or an ethylene-(meth)acrylic acid copolymer-based resin film.

[4] The peel detection label according to any of [1] to [3] described above, wherein a bending resistance of the backing is 50 mN or greater and 250 mN or less.

[5] The peel detection label according to any of [1] to [4] described above, wherein a thickness of the backing is 1 µm or greater and 200 µm or less.

[6] The peel detection label according to any of [1] to [5] described above, wherein a surface of the backing, the surface being on a side of the pattern layer formed thereon, is a satin-finished surface.

[7] The peel detection label according to any of [1] to [6] described above, wherein the surface of the backing, the surface being on the side of the pattern layer formed thereon, and a surface of the pattern layer, the surface being on a side of the intermediate layer (C) formed thereon, are surface-modified surfaces using an oxidation method.

[8] The peel detection label according to any of [1] to [7] described above, wherein the intermediate layer (C) includes at least a cover layer (X) and a substrate layer (Y), wherein the substrate layer (Y) has a surface in contact with the pressure sensitive adhesive layer (Z).

[9] The peel detection label according to [8] described above, wherein the cover layer (X) is a laminate (L2) having at least a first layer (X1) and a second layer (X2), wherein the first layer (X1) is a layer in contact with the surface of the backing and the pattern layer, and the second layer (X2) is a layer in contact with the substrate layer (Y).

[10] The peel detection label according to [8] or [9] described above, wherein the cover layer (X) has at least a pressure sensitive adhesive layer (XA).

[11] The peel detection label according to any of [8] to [10] described above, wherein a tensile storage elastic modulus E' at 23° C. of the substrate layer (Y) is 10 MPa or greater and 800 MPa or less.

[12] The peel detection label according to any of [8] to [11] described above, wherein the substrate layer (Y) is a layer formed from a composition (y) containing one or more types of non-pressure sensitive adhesive resins (y1) selected from the group consisting of acrylic urethane-based resins and olefin-based resins.

Advantageous Effects of Invention

The present invention can provide a peel detection label causing no adhesive residue to an adherend and further exhibiting excellent pattern expressibility also when the peel detection label is peeled at a low speed.

DESCRIPTION OF EMBODIMENTS

Figure 1:
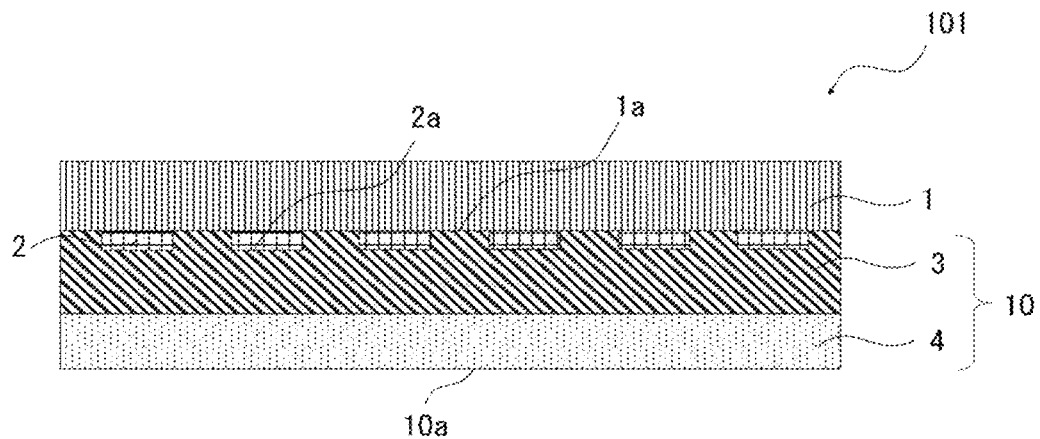
FIG. 1 is a cross-sectional schematic view of a peel detection label 101 illustrating an example of a configuration of the peel detection label of the present invention.

In the present invention, the judgement on whether a target resin belongs to a "pressure sensitive adhesive resin" or a "non-pressure sensitive adhesive resin" is made based on the following procedures (1) to (4).

Procedure (1): A resin layer having a thickness of 20 μm formed only of a target resin is provided on a poly (ethylene terephthalate) (PET) film having a thickness of 50 μm, and a test piece cut into a size of 300 mm in length×25 mm in width is produced.

Procedure (2): The surface of the test piece, the surface on the side of the resin layer exposed thereon, is attached to a stainless steel plate (SUS304, polished with #360) in an environment of 23° C. and 50% RH (relative humidity), and this is allowed to stand in the same environment for 24 hours.

Procedure (3): After allowed to stand, the test peace is measured for pressure sensitive adhesion strength in an environment of 23° C. and 50% RH (relative humidity) by the 180° peel method based on JIS Z0237: 2000 at a tensile speed of 300 mm/min.

Procedure (4): When the measured pressure sensitive adhesion strength is 0.1 N/25 mm or greater, the target resin is judged as a "pressure sensitive adhesive resin". On the other hand, when the measured pressure sensitive adhesion strength is less than 0.1 N/25 mm, the target resin is judged as a "non-pressure sensitive adhesive resin".

In the present invention, an "active component" refers to a component excluding a diluent solvent from components contained in a target composition.

In addition, in the present invention, a wording "peeling of a peel detection label" means peeling from an adherend. For example, for a peel detection label having a release material on an attachment surface of a pressure sensitive adhesive layer (Z) of a peel detection label, the wording does not mean a peeling operation when the peel detection label is peeled from the release material. That is, for the peel detection label having a release material, the release material is removed, then the peel detection label is attached to an adherend, and the above wording means a peeling operation when such a peel detection label after attached to the adherend is peeled from the adherend.

Furthermore, in the present invention, the "adherend" described in Requirement (1) means an adherend used in evaluating one characteristic of the peel detection label, that is, whether the peel detection label satisfies Requirement (1), and is described merely to explain the evaluation method. This means that the "adherend" is similar to, for example, those expressing an object to which any label used to measure the pressure sensitive adhesion strength is attached in evaluating the "pressure sensitive adhesion strength" of the label, or a glass plate for preparing a specimen used in observing any substance with a digital microscope. Thus, the "adherend" described in Requirement (1) is not a part (member) constituting the peel detection label of the present invention. In addition, this is not a provision intended that an adherend to which the peel detection label of the present invention is to be attached is limited to a specific adherend.

Furthermore, in the present invention, "visually detectable" means that a change of the peel detection label before and after peeling can be recognized by human eyes.

In the present invention, for example, "(meth)acrylic acid" refers to both "acrylic acid" and "methacrylic acid", "(meth)acrylate" refers to both "acrylate" and "methacrylate", and the same is true for other similar terms.

In addition, the mass average molecular weight (Mw) is a value measured by gel permeation chromatography (GPC) method in terms of standard polystyrene, and specifically is a value measured based on the method described in Examples.

Furthermore, lower limits and upper limits described in series for a preferred numerical range (e.g., a range of content, etc.) can each be combined independently. For example, from the description "preferably from 10 to 90, more preferably from 30 to 60", the "preferred lower limit (10)" and the "preferred upper limit (60)" can be combined as "from 10 to 60". Similarly, for example, from the description "preferably 10 or greater, more preferably 30 or greater, and preferably 90 or less, and more preferably 60 or less", "10 or greater and 60 or less" can be selected as a preferred range, and merely a range "60 or less" can also be selected. In the present specification, when a numerical range, such as a range of content, is expressed by linking numerical values with "form" and "to", the description "from X to Y" means "X or greater and Y or less".

Peel Detection Label

A peel detection label of the present invention is a laminate having a backing, a pattern layer formed on a part of a surface of the backing, and a pressure sensitive adhesive laminate in this order, the pressure sensitive adhesive laminate having at least an intermediate layer (C) and a pressure sensitive adhesive layer (Z), in which a tensile modulus Et at 23° C. of the backing is 50 MPa or greater and 1000 MPa or less.

With the peel detection label satisfying the above layer configuration and further with the tensile modulus Et of the backing satisfying the above requirement, the peel detection label causes no adhesive residue to an adherend and exhibits excellent peel detection performance also when the label is peeled at a lower speed.

Preferred examples of the peel detection label according to embodiments of the present invention will be described below using FIGS. 1 to 4, but the peel detection label of the present invention is not limited to the following examples as long as the effects of the present invention are achieved.

FIG. 1 is a cross-sectional schematic view of a peel detection label 101 illustrating an example of a configuration of the peel detection label of the present invention.

Examples of the peel detection label illustrated as an embodiment of the present invention include a peel detection label including a backing 1, a pattern layer 2, and a pressure sensitive adhesive laminate 10 laminated in this order like the peel detection label 101 illustrated in FIG. 1. The pressure sensitive adhesive laminate 10 illustrated in FIG. 1 is formed by laminating an intermediate layer (C) (hereinafter also referred to as a "layer (C)") 3 and a pressure sensitive adhesive layer (Z) (hereinafter also referred to as a "layer (Z)") 4 in this order from the pattern layer 2 side.

In such an embodiment as the peel detection label 101 illustrated in FIG. 1, the peel detection label may be an embodiment in which the layer (C) 3 is in contact with a surface 1a of the backing 1, the surface 1a on a side of the pattern layer 2 formed thereon, and with the pattern layer 2; preferably an embodiment in which the layer (C) 3 is in contact with the surface 1a of the backing 1, the surface 1a on the side of the pattern layer 2 formed thereon, and with a surface 2a of the pattern layer 2, the surface 2a on the opposite side from the backing 1 side; more preferably an embodiment in which the layer (C) 3 is in contact with the surface 1a of the backing 1, the surface 1a on the side of the pattern layer 2 formed thereon, and covers all surfaces of the pattern layer 2 other than the surface in contact with the surface 1a of the backing 1 as in the peel detection label 101 illustrated in FIG. 1; and even more preferably, the layer (C) 3 and the layer (Z) 4 are directly laminated in this order in the pressure sensitive adhesive laminate 10.

Here, "directly laminated" described above refers to, for example, in the peel detection label 101 illustrated in FIG. 1, a configuration in which two layers are in direct contact without having another layer between the layer (C) 3 and the layer (Z) 4.

As described below, in the peel detection label of an embodiment of the present invention, when the peel detection label is peeled from an adherend, tensile stress acts on the backing and the intermediate layer (C), and the pattern layer and its adjacent layer (preferably the backing) detach at their interface, whereby the peeling of the peel detection label becomes detectable. In addition, the peel detection label is a peel detection label causing no adhesive residue to an adherend.

Thus, the intermediate layer (C) is a layer that can conform to the backing without causing detachment at the interface between the layer (C) and the backing at the time when the pattern layer and its adjacent layer (preferably the backing) detach at their interface when the peel detection label is peeled from an adherend, and at the same time, has a role of preventing adhesive residue to the adherend by detaching the layer (Z) from the adherend while holding the layer (Z) without causing detachment also at the interface between the layer (C) and the layer (Z).

Figure 2:
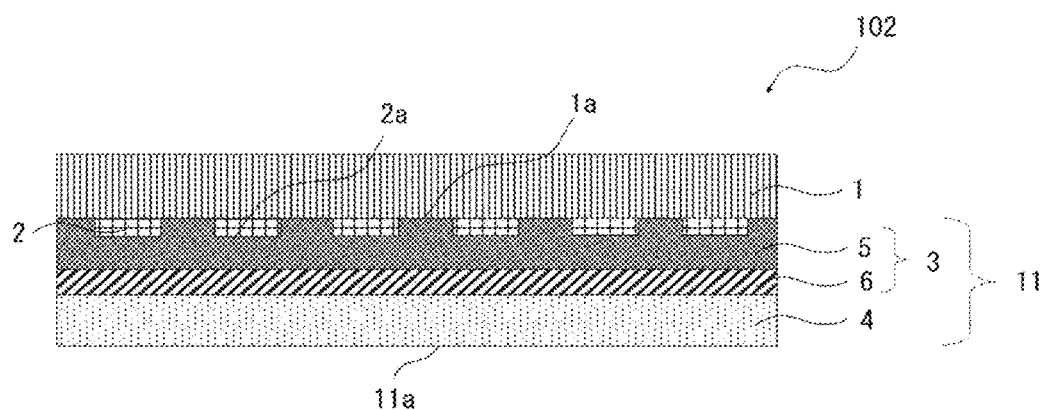
FIG. 2 is a cross-sectional schematic view of a peel detection label 102 illustrating an example of a configuration of the peel detection label of the present invention.

FIG. 2 is a cross-sectional schematic view of a peel detection label 102 illustrating a preferred example of a configuration of the peel detection label of the present invention.

Examples of the peel detection label illustrated as a preferred example of the present invention include a peel detection label including a backing 1, a pattern layer 2, and a pressure sensitive adhesive laminate 11 laminated in this order like the peel detection label 102 illustrated in FIG. 2. The pressure sensitive adhesive laminate 11 illustrated in FIG. 2 is formed by laminating a cover layer (X) (hereinafter also referred to as a "layer (X)") 5, a substrate layer (Y) (hereinafter also referred to as a "layer (Y)") 6, and a layer (Z) 4 in this order from the pattern layer 2 side.

In such an embodiment as the peel detection label 102 illustrated in FIG. 2, the peel detection label may be an embodiment in which the layer (X) 5 is in contact with a surface 1a of the backing 1, the surface 1a on a side of the pattern layer 2 formed thereon, and with the pattern layer 2; preferably an embodiment in which the layer (X) 5 is in contact with the surface 1a of the backing 1, the surface 1a on the side of the pattern layer 2 formed thereon, and with a surface 2a of the pattern layer 2, the surface 2a on the opposite side from the backing 1 side; more preferably an embodiment in which the layer (X) 5 is in contact with the surface 1a of the backing 1, the surface 1a on the side of the pattern layer 2 formed thereon, and covers all surfaces of the pattern layer 2 other than the surface in contact with the surface 1a of the backing 1 as in the peel detection label 102 illustrated in FIG. 2; and even more preferably, the layer (X) 5, the layer (Y) 6, and the layer (Z) 4 are directly laminated in this order in the pressure sensitive adhesive laminate 11.

Here, as described above, in the peel detection label 102 illustrated in FIG. 2, "directly laminated" refers to a configuration in which two layers are in direct contact without having another layer between the layer (X) 5 and the layer (Y) 6 and two layers are in direct contact without having another layer between the layer (Y) 6 and the layer (Z) 4. That is, "directly laminated" refers to a laminated state in which three layers are in direct contact without having another layer between the layer (X) 5 and the layer (Y) 6 as well as between the layer (Y) 6 and the layer (Z) 4.

Figure 3:
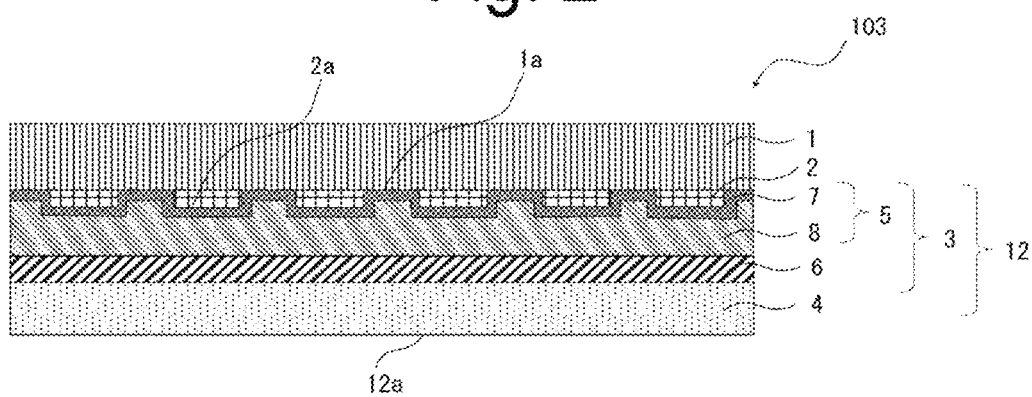
FIG. 3 is a cross-sectional schematic view of a peel detection label 103 illustrating an example of a configuration of the peel detection label of the present invention.

FIG. 3 is a cross-sectional schematic view of a peel detection label 103 illustrating a preferred example of a configuration of the peel detection label of the present invention.

Examples of the peel detection label illustrated as a preferred example of the present invention include a peel detection label including a backing 1, a pattern layer 2, and a pressure sensitive adhesive laminate 12 laminated in this order like the peel detection label 103 illustrated in FIG. 3. The pressure sensitive adhesive laminate 12 illustrated in FIG. 3 is formed by laminating a cover layer (X) 5 composed of a first layer (X1) (hereinafter also referred to as a "layer (X1)") 7 and a second layer (X2) (hereinafter also referred to as a "layer (X2)") 8, a substrate layer (Y) 6, and a pressure sensitive adhesive layer (Z) 4 in this order from the pattern layer 2 side.

In the layer (X) 5, a layer (X1) 7 and a layer (X2) 8 composing the layer (X) 5 are sequentially present in the order of the layer (X1) 7 and the layer (X2) 8 from the layer located on the backing side.

In the present specification, for each layer composing the layer (X) 5, a k-th layer from the layer close to the backing side is referred to as a layer (Xk).

In such an embodiment as the peel detection label 103 illustrated in FIG. 3, the peel detection label may be an embodiment in which the layer (X1) 7 included in the layer (X) 5 is in contact with a surface 1a of the backing 1, the surface 1a on a side of the pattern layer 2 formed thereon, and with the pattern layer 2; preferably an embodiment in which the layer (X1) 7 is in contact with the surface 1a of the backing 1, the surface 1a on the side of the pattern layer 2 formed thereon, and with a surface 2a of the pattern layer 2, the surface 2a on the opposite side from the backing 1 side; more preferably an embodiment in which the layer (X1) 7 is in contact with the surface 1a of the backing 1, the surface 1a on the side of the pattern layer 2 formed thereon, and covers all surfaces of the pattern layer 2 other than the surface in contact with the surface 1a of the backing 1 as in the peel detection label 103 illustrated in FIG. 3; and even more preferably, the layer (X1) 7, the layer (X2) 8, the layer (Y) 6, and the layer (Z) 4 are directly laminated in this order in the pressure sensitive adhesive laminate 12.

In every peel detection label 101 to 103 of the embodiments illustrated in FIGS. 1 to 3, an attachment surface of the layer (Z) 4 is respectively an attachment surface 10a to 12a of the pressure sensitive adhesive laminate, and the peel detection label is attached to an adherend via the attachment surface.

Figure 4:
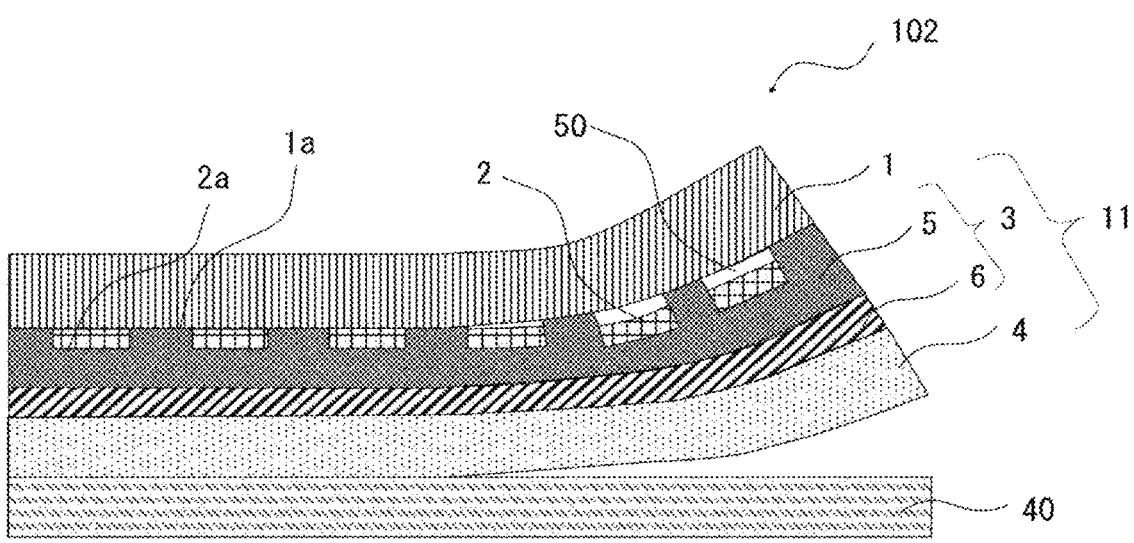
FIG. 4 is a cross-sectional schematic view illustrating a state on the way of peeling a peel detection label 102, which is an example of a configuration of the peel detection label of the present invention, from an adherend 40.

FIG. 4 is a cross-sectional schematic view illustrating a state on the way of peeling the peel detection label 102 illustrated in FIG. 2 from an adherend 40 after attached to the adherend 40, that is, a state of peeling the peel detection label 102.

The peel detection label of a preferred embodiment of the present invention when peeled causes interfacial detachment between the backing and the pattern layer and/or between the pattern layer and the intermediate layer (C), whereby presence or absence of peeling of the peel detection label becomes visually detectable. Here, the peel detection label of the present invention is preferably a label in which, when the peel detection label 102 is peeled from the adherend 40 as illustrated in FIG. 4, interfacial detachment occurs between the backing 1 and the pattern layer 2, and a void 50 is formed, whereby a pattern is revealed, and this enables visual detection of whether the peel detection label 102 is peeled from the adherend 40. That is, the peel detection label is preferably a peel detection label satisfying the embodiment of Requirement (1) below.

Requirement (1): when the pressure sensitive adhesive layer (Z) of the peel detection label is attached to an adherend and then the peel detection label is peeled from the adherend, interfacial detachment occurs between the backing and the pattern layer, whereby presence or absence of peeling of the peel detection label from the adherend becomes visually detectable.

The peel detection label of the present invention satisfying Requirement (1) is preferred also from the viewpoint as follows. For example, in the peel detection label in which the surface of the backing, the surface on the pattern layer side, is satin-finished, as will be described later for the backing, when interfacial detachment occurs between the backing and the pattern layer, and a void is formed in the detached portion, light reflects diffusely on the satin-finished surface exposed to the void, and this can change the detached portion from transparent to translucent or opaque before and after peeling, or can form a mat pattern. This further improves the visibility in detecting peeling of the peel detection label.

In addition, as another embodiment of the peel detection label, for example, the peel detection label 101 illustrated in FIG. 1 may be a configuration (not illustrated) in which a release material is further laminated on at least one surface selected from the surface of the backing 1, the surface on the opposite side from the layer (Z) 4 of the pressure sensitive adhesive laminate 10, and the attachment surface (the surface of the layer (Z) 4, the surface on the opposite side from the side in contact with the layer (C) 3) 10a of the pressure sensitive adhesive laminate 10. The same applies to the peel detection labels 102 and 103 illustrated in FIGS. 2 and 3.

Furthermore, as still another embodiment of the peel detection label, for example, the peel detection label 101 illustrated in FIG. 1 may be a configuration (not illustrated) in which a pressure sensitive adhesive layer (Wr) formed from a composition that is a different forming material from that of the layer (Z) is further laminated on the attachment surface 10a of the pressure sensitive adhesive laminate. r represents an integer of 1 or more. In the peel detection label having a plurality of layers (Wr), a layer having a smaller number of r of Wr is a layer (Wr) nearer to the layer (Z). That is, in the peel detection label having a plurality of layers (Wr), the layer (Wr) nearest to the layer (Z) is a layer (W1). The same applies to the peel detection labels 102 and 103 illustrated in FIGS. 2 and 3.

As described above, the peel detection label of the present invention is not limited to these embodiments as long as the effects of the present invention are achieved.

The thickness of the peel detection label is preferably from 5 to 400 µm, more preferably from 10 to 250 µm, even more preferably from 20 to 200 µm, still more preferably from 30 to 150 µm, still even more preferably from 40 to 130 µm, and yet even more preferably from 55 to 120 µm. Here, in the case where the peel detection label is an embodiment in which a release material is further laminated as described above, the thickness of the peel detection label refers to a total thickness of the peel detection label excluding the release material.

The thickness of the peel detection label can be measured by the method described in Examples.

The pressure sensitive adhesion strength of the attachment surface of the peel detection label, the surface brought into contact with an adherend, as measured by the 90° peel method at a peeling speed of 10 mm/min described in Examples, is preferably 0.3 N/25 mm or greater, more preferably 0.4 N/25 mm or greater, even more preferably 0.5 N/25 mm or greater, and still more preferably 0.6 N/25 mm or greater, and preferably 30.0 N/25 mm or less, more preferably 15.0 N/25 mm or less, even more preferably 5.0 N/25 mm or less, and still more preferably 3.0 N/25 mm or less.

The pressure sensitive adhesion strength of the peel detection label can be measured by the method described in Examples.

In addition, as described above, the peel detection label of a preferred embodiment of the present invention when peeled causes interfacial detachment between the backing and the pattern layer and/or between the pattern layer and the layer (C), whereby presence or absence of peeling of the peel detection label becomes visually detectable. Thus, the peel detection label is preferably a peel detection label having transparency to an extent that when the peel detection label is attached to an adherend, at least a change resulting from the interfacial detachment is visually recognizable from the backing side of the peel detection label; and more preferably a peel detection label having transparency to an extent that information on the adherend is visually recognizable. That is, the peel detection label is more preferably see-through, and thus, from the surface side of the peel detection label, the surface side on the backing side, any object present on the other surface side of the peel detection label can be visually seen.

Each member constituting the peel detection label will be described in further detail below.

Backing

The backing used in the present invention has a tensile modulus Et at 23° C. of 50 MPa or greater and 1000 MPa or less as measured by the method described in Examples below.

The backing with a tensile modulus Et of less than 50 MPa may cause trouble in that tension control in roll to roll in manufacturing or processing would be difficult. From such a viewpoint, the tensile modulus Et is preferably 80 MPa or greater, more preferably 100 MPa or greater, and even more preferably 120 MPa or greater.

On the other hand, the backing with a tensile modulus Et exceeding 1000 MPa would impair pattern expressibility when the peel detection label is peeled at a low speed. From such a viewpoint and from the viewpoint of improving the pattern expressibility and the curved surface conformability, the tensile modulus Et is preferably 900 MPa or less, more preferably 500 MPa or less, even more preferably 400 MPa or less, still more preferably 300 MPa or less, and still even more preferably 200 MPa or less.

In addition, from the viewpoint of ease of unwinding in labeling and ease of handling in peeling from the release material, the backing has a bending resistance of preferably 50 mN or greater, more preferably 75 mN or greater, and even more preferably 100 mN or greater as measured by the method described in Examples below. Furthermore, from the viewpoint of improving the curved surface conformability, the bending resistance is preferably 250 mN or less, more preferably 200 mN or less, and even more preferably 150 mN or less.

Moreover, from the viewpoint of preventing tearing of the peel detection label when the peel detection label is peeled, the backing has a tear strength of preferably 1 N/mm or greater, more preferably 10 N/mm or greater, and even more preferably 50 N/mm or greater, the tear strength obtained by the tear test method as measured by the method described in Examples below. Still more, from the viewpoint of improving cutting processing suitability and die cutting processing suitability, the value is preferably 200 N/mm or less, more preferably 150 N/mm or less, and even more preferably 100 N/mm or less.

For the backing, a plastic film satisfying the tensile modulus Et described above is preferably used. Examples of the material of the plastic film include polyurethane-based resins, polyethylene-based resins, polypropylene-based resins, poly(vinylidene chloride)-based resins, ethylene-vinyl acetate copolymer-based resins, and ethylene-(meth)acrylic acid copolymer-based resins. Of these, from the viewpoint of allowing the backing to readily satisfy the tensile modulus Et described above, the material is preferably one or more types selected from the group consisting of polyethylene-based resins, polypropylene-based resins, ethylene-vinyl acetate copolymer-based resins, and ethylene-(meth)acrylic acid copolymer-based resins, more preferably one or more types selected from ethylene-vinyl acetate copolymer-based resins and ethylene-(meth)acrylic acid copolymer-based resins, and even more preferably an ethylene-(meth)acrylic acid copolymer-based resin.

The ethylene-(meth)acrylic acid copolymer-based resin is not particularly limited as long as the tensile modulus Et described above is satisfied. Examples include ethylene-(meth)acrylic acid copolymer-based resins, for example, with an acid content in the resin total amount of 100 mass % preferably of 2 mass % or higher and 20 mass % or lower, more preferably of 4 mass % or higher and 15 mass % or lower, and even more preferably of 8 mass % or higher and 12 mass % or lower. The acid content can be measured, for example, using Fourier transform infrared spectroscopy (FT-IR).

From the viewpoint of allowing the backing to readily satisfy the tensile modulus Et described above, the plastic film is preferably a polyethylene-based resin film, a polypropylene-based resin film, an ethylene-vinyl acetate copolymer-based resin film, or an ethylene-(meth)acrylic acid copolymer-based resin film, more preferably an ethylene-vinyl acetate copolymer-based resin film or an ethylene-(meth)acrylic acid copolymer-based resin film, and even more preferably an ethylene-(meth)acrylic acid copolymer-based resin film.

Here, the ethylene-(meth)acrylic acid copolymer-based resin film refers to a plastic film formed from a resin containing an ethylene-(meth)acrylic acid copolymer in higher than 50 mass %, preferably 60 mass % or greater, more preferably 80 mass % or greater, even more preferably 90 mass % or greater, still more preferably 95 mass % or greater, still even more preferably 98 mass % or greater, and preferably 100 mass % or lower in 100 mass % of a raw material resin(s) forming the plastic film.

In addition, the polyethylene-based resin film, the polypropylene-based resin film, and the ethylene-vinyl acetate copolymer-based resin film are also synonymous with the ethylene-(meth)acrylic acid copolymer-based resin film described above except for changing "ethylene-(meth) acrylic acid copolymer" to "polyethylene", "polypropylene", or "ethylene-vinyl acetate copolymer", respectively.

For the plastic film, a non-oriented film, a uniaxially oriented film, or a biaxially oriented film may be used.

In the present specification, the "non-oriented film" is meant to exclude films intentionally stretched in a particular direction in the manufacturing process of the film. Examples of the exclusion include films obtained by intentionally stretching a master roll of a non-oriented film using a longitudinal drawing machine and/or a transverse drawing machine, such as a tenter. In addition, examples include such a case as intentionally adjusting a rotational speed ratio between respective rolls to apply stretch to a film, that is, films obtained using a roll-to-roll manufacturing device as a drawing machine. Examples of an embodiment of the non-oriented film include cast polypropylene films (CPP films). In addition, examples of an embodiment of the oriented film include oriented polypropylene films (OPP films).

On the other hand, the above exclusion is not applicable, for example, to a case where a film is stretched by a stress inevitably applied in the flow direction merely to hold the film in a continuous manufacturing process, such as a process using a roll-to-roll manufacturing device not as a longitudinal drawing machine, (e.g., a process using a casting device, a winding device, a slit device, or the like), and a film obtained from such a process can be regarded as a "non-oriented film".

In addition, as described above, the peel detection label of a preferred embodiment of the present invention when peeled causes interfacial detachment between the pattern layer and the other layer, whereby presence or absence of peeling of the peel detection label becomes visually detectable.

Thus, the backing is preferably a backing having transparency to an extent that when the backing is integrated into the peel detection label, the backing is see-through, and at least any object present on the other surface side of the backing can be visually seen from the surface side of the backing of the peel detection label.

In addition, the backing is preferably a backing in which the surface on the side where the pattern layer is formed is a satin-finished surface. Here, the satin finish refers to a treatment for processing the surface of the backing into a surface on which fine asperities are formed, and the satin-finished surface is typically a rough surface like a surface of a pear peel. In the present specification, the "satin-finished surface" may be in a shape in which the fine asperity surface is irregular or regular.

The backing with a satin-finished surface on the side where the pattern layer is formed improves interfacial adhesion to the intermediate layer (C) described later and can effectively prevent the occurrence of interfacial detachment at the interface between the backing and the layer (C); thus, this is preferred. This in turn allows interfacial detachment to occur readily at a location where the interface between the backing and the pattern layer is present but not at the interface between the pattern layer and the layer (C); thus, this is preferred. That is, this allows the peel detection label to readily satisfy Requirement (1); thus, this is preferred.

In addition, for example, as described above, in the peel detection label in which one surface of the backing is satin-finished, when interfacial detachment occurs between the backing and the pattern layer, and a void is formed in the detached portion, light reflects diffusely on the satin-finished surface exposed to the void, and this can change the detached portion from transparent to translucent or opaque before and after peeling, or can form a mat pattern. This improves the visibility in detecting peeling of the peel detection label; thus, this is preferred.

Thus, more preferably, the backing is a backing having transparency enabling visual detection of the presence or absence of peeling of the peel detection label, and the surface on the side where the pattern layer is formed is a satin-finished surface.

Examples of the satin-finishing include forming fine asperities by embossing using an emboss roll having a satin-finished surface, sandblasting (sand matting), chemical etching using a solvent, kneading of transparent fine resin particles, or coating with a mat material. Of these, from the viewpoint of costs and versatility, embossing using an emboss roll having a satin-finished surface or sandblasting is preferred, and embossing is more preferred.

Thus, the backing is more preferably a plastic film in which a surface of the backing, the surface being on the side of the pattern layer formed thereon, is satin-finished. Preferred examples of the plastic film are as described above.

The thickness of the backing is preferably 1 μm or greater, more preferably 5 μm or greater, even more preferably 10 μm or greater, still more preferably 30 μm or greater, and still even more preferably 50 μm or greater, and preferably 200 μm or less, more preferably 150 μm or less, even more preferably 130 μm or less, still more preferably 120 μm or less, and still even more preferably 90 μm or less.

The thickness of the backing can be measured by the method described in Examples.

The backing may contain an additive as necessary within a range where the effects of the present invention are not impaired.

Examples of the additive include ultraviolet absorbers, light stabilizers, antioxidants, antistatic agents, slip agents, antiblocking agents, and colorants.

These additives may each be used alone or in combination of two or more.

When the backing contains these additives, the content of each additive is independently preferably from 0.0001 to 20 parts by mass and more preferably from 0.001 to 10 parts by mass relative to 100 parts by mass of a raw material resin(s) forming the plastic film.

For the purpose of designability or forgery prevention, a print receiving layer may be provided on the surface of the backing, the surface on the opposite side from the pressure sensitive adhesive laminate, and a printed layer is provided on the print receiving layer as long as the effects of the present invention are achieved, that is, to an extent that the transparency of the peel detection label is not impaired, the transparency enough to enable visual recognition of a change due to the interfacial detachment. In addition, to form a winding tape, a release agent layer may be provided on the surface of the backing, the surface on the opposite side from the pressure sensitive adhesive laminate, as long as the effects of the present invention are achieved.

Pattern Layer

The pattern layer is a layer necessary to enable visual detection of the peeling of the peel detection label when the peel detection label is peeled.

The pattern layer is preferably a layer formed of a material satisfying Requirement (1) in the peel detection label.

In addition, the pattern is preferably latent before peeling the peel detection label, and thus the pattern layer is preferably a layer having transparency. The pattern layer having transparency is preferred also from the viewpoints that the change of the peel detection label before and after peeling becomes clearer; information, such as a letter or a pattern on an adherend surface, can be checked through the peel detection label in a state where the peel detection label is attached to the adherend; or the peel detection label itself becomes transparent, and this can make the label inconspicuous.

The pattern layer is not particularly limited as long as the effects of the present invention are achieved, but is preferably a layer formed from a composition containing one or more types selected from the group consisting of cellulose-based resins, such as methyl cellulose, carboxymethyl cellulose, and hydroxyethyl cellulose; acrylic resins, such poly (meth)acrylates and polymethyl (meth)acrylates; urethane-based resins; acrylic urethane-based resins; polyester-based resins, such as poly(ethylene terephthalate)s, poly(butylene terephthalate)s, poly(ethylene naphthalate)s, and polyarylates; and epoxy-based resins; more preferably a layer formed from a composition containing one or more types selected from the group consisting of acrylic resins, urethane-based resins, acrylic urethane-based resins, and polyester-based resins; even more preferably a layer formed from a composition containing one or more types selected from the group consisting of acrylic resins and acrylic urethane-based resins; and still more preferably a layer formed from a composition containing an acrylic resin.

In addition, from the viewpoint of allowing the peel detection label to readily satisfy Requirement (1), the pattern layer is preferably a layer formed from a resin having a pressure sensitive adhesion strength lower than the pressure sensitive adhesion strength of the layer (C) when the layer (C) is a layer having the pressure sensitive adhesion strength, and more preferably a layer formed from a non-pressure sensitive adhesive resin. Here, the pressure sensitive adhesion strength of the layer (C) refers to the pressure sensitive adhesion strength of the layer (X1) located on the side closest to the pattern layer.

Thus, the layer formed from the composition containing an acrylic resin is preferably a layer formed from an acrylic resin capable of forming a layer having a pressure sensitive adhesion strength lower than that of a resin used in the layer (C) among acrylic resins described later, and more preferably a layer formed from a composition containing an acrylic polymer in which the main monomer is methyl (meth)acrylate.

Here, the "main monomer" refers to a monomer contained in the largest amount (amount (mass %) to be used) among monomer components forming the polymer.

In addition, from the viewpoint of allowing interfacial detachment to occur more readily between the backing and the pattern layer when the peel detection label is peeled, and readily satisfying Requirement (1), the adhesive strength between the pattern layer and the backing is preferably lower than the adhesive strength between the layer (C) (e.g., referring to the layer (X) when the layer (C) is a layer including the layer (X) and the layer (Y), and referring to the layer (X1) in contact with the pattern layer when the layer (X) is formed of a plurality of layers) and the backing; and more preferably, the adhesive strength between the pattern layer and the backing is lower than the adhesive strength between the layer (C) and the backing and lower than the adhesive strength between the pattern layer and the layer (C). Such an embodiment, for example, effectively prevents peeling at an interface(s) other than the interface between the backing and the pattern layer, satisfying Requirement (1); thus, this is preferred.

In the pattern layer, the total content of the respective resins described above is preferably 50 mass % or higher, more preferably 70 mass % or higher, even more preferably 80 mass % or higher, and still more preferably 90 mass % or higher, and preferably 100% by mass or lower.

In addition, the pattern layer is formed on a part of the surface of the backing. When the pattern layer is formed on the entire surface of the backing, detachment would occur on the entire surface of the interface between the backing and the pattern layer, and this would cause adhesive residue to an adherend.

Here, "the pattern layer is formed on a part of the surface of the backing" means that, in the peel detection label having a size in a state of being actually attached or after die cutting in a predetermined size for use, the area where the pattern layer is formed is less than 100%, preferably from 1 to 99%, more preferably from 2 to 95%, even more preferably from 3 to 90%, still more preferably from 5 to 80%, still even more preferably from 8 to 70%, yet even more preferably from 10 to 60%, and yet still more preferably from 12 to 45% of the area 100% of the surface of the backing, the surface on which the pattern layer is formed.

The method of forming the pattern layer is not particularly limited as long as it is a method capable of forming the pattern layer on the backing. For example, the pattern layer can be formed using an ink containing the resin and a solvent by a typical printing method, such as, for example, gravure printing, screen printing, offset printing, or flexographic printing.

In addition, the shape or the like of the pattern to be formed is not particularly limited as long as presence or absence of peeling of the peel detection label is detectable, and it may be a geometric pattern or design, or may be a letter pattern.

The pattern is not necessarily limited to a pattern "arranged" based on a certain regularity but also includes an irregular (random) shape. The pattern is not limited to printing a specific regular shape by the printing method described above. For example, processing to form an irregular (random) shape, such as merely spraying a raw material for the pattern layer onto the backing, allows a random change of color tone or light transmissivity of the label to be visually recognized in a part of the processed portion. In such a case, the portion formed of the raw material for the pattern layer, the portion formed on the backing, is also included in the pattern layer.

However, from the viewpoint of more reliably and clearly detecting presence or absence of peeling of the peel detection label and from the viewpoint of manufacturing and product quality, such as the viewpoint that also when the label is processed in any label size, the pattern layer suited for that size can be formed, the interface present between the backing and the pattern layer preferably has a certain size of area or greater, and thus a predetermined regular pattern is preferably formed.

In addition, as described above, the pattern layer itself can form a predetermined pattern. Thus, when the pattern layer is a layer having transparency, the pattern can be formed as a hidden pattern, such as a hidden letter. Here, the "hidden pattern" refers to a pattern that is latent and thus is not visually detectable because the formed pattern is transparent before peeling the peel detection label, and is revealed and thus becomes visually detectable after peeling the peel detection label.

In addition, when Requirement (1) is satisfied, the pattern layer used in the present invention itself undergoes interfacial detachment from the backing. This advantageously eliminates, for example, the need for providing layers each having a separate function, such as a release layer and a printing layer, as the pattern layer.

Furthermore, the peel detection label thus configured can cause interfacial detachment between the backing and the pattern layer and, on the other hand, can effectively prevent interfacial detachment in other portions. Thus, this can reveal a pattern to an extent that the pattern can be visually detected when the peel detection label is peeled even in a case where a pattern having a relatively complicated shape, such as a letter, is formed by the pattern layer itself. Thus, the peel detection label is preferably configured to satisfy Requirement (1).

The thickness of the pattern layer is less than the thickness of the pressure sensitive adhesive laminate described later and is preferably less than the thickness of the layer (C). The thickness of the pattern layer is, for example, preferably from 0.05 to 16 μm, more preferably from 0.1 to 12 μm, and even more preferably from 0.5 to 8 μm.

The thickness of the pattern layer can be measured by the method described in Examples.

In addition, a surface of the backing, the surface being on a side of the pattern layer formed thereon, and a surface of the pattern layer, the surface being on a side of the intermediate layer (C) formed thereon, are preferably surface-modified surfaces using an oxidation method. The embodiment improves interfacial adhesion between the backing and the layer (C) and interfacial adhesion between the pattern layer and the layer (C) and thus can more effectively prevent the occurrence of interfacial detachment at these interfaces. This in turn allows interfacial detachment to occur readily at a location where the interface between the backing and the pattern layer is present but not at the interface between the pattern layer and the layer (C); thus, this is preferred. That is, this allows the peel detection label to readily satisfy Requirement (1); thus, this is preferred.

Examples of the oxidation method include a corona discharge treatment method, a plasma treatment method, a chromium acid oxidation method (wet), a hot air treatment method, an ultraviolet light treatment method, an ozone treatment method, and an ultraviolet light-ozone treatment method. Of these, from the viewpoints of introducing equipment into a manufacturing line, workability, and the like, and from the viewpoint of the capability of more effectively oxidizing the surfaces of the backing and the pattern layer, the oxidation method is preferably one or more types selected from the group consisting of a corona discharge treatment method, a plasma treatment method, an ultraviolet light treatment method, an ozone treatment method, and an ultraviolet light-ozone treatment method; more preferably one or more types selected from the group consisting of a corona discharge treatment method, a plasma treatment method, and an ultraviolet light-ozone treatment method; and even more preferably one or more types selected from a corona discharge treatment method and a plasma treatment method.

In addition, the surface of the backing, the surface on the side of the pattern layer formed thereon, is preferably satin-finished as described above, and from the same viewpoints described above, the satin-finished surface is more preferably a surface further surface-modified using the oxidation method.

Pressure Sensitive Adhesive Laminate

The pressure sensitive adhesive laminate is a laminate having at least the intermediate layer (C) and the pressure sensitive adhesive layer (Z), preferably having at least the layer (C) and the layer (Z) in this order from the pattern layer side, and more preferably having at least the layer (C) and the layer (Z) directly laminated in this order from the pattern layer side.

Intermediate Layer (C)

The role of the intermediate layer (C) is as described above. The layer (C) may be a single layer or a laminate composed of two or more layers, and is preferably a laminate including at least the cover layer (X) and the substrate layer (Y), in which the substrate layer (Y) has a surface in contact with the pressure sensitive adhesive layer (Z).

Cover Layer (X)

The cover layer (X) is a layer having a surface in contact with the backing and the pattern layer and a surface in contact with the substrate layer (Y) as described above. The layer (X) may be a single layer or a laminate (Ln) composed of two or more layers.

When the (X) is the laminate (Ln), the laminate (Ln) is a laminate (Ln) having at least a layer (X1), which is the first layer from the backing side, and a layer (Xn), which is the n-th layer from the backing side, in which the layer (X1) is a layer in contact with the surface of the backing and the pattern layer, and the layer (Xn) is a layer in contact with the layer (Y).

When the layer (X) is the laminate (Ln), n is preferably an integer from 2 to 10, more preferably an integer from 2 to 6, even more preferably an integer from 2 to 4, still more preferably an integer of 2 or 3, and still even more preferably 2.

Thus, when the layer (X) is the laminate (Ln), the cover layer (X) is still even more preferably a laminate (L2) having a first layer (X1) and a second layer (X2), in which the first layer (X1) is a layer in contact with the surface of the backing and the pattern layer, and the second layer (X2) is a layer in contact with the substrate layer (Y).

When the layer (X) is the laminate (Ln), the shear storage elastic modulus G' at 23° C. of the layer (X1) may be greater than the shear storage elastic modulus G' at 23° C. of the layer (Xn). For example, when the laminate (Ln) is the laminate (L2) composed of two layers, the shear storage elastic modulus G' at 23° C. of the layer (X1) may be greater than the shear storage elastic modulus G' at 23° C. of the layer (X2).

The value of the shear storage elastic modulus G' at 23° C. can be measured specifically by the method described in Examples.

In addition, each layer composing the layer (X) is preferably a resin layer each formed from a resin composition containing a resin. That is, the layer (X) is preferably a layer composed of a resin layer.

In addition, the layer (X) is preferably a layer having an n-layer structure (n is preferably an integer of 2 to 10) having a surface in contact with the backing and the pattern layer and a surface in contact with the layer (Y), in which the thickness average shear storage elastic modulus of the layer (X) represented by Equation (1) below is preferably $8.0 \times 10^4$ Pa or greater and $6.0 \times 10^5$ Pa or less.

[Equation 1]

$$\sum_{k=1}^{n} (G'(Xk) \times T(Xk)) \qquad (1)$$

where G'(Xk) represents a shear storage elastic modulus G' at 23° C. of the k-th layer (Xk) from the backing side in the cover layer (X); T(Xk) represents a thickness ratio of the layer (Xk)=a thickness of the layer (Xk)/a total thickness of the cover layer (X); and n represents an integer preferably from 2 to 10.

The layer (X) satisfying the thickness average shear storage elastic modulus (hereinafter also referred to simply as "thickness average elastic modulus") allows the peel detection label to readily exhibit excellent pattern expressibility also when the peel detection label is peeled at a low speed; thus, this is preferred.

From the viewpoint of allowing the peel detection label to readily exhibit even better pattern expressibility also when the peel detection label is peeled at a low speed, the thickness average elastic modulus of the layer (X) is preferably $9.0 \times 10^4$ Pa or greater, more preferably $9.5 \times 10^4$ Pa or greater, even more preferably $1.0 \times 10^5$ Pa or greater, and still more preferably $1.1 \times 10^5$ Pa or greater, and preferably $5.0 \times 10^5$ Pa or less, more preferably $3.0 \times 10^5$ Pa or less, even more preferably $2.0 \times 10^5$ Pa or less, and still more preferably $1.5 \times 10^5$ Pa or less.

In addition, as understood from Equation (1), the thickness average modulus of the layer (X) can be adjusted by adjusting the shear storage elastic modulus G' at 23° C. of each layer composing the layer (X) and the thickness of each layer. Furthermore, the shear storage elastic modulus G' at 23° C. of each layer composing the layer (X) can also be adjusted, for example, by selecting the type of each component forming the layer, such as a resin, a tackifier, a crosslinking agent, a curing agent, and another additive, and adjusting their contents.

The value of the thickness average elastic modulus of the layer (X) can be measured and calculated specifically by the method described in Examples.

In addition, in the layer (X), at least one surface of the layer (X), the surface in contact with the backing and the pattern layer or the surface in contact with the layer (Y), has pressure sensitive adhesiveness. Thus, the layer (X) preferably has at least a pressure sensitive adhesive layer (XA) (hereinafter also referred to as "layer (XA)").

The layer (XA) is preferably a layer formed from a composition (x) containing a pressure sensitive adhesive resin, and more preferably a layer formed by drying a coating (x') made from the composition (x) containing a pressure sensitive adhesive resin.

Here, in the present specification, the "coating" is a film formed from a composition, which is a forming material, by a known coating method, and refers to a film in a state where the residual ratio of a volatile component, such as a solvent, contained in the coating is from 10 to 100 mass % relative to a total amount 100 mass % of a volatile component(s) contained in the composition before coating.

In short, in the present specification, the coating contains a certain amount of a volatile component, such as a solvent.

In the laminate (Ln) having a plurality of the layers (XA), the plurality of the layers (XA) present may be identical to each other or different from each other.

In addition, in the layer (X), the layer in contact with the layer (Y) is preferably the layer (XA). Such an embodiment improves interfacial adhesion between the layer (X) and the layer (Y), and also makes the layer (X) and the layer (Y) less likely to detach at their interface in the pressure sensitive adhesive laminate against the tensile stress caused during the process of deformation of the peel detection label when peeled. Thus, the embodiment can presumably contribute to improving the effect of preventing the occurrence of adhesive residue.

In addition, when the layer (X1), which is the first layer from the backing side, is the layer (XA), the pattern layer and the layer (XA) preferably contain the same resin. For example, when the pattern layer is a layer formed from an acrylic resin, the pressure sensitive adhesive layer (XA) is also preferably an acrylic resin described later.

For example, the pattern layer is preferably a layer formed from a composition containing one or more types selected from the group consisting of acrylic resins, urethane-based resins, acrylic urethane-based resins, and polyester-based resins, and the layer (XA) is preferably a layer formed from a composition (x) containing a pressure sensitive adhesive resin containing one or more types selected from the group consisting of acrylic resins, urethane-based resins, acrylic urethane-based resins, and polyester-based resins.

Composition (x)

The composition (x), which is a material for forming the pressure sensitive adhesive layer (XA), is a composition containing a pressure sensitive adhesive resin.

In an embodiment of the present invention, a component other than the pressure sensitive adhesive resin contained in the composition (x) can be appropriately adjusted according to the intended use of the peel detection label of the present invention.

For example, in an embodiment of the present invention, from the viewpoint of adjusting the pressure sensitive adhesion strength to a desired range, the composition (x) containing a pressure sensitive adhesive resin may further contain one or more types selected from the group consisting of tackifiers and crosslinking agents in addition to the pressure sensitive adhesive resin, and may contain, in addition to these, one or more types selected from the group consisting of diluent solvents and additives for pressure sensitive adhesives used in typical pressure sensitive adhesives.

Pressure Sensitive Adhesive Resin

The mass average molecular weight (Mw) of the pressure sensitive adhesive resin is preferably from 10000 to 2000000, more preferably from 20000 to 1500000, and even more preferably from 30000 to 1200000.

Examples of the pressure sensitive adhesive resin contained in the composition (x) include acrylic resins, urethane-based resins, polyisobutylene-based resins, olefin-based resins, acrylic urethane-based resins, and polyester-based resins that satisfy the pressure sensitive adhesion strength of the layer (XA) described later. Of these, the pressure sensitive adhesive resin is preferably one or more types selected from the group consisting of acrylic resins, urethane-based resins, acrylic urethane-based resins, and polyester-based resins, and is more preferably an acrylic resin.

These pressure sensitive adhesive resins may be used alone or in combination of two or more.

In addition, when these pressure sensitive adhesive resins are copolymers having two or more constitutional units, the form of the copolymer is not particularly limited. The copolymer may be any of a block copolymer, a random copolymer, or a graft copolymer.

Furthermore, when the layer in contact with the layer (Y) is the layer (XA), from the viewpoint of further improving the interfacial adhesion between the layer (XA) and the layer (Y), these pressure sensitive adhesive resins are preferably ultraviolet non-curable pressure sensitive adhesive resins having no polymerizable functional group.

The content of the pressure sensitive adhesive resin in the composition (x) forming the layer (XA) is preferably from 30 to 99.99 mass %, more preferably from 40 to 99.95 mass %, even more preferably from 50 to 99.90 mass %, still more preferably from 55 to 99.80 mass %, and still even more preferably from 60 to 99.50 mass % in a total amount (100 mass %) of an active component(s) in the composition (x).

Acrylic Resin

In an embodiment of the present invention, when the layer in contact with the layer (Y) is the layer (XA), from the viewpoint of further improving the interfacial adhesion to the layer (Y), the pressure sensitive adhesive resin contained in the composition (x) preferably contains an acrylic resin.

From the viewpoint of further improving the interfacial adhesion, the content proportion of the acrylic resin in the pressure sensitive adhesive resin is preferably from 30 to 100 mass %, more preferably from 50 to 100 mass %, even more preferably from 70 to 100 mass %, and still more preferably from 85 to 100 mass % in a total amount (100 mass %) of the pressure sensitive adhesive resin contained in the composition (x).

Examples of the acrylic resin that can be used as the pressure sensitive adhesive resin include polymers containing a constitutional unit derived from an alkyl (meth)acrylate having a linear or branched alkyl group and polymers containing a constitutional unit derived from a (meth)acrylate having a cyclic structure.

The mass average molecular weight (Mw) of the acrylic resin is preferably from 100000 to 1500000, more preferably from 200000 to 1300000, even more preferably from 350000 to 1200000, and still more preferably from 500000 to 1100000.

The acrylic resin is preferably an acrylic polymer (A0) having a constitutional unit (a1) derived from an alkyl (meth)acrylate (a1') (hereinafter also referred to as the "monomer (a1')") and more preferably an acrylic copolymer (A1) having the constitutional unit (a1) and a constitutional unit (a2) derived from a functional group-containing monomer (a2') (hereinafter also referred to as the "monomer (a2')").

From the viewpoint of improving pressure sensitive adhesiveness, the alkyl group contained in the monomer (a1') has preferably from 1 to 24, more preferably from 1 to 12, even more preferably from 1 to 8, and still more preferably from 4 to 6 carbons.

In addition, the alkyl group contained in the monomer (a1') may be a linear alkyl group or a branched alkyl group.

Examples of the monomer (a1') include methyl (meth)acrylate, ethyl (meth)acrylate, propyl (meth)acrylate, butyl (meth)acrylate, 2-ethylhexyl (meth)acrylate, lauryl (meth)acrylate, tridecyl (meth)acrylate, and stearyl (meth)acrylate.

The monomer (a1') is preferably methyl (meth)acrylate, butyl (meth)acrylate, and 2-ethylhexyl (meth)acrylate, and more preferably methyl (meth)acrylate and butyl (meth)acrylate.

These monomers (a1') may be used alone or in combination of two or more.

The content of the constitutional unit (a1) is preferably from 50 to 100 mass %, more preferably from 60 to 99.9 mass %, even more preferably from 70 to 99.5 mass %, and still more preferably from 80 to 99.0 mass % in all constitutional unit(s) (100 mass %) of the acrylic polymer (A0) or the acrylic copolymer (A1).

The functional group contained in the monomer (a2') refers to a functional group that reacts with a crosslinking agent that may be contained in the composition (x) described later and can be a starting point of the crosslinking or a functional group having a crosslinking promoting effect. Examples thereof include a hydroxyl group, a carboxy group, an amino group, and an epoxy group.

In short, examples of the monomer (a2') include hydroxyl group-containing monomers, carboxy group-containing monomers, amino group-containing monomers, and epoxy group-containing monomers.

These monomers (a2') may be used alone or in combination of two or more.

The monomer (a2') is preferably a hydroxyl group-containing monomer and a carboxy group-containing monomer.

Examples of the hydroxyl group-containing monomer include hydroxyalkyl (meth)acrylates, such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate; and unsaturated alcohols, such as vinyl alcohol and allyl alcohol.

Examples of the carboxy group-containing monomer include ethylenically unsaturated monocarboxylic acids, such as (meth)acrylic acid and crotonic acid; ethylenically unsaturated dicarboxylic acids and their anhydrides, such as fumaric acid, itaconic acid, maleic acid, and citraconic acid; 2-(acryloyloxy)ethyl succinate, and 2-carboxyethyl (meth)acrylate.

The monomer (a2') is preferably 2-hydroxyethyl (meth)acrylate and (meth)acrylic acid.

These monomers (a2') may be used alone or in combination of two or more.

The content of the constitutional unit (a2) is preferably from 0.1 to 40 mass %, more preferably from 0.3 to 30 mass %, even more preferably from 0.5 to 20 mass %, and still more preferably from 0.7 to 10 mass % in all constitutional units (100 mass %) of the acrylic copolymer (A1).

The acrylic copolymer (A1) preferably further has a constitutional unit (a3) derived from another monomer (a3') other than the monomers (a1') and (a2').

In the acrylic copolymer (A1), the total content of the constitutional units (a1) and (a2) is preferably from 70 to 100 mass %, more preferably from 80 to 100 mass %, even more preferably from 85 to 100 mass %, and still more preferably from 90 to 100 mass % in all constitutional unit(s) (100 mass %) of the acrylic copolymer (A1).

Examples of the monomer (a3') include olefins, such as ethylene, propylene, and isobutylene; halogenated olefins, such as vinyl chloride and vinylidene chloride; diene-based monomers, such as butadiene, isoprene, and chloroprene; (meth)acrylates having a cyclic structure, such as cyclohexyl (meth)acrylate, benzyl (meth)acrylate, isobornyl (meth)acrylate, dicyclopentanyl (meth)acrylate, dicyclopentenyl (meth)acrylate, dicyclopentenyloxyethyl (meth)acrylate, and imide (meth)acrylate; styrene, α-methylstyrene, vinyl toluene, vinyl formate, vinyl acetate, acrylonitrile, (meth)acrylamide, (meth)acrylonitrile, (meth)acryloylmorpholine, and N-vinylpyrrolidone.

The monomer (a3') is preferably vinyl acetate.

Urethane-Based Resin

The urethane-based resin that can be used as the pressure sensitive adhesive resin is not particularly limited as long as the resin is a polymer having one or more of urethane bonds and urea bonds in at least one of a main chain or a side chain.

Specific examples of the urethane-based resin include urethane-based prepolymers (UX) obtained by reacting a polyol and a polyvalent isocyanate compound.

The urethane-based prepolymer (UX) may be obtained by performing a chain extension reaction using a chain extender.

The mass average molecular weight (Mw) of the urethane-based resin is preferably from 10000 to 200000, more preferably from 12000 to 150000, even more preferably from 15000 to 100000, and still more preferably from 20000 to 70000.

Examples of the polyol used as a raw material for the urethane-based prepolymer (UX) include polyol compounds, such as alkylene polyols, polyether polyols, polyester polyols, polyester amide polyols, polyester-polyether polyols, and polycarbonate polyols, but the polyol is not particularly limited as long as it is a polyol, and may be a bifunctional diol or a trifunctional triol.

These polyols may be used alone or in combination of two or more.

Of these polyols, from the viewpoint of ease of availability, reactivity, and the like, a diol is preferred, and an alkylene diol is more preferred.

Examples of the alkylene diol include alkanediols, such as 1,3-propanediol, 1,4-butanediol, 1,5-pentanediol, neopentyl glycol, and 1,6-hexanediol; alkylene glycols, such as ethylene glycol, propylene glycol, diethylene glycol, and dipropylene glycol; polyalkylene glycols, such as polyethylene glycol, polypropylene glycol, and polybutylene glycol; and polyoxyalkylene glycols, such as polytetramethylene glycol.

Of these alkylene diols, from the viewpoint of preventing gelation when the reaction with a chain extender is further performed, a glycol with a mass average molecular weight (Mw) from 1000 to 3000 is preferred.

Examples of the polyvalent isocyanate compound used as a raw material for the urethane-based prepolymer (UX) include aromatic polyisocyanates, aliphatic polyisocyanates, and alicyclic polyisocyanates.

Examples of the aromatic polyisocyanate include 1,3-phenylene diisocyanate, 1,4-phenylene diisocyanate, 4,4'-diphenylmethane diisocyanate (MDI), 2,4-tolylene diisocyanate (2,4-TDI), 2,6-tolylene diisocyanate (2,6-TDI), 4,4'-toluidine diisocyanate, 2,4,6-triisocyanatotoluene, 1,3,5-triisocyanatobenzene, dianisidine isocyanate, 4,4'-diphenyl ether diisocyanate, 4,4',4"-triphenylmethane triisocyanate, 1,4-tetramethylxylylene diisocyanate, and 1,3-tetramethylxylylene diisocyanate.

Examples of the aliphatic polyisocyanate include trimethylene diisocyanate, tetramethylene diisocyanate, hexamethylene diisocyanate (HMDI), pentamethylene diisocyanate, 1,2-propylene diisocyanate, 2,3-butylene diisocyanate, 1,3-butylene diisocyanate, dodecamethylene diisocyanate, and 2,4,4-trimethylhexamethylene diisocyanate.

Examples of the alicyclic polyisocyanate include 3-isocyanatomethyl-3,5,5-trimethylcyclohexyl isocyanate (isophorone diisocyanate: IPDI), 1,3-cyclopentane diisocyanate, 1,3-cyclohexane diisocyanate, 1,4-cyclohexane diisocyanate, methyl-2,4-cyclohexane diisocyanate, methyl-2,6-cyclohexane diisocyanate, 4,4'-methylenebis(cyclohexyl isocyanate), and 1,4-bis(isocyanatomethyl)cyclohexane.

These polyvalent isocyanate compounds may be modified products of the polyisocyanate, such as a trimethylolpropane adduct of the polyisocyanate, a biuret product obtained by a reaction with water, or an isocyanurate product containing an isocyanurate ring.

Of these, the polyvalent isocyanate compound is preferably one or more types selected from 4,4'-diphenylmethane diisocyanate (MDI), 2,4-tolylene diisocyanate (2,4-TDI), 2,6-tolylene diisocyanate (2,6-TDI), hexamethylene diisocyanate (HMDI), 3-isocyanatomethyl-3,5,5-trimethylcyclohexyl isocyanate (IPDI), and modified products of these from the viewpoint of obtaining a urethane-based polymer with excellent pressure sensitive adhesive physical properties, and more preferably one or more types selected from HMDI, IPDI, and modified products of these from the viewpoint of weather resistance.

The isocyanate group content (NCO %) in the urethane-based prepolymer (UX) is preferably from 0.5 to 12 mass % and more preferably from 1 to 4 mass % in terms of a value measured in accordance with JIS K1603-1: 2007.

The chain extender is preferably a compound having two of at least one of a hydroxyl group or an amino group, or a compound having three or more of at least one of a hydroxyl group or an amino group.

The compound having two of at least one of a hydroxyl group or an amino group is preferably at least one compound selected from the group consisting of aliphatic diols, aliphatic diamines, alkanolamines, bisphenols, and aromatic diamines.

Examples of the aliphatic diol include alkanediols, such as 1,3-propanediol, 1,4-butanediol, 1,5-pentanediol, neopentyl glycol, 1,6-hexanediol, and 1,7-heptanediol; and alkylene glycols, such as ethylene glycol, propylene glycol, diethylene glycol, and dipropylene glycol.

Examples of the aliphatic diamine include ethylene diamine, 1,3-propanediamine, 1,4-butanediamine, 1,5-pentanediamine, and 1,6-hexanediamine.

Examples of the alkanolamine include monoethanolamine, monopropanolamine, and isopropanolamine.

Examples of the bisphenol include bisphenol A.

Examples of the aromatic diamine include diphenylmethanediamine, tolylenediamine, and xylylenediamine.

Examples of the compound having three or more of at least one of a hydroxyl group or an amino group include polyols, such as trimethylolpropane, ditrimethylolpropane, pentaerythritol, and dipentaerythritol; amino alcohols, such as 1-amino-2,3-propanediol, 1-methylamino-2,3-propanediol, and N-(2-hydroxypropylethanolamine); an ethylene oxide or propylene oxide adduct of tetramethylxylylenediamine.

Polyisobutylene-Based Resin

The polyisobutylene-based resin (hereinafter also referred to as a "PIB-based resin") that can be used as the pressure sensitive adhesive resin is not particularly limited as long as it is a resin having a polyisobutylene backbone in at least one of a main chain or a side chain.

The mass average molecular weight (Mw) of the PIB-based resin is preferably 20000 or higher, more preferably from 30000 to 1000000, even more preferably from 50000 to 800000, and still more preferably from 70000 to 600000.

Examples of the PIB-based resin include a polyisobutylene, which is a homopolymer of isobutylene; a copolymer of isobutylene and isoprene; a copolymer of isobutylene and n-butene, a copolymer of isobutylene and butadiene; and a halogenated butyl rubber, such as those obtained by bromination or chlorination of these copolymers.

When the PIB-based resin is a copolymer, the constitutional unit composed of isobutylene shall be contained in the largest amount among all constitutional units.

The content of the constitutional unit composed of isobutylene is preferably from 80 to 100 mass %, more preferably from 90 to 100 mass %, and even more preferably from 95 to 100 mass % in all constitutional unit(s) (100 mass %) of the PIB-based resin.

These PIB-based resins may be used alone or in combination of two or more.

In addition, when the PIB-based resin is used, a PIB-based resin with a high mass average molecular weight (Mw) and a PIB-based resin with a low mass average molecular weight (Mw) are preferably used in combination.

More specifically, a PIB-based resin (pb1) with a mass average molecular weight (Mw) of 270000 to 600000 (hereinafter also referred to as a "PIB-based resin (pb1)") and a PIB-based resin (pb2) with a mass average molecular weight (Mw) from 50000 to 250000 (hereinafter also referred to as a "PIB-based resin (pb2)") are preferably used in combination.

Using the PIB-based resin (pb1) with a high mass average molecular weight (Mw) can improve the durability and weather resistance of the pressure sensitive adhesive layer to be formed as well as the pressure sensitive adhesion strength.

In addition, using the PIB-based resin (pb2) with a low mass average molecular weight (Mw) can favorably compatibilize the PIB-based resin (pb2) with the PIB-based resin (pb1) and moderately plasticize the PIB-based resin (pb1), and can enhance the wettability of the pressure sensitive adhesive layer to an adherend, and can improve pressure sensitive adhesive physical properties, flexibility, and the like.

The mass average molecular weight (Mw) of the PIB-based resin (pb1) is preferably from 270000 to 600000, more preferably from 290000 to 480000, even more preferably from 310000 to 450000, and still more preferably from 320000 to 400000.

The mass average molecular weight (Mw) of the PIB-based resin (pb2) is preferably from 50000 to 250000, more preferably from 80000 to 230000, even more preferably from 140000 to 220000, and still more preferably from 180000 to 210000.

The content proportion of the PIB-based resin (pb2) relative to 100 parts by mass of the PIB-based resin (pb1) is preferably from 5 to 55 parts by mass, more preferably from 6 to 40 parts by mass, even more preferably from 7 to 30 parts by mass, and still more preferably from 8 to 20 parts by mass.

Olefin-Based Resin

The olefin-based resin that can be used as the pressure sensitive adhesive resin is not particularly limited as long as it is a polymer having a constitutional unit derived from an olefin compound, such as ethylene and propylene.

The olefin-based resin may be used alone or in combination of two or more.

Specific examples of the olefin-based resin include polyethylenes, such as low density polyethylenes, medium density polyethylenes, high density polyethylenes, and linear low density polyethylenes; polypropylenes; copolymers of ethylene and propylene; copolymers of ethylene and another α-olefin; copolymers of propylene and another α-olefin; copolymers of ethylene, propylene, and another α-olefin; and copolymers of ethylene and another ethylenically unsaturated monomer (such as ethylene-vinyl acetate copolymers and ethylene-alkyl (meth)acrylate copolymers).

Examples of the α-olefin include 1-butene, 1-pentene, 1-hexene, 1-heptene, 1-octene, 4-methyl-1-pentene, and 4-methyl-1-hexene.

Examples of the ethylenically unsaturated monomer include vinyl acetate, alkyl (meth)acrylates, and vinyl alcohols.

Acrylic Urethane-Based Resin

Examples of the acrylic urethane-based resin that can be used as the pressure sensitive adhesive resin include those obtained by appropriately adjusting the type and amount of a monomer component, a crosslinking agent, and the like so as to have pressure sensitive adhesiveness among the acrylic urethane-based resin described later and is not particularly limited as long as it has pressure sensitive adhesiveness.

Polyester-Based Resin

The polyester-based resin that can be used as the pressure sensitive adhesive resin is not particularly limited as long as it has pressure sensitive adhesiveness. Examples of the principal component of the polyester-based resin (a resin component contained in the largest amount (amount to be used) in the polyester-based resin) include random copolymers of an aromatic acid component, such as terephthalic acid, isophthalic acid, methylterephthalic acid, or naphthalenedicarboxylic acid, and a glycol component, such as ethylene glycol, diethylene glycol, butylene glycol, or neopentyl glycol. Polyester-based pressure sensitive adhesives obtained by using the polyester-based resin are composed of a polyester, a solvent, a crosslinking agent, and a tackifier, and the crosslinking system utilized includes methylol group condensation, ionic crosslinking, isocyanate crosslinking, and epoxy crosslinking.

Tackifier

In an embodiment of the present invention, to further improve the pressure sensitive adhesion strength of the pressure sensitive adhesive layer (XA), the composition (x) containing the pressure sensitive adhesive resin preferably further contains a tackifier. In addition, as described below, the pressure sensitive adhesion strength of the pressure sensitive adhesive layer (XA) is preferably greater than the pressure sensitive adhesion strength of the pressure sensitive adhesive layer (Z) described below. Thus, in forming such a configuration, the composition (x) to form the pressure sensitive adhesive layer (XA) preferably contains a tackifier, and more preferably, the composition (x) to form the pressure sensitive adhesive layer (XA) contains a tackifier, and a composition (z) to form the pressure sensitive adhesive layer (Z) contains no tackifier.

Here, the "tackifier" is a component improving the pressure sensitive adhesion strength of the pressure sensitive adhesive resin in an auxiliary manner and refers to oligomers with a mass average molecular weight (Mw) of less than 10000 and is distinguished from the pressure sensitive adhesive resin described above.

The mass average molecular weight (Mw) of the tackifier is preferably from 400 to 10000, more preferably from 500 to 8000, and even more preferably from 800 to 5000.

Examples of the tackifier include rosin-based resins, such as rosin resins, rosin ester resins, and rosin-modified phenol resins; hydrogenated rosin-based resins obtained by hydrogenation of these rosin-based resins; terpene-based resins, such as terpene resins, aromatic modified terpene resins, and terpene phenol-based resins; hydrogenated terpene-based resins obtained by hydrogenation of these terpene-based resins; styrene-based resins obtained by copolymerization of a styrene-based monomer, such as α-methylstyrene or β-methylstyrene, and an aliphatic monomer; hydrogenated styrene-based resins obtained by hydrogenation of these styrene-based resins; C5-based petroleum resins obtained by copolymerization of a C5 fraction, such as pentene, isoprene, piperine, or 1,3-pentadiene, produced by thermal cracking of petroleum naphtha, and hydrogenated petroleum resins of these C5-based petroleum resins; and C9-based petroleum resins obtained by copolymerization of a C9 fraction, such as indene and vinyltoluene, produced by thermal cracking of petroleum naphtha, and hydrogenated petroleum resins of these C9-based petroleum resins.

These tackifiers may be used alone or in combination of two or more differing in a softening point or a structure.

The softening point of the tackifier is preferably from 60 to 170° C., more preferably from 65 to 160° C., and even more preferably from 70 to 150° C.

In the present specification, the "softening point" of the tackifier means a value measured in accordance with JIS K2531.

In addition, when two or more tackifiers are used, a weighted average of the softening points of the plurality of the tackifiers is preferably within the above range.

In the composition (x) containing a tackifier, the content of the tackifier in the composition (x) is preferably from 0.01 to 65 mass %, more preferably from 0.05 to 55 mass %, even more preferably from 0.1 to 50 mass %, still more preferably from 0.5 to 45 mass %, and still even more preferably from 1.0 to 40 mass % in a total amount (100 mass %) of active components in the composition (x).

The total content of the pressure sensitive adhesive resin and the tackifier in the composition (x) is preferably from 70 mass % or higher, more preferably 80 mass % or higher, even more preferably 85 mass % or higher, still more preferably 90 mass % or higher, and still even more preferably 95 mass % or higher in a total amount (100 mass %) of an active component(s) of the composition (x).

Crosslinking Agent

In an embodiment of the present invention, the composition (x) preferably further contains a crosslinking agent together with the pressure sensitive adhesive resin having a functional group, such as the acrylic copolymer having the constitutional units (a1) and (a2).

The crosslinking agent reacts with the functional group contained in the pressure sensitive adhesive resin to crosslink the resins together.

Examples of the crosslinking agent include isocyanate-based crosslinking agents, such as tolylene diisocyanate, xylylene diisocyanate, hexamethylene diisocyanate, and adducts of these; epoxy-based crosslinking agents, such as ethylene glycol glycidyl ether; aziridine-based crosslinking agents, such as hexa[1-(2-methyl)-aziridinyl]triphosphatriazine; and chelate-based crosslinking agents, such as aluminum chelates.

These crosslinking agents may be used alone or in combination of two or more. Of these, the crosslinking agent is preferably an isocyanate-based crosslinking agent from the viewpoint of increasing cohesive strength to improve the pressure sensitive adhesion strength and from the viewpoint of ease of availability and the like.

The content of the crosslinking agent is appropriately adjusted by the number of functional groups contained in the pressure sensitive adhesive resin. The content is preferably from 0.01 to 10 parts by mass, more preferably from 0.03 to 7 parts by mass, and even more preferably from 0.05 to 4 parts by mass relative to 100 parts by mass of the pressure sensitive adhesive resin having a functional group, such as the acrylic copolymer described above.

Additive for Pressure Sensitive Adhesive

In an embodiment of the present invention, the composition (x) may contain an additive for pressure sensitive adhesives that is used in typical pressure sensitive adhesives, the additive other than the tackifier and crosslinking agent described above, within a range where the effects of the present invention are not impaired.

Examples of the additive for pressure sensitive adhesives include antioxidants, softeners (plasticizers), slip agents, rust inhibitors, retarders, catalysts, light stabilizers, antistatic agents, and ultraviolet absorbers.

These additives for pressure sensitive adhesives may each be used alone or in combination of two or more.

When these additives for pressure sensitive adhesives are contained, the content of each additive for pressure sensitive adhesives is each independently preferably from 0.0001 to 20 parts by mass and more preferably from 0.001 to 10 parts by mass relative to 100 parts by mass of the pressure sensitive adhesive resin.

Diluent Solvent

In an embodiment of the present invention, the composition (x) may contain water or an organic solvent as a diluent solvent together with the various active components described above to be formed into a solution.

Examples of the organic solvent include toluene, xylene, ethyl acetate, butyl acetate, methyl ethyl ketone, diethyl ketone, methyl isobutyl ketone, methanol, ethanol, isopropyl alcohol, tert-butanol, s-butanol, acetylacetone, cyclohexanone, n-hexane, and cyclohexane.

These diluent solvents may be used alone or in combination of two or more.

When the composition (x) contains a diluent solvent and is in the form of a solution, the concentrations of the active components of the composition (x) are preferably from 1 to 65 mass %, more preferably from 5 to 60 mass %, even more preferably from 10 to 50 mass %, and still more preferably from 25 to 45 mass %.

The pressure sensitive adhesion strength of the layer (XA) is preferably 1.0 N/25 mm or greater, more preferably 5.0 N/25 mm or greater, even more preferably 10.0 N/25 mm or greater, and still more preferably 14.0 N/25 mm or greater. In addition, the upper limit of the pressure sensitive adhesion strength of the layer (XA) is not particularly limited, but is preferably 40.0 N/25 mm or less, more preferably 35.0 N/25 mm or less, even more preferably 30.0 N/25 mm or less, and still more preferably 25.0 N/25 mm or less.

When the layer in contact with the layer (Y) is the layer (XA), the pressure sensitive adhesion strength of the layer (XA) is preferably 1.0 N/25 mm or greater, more preferably 5.0 N/25 mm or greater, even more preferably 10.0 N/25 mm or greater, still more preferably 14.0 N/25 mm or greater, and still even more preferably 18.0 N/25 mm or greater.

With the pressure sensitive adhesion strength of the layer (XA) satisfying the above range, peeling is less likely to occur at the interface between the layer (Y) and the pressure sensitive adhesive layer (XA) when the peel detection label is peeled, and the layer (XA) itself is less likely to be broken, and thus adhesive residue to an adherend can be presumably prevented more effectively; thus, this is preferred.

In addition, the upper limit of the pressure sensitive adhesion strength of the layer (XA) is not particularly limited, but is preferably 40.0 N/25 mm or less, more preferably 35.0 N/25 mm or less, even more preferably 30.0 N/25 mm or less, and still more preferably 25.0 N/25 mm or less.

The value of the pressure sensitive adhesion strength of the layer (XA) can be measured specifically by the method described in Examples.

Furthermore, the value of the pressure sensitive adhesion strength of the layer (XA) can also be adjusted, for example, by selecting the type of each component forming the layer (XA), such as the pressure sensitive adhesive resin, tackifier, crosslinking agent, and additive for pressure sensitive adhesives, described above, and adjusting their contents.

In addition, when the layer (X) is the laminate (Ln), the shear storage elastic modulus G' at 23° C. of the layer (XA) is, as a preferred embodiment of the peel detection label, preferably $1.5 \times 10^4$ Pa or greater, more preferably $3.0 \times 10^4$ Pa or greater, and even more preferably $6.0 \times 10^4$ Pa or greater, and preferably $2.0 \times 10^5$ Pa or less, more preferably $1.0 \times 10^5$ Pa or less, and even more preferably $9.0 \times 10^4$ Pa or less.

The value of the shear storage elastic modulus G' at 23° C. of the layer (XA) can be measured specifically by the method described in Examples.

In addition, examples of a layer (XQ) that may be included in the layer (X) and is a layer other than the pressure sensitive adhesive layer (XA) include layers formed from one or more types of resins selected from the group consisting of acrylic resins, such as poly(meth)acrylates and polymethyl (meth)acrylates; urethane-based resins; acrylic urethane-based resins; and polyamide resins; excluding the pressure sensitive adhesive resins described above. Of these, the layer (XQ) is exemplified by layers formed from an energy ray-curable resin. Examples of the energy ray-curable resin include one or more types selected from energy ray-curable urethane-based resins and energy ray-curable acrylic urethane-based resins.

In addition, when the layer (X) is the laminate (Ln), the shear storage elastic modulus G' at 23° C. of the layer (XQ) is, as a preferred embodiment of the peel detection label, preferably greater than $9.0 \times 10^4$ Pa, more preferably $1.0 \times 10^5$ Pa or greater, and even more preferably $3.0 \times 10^5$ Pa or greater, and preferably $15.0 \times 10^5$ Pa or less, more preferably $10.0 \times 10^5$ Pa or less, and even more preferably $9.0 \times 10^5$ Pa or less.

The value of the shear storage elastic modulus G' at 23° C. of the layer (XQ) can be measured specifically by the method described in Examples.

In an embodiment of the present invention, the layer (XQ) may contain an antiblocking agent, such as silica, as desired within a range where the effects of the present invention are not impaired in addition to the tackifier, crosslinking agent, and additive for pressure sensitive adhesives described above.

For example, in an embodiment such as the pressure sensitive adhesive laminate 12 illustrated in FIG. 3, when the first layer (X1) 7 is the layer (XQ), after obtaining a laminate including the backing 1, the pattern layer 2, and the layer (X1) 7 laminated in this order, the laminate may be temporarily wound into a roll in the state of the laminate for storage or the like before moving to the next process. In this case, the layer (X1) 7 contains an antiblocking agent and thus can presumably reduce the risk of blocking between the layer (X1) 7 and the surface of the backing, the surface on the opposite side from the pattern layer side.

The content of the antiblocking agent when contained in the layer (XQ) is preferably from 0.001 to 10 parts by mass and more preferably from 0.01 to 1 part by mass relative to 100 parts by mass of the resin component forming the layer (XQ).

Substrate Layer (Y)

The substrate layer (Y) is preferably a layer having a tensile storage elastic modulus E' at 23° C. (hereinafter also referred to as an "elastic modulus E'") of 10 MPa or greater and 800 MPa or less from the viewpoint of achieving both prevention of adhesive residue to an adherend and even better pattern expressibility.

In addition, from the viewpoint of achieving both prevention of adhesive residue to an adherend and even better pattern expressibility, the elastic modulus E' of the layer (Y) is more preferably 15 MPa or greater, even more preferably 18 MPa or greater, still more preferably 50 MPa or greater, still even more preferably 100 MPa or greater, and still even more preferably 200 MPa or greater, and more preferably 700 MPa or less, even more preferably 600 MPa or less, still more preferably 500 MPa or less, still even more preferably 400 MPa or less, and yet even more preferably 300 MPa or less.

Furthermore, from the viewpoint of obtaining even better pattern expressibility, the layer (Y) is preferably a layer having a higher elastic modulus E' than the elastic modulus E' of the backing.

The value of the elastic modulus E' of the layer (Y) means a value of a tensile storage elastic modulus E' at 23° C. measured by a tensile method when the value exceeds 100 MPa. Moreover, when the value measured by a tensile method is 100 MPa or less, the value of the elastic modulus E' of the layer (Y) means a value of a tensile storage elastic modulus E' at 23° C. converted from a shear storage elastic modulus G' at 23° C. measured by a torsional shear method. Specifically, the value can be measured by the method described in Examples.

Still more, the value of the elastic modulus E' of the layer (Y) can also be adjusted, for example, by selecting the type of each component forming the layer (Y), such as a resin, a crosslinking agent, a catalyst, and an additive described later, and adjusting their contents.

The layer (Y) is preferably a layer satisfying the elastic modulus E', and, for example, of the plastic films described in the section of the backing, a plastic film satisfying the elastic modulus E' can also be used as a preferred embodiment of the layer (Y). When the plastic film is used, from the viewpoint of transparency, costs, and versatility, the film is preferably a film formed from an acrylic urethane-based resin, an olefin-based resin, a polyamide, or a polyester-based resin. In addition, the layer (Y) may be a layer formed by drying a coating made from a composition containing a non-pressure sensitive adhesive resin.

Furthermore, a more preferred layer (Y) is a layer formed from a composition (y) containing one or more types of non-pressure sensitive adhesive resins (y1) selected from the group consisting of acrylic urethane-based resins and olefin-based resins. The layer (Y) is even more preferably a layer formed by drying a coating (y') made from the composition (y) containing one or more types of non-pressure sensitive adhesive resins (y1) selected from the group consisting of acrylic urethane-based resins and olefin-based resins.

When the layer (Y) is a layer formed by drying the coating (y') made from the composition (y), the layer (Y) becomes a non-oriented film-like material or sheet-like material and thus has remarkably excellent flexibility compared to a layer (Y) composed of a plastic film or sheet obtained by a method, such as, for example, melt extrusion molding.

Thus, when the layer (Y) is a layer formed by drying the coating (y') made from the composition (y), the layer (Y) more readily causes deformation necessary for the pattern expression when the peel detection label is peeled, and the pressure sensitive adhesive laminate becomes less likely to break also when a larger tensile stress generates within the peel detection label. This presumably allows the peel detection label to achieve both even better pattern expressibility and adhesive residue preventive properties.

Here, the "non-oriented film-like material or sheet-like material" is synonymous with the "non-oriented film" described in the present specification except for changing "film" to "film-like material or sheet-like material".

Composition (y)

The composition (y), which is the material for forming the layer (Y), is preferably a composition containing one or more types of non-pressure sensitive adhesive resins (y1) selected from the group consisting of acrylic urethane-based resins and olefin-based resins.

In an embodiment of the present invention, a component other than the non-pressure sensitive adhesive resin (y1) contained in the composition (y) can be appropriately adjusted according to the intended use of the peel detection label of the present invention.

For example, in an embodiment of the present invention, the composition (y) may contain a resin other than the acrylic urethane-based resin and the olefin-based resin within a range where the effects of the present invention are not impaired, and in addition, may contain one or more types selected from the group consisting of diluent solvents and other additives.

Non-Pressure Sensitive Adhesive Resin (Y1)

The non-pressure sensitive adhesive resin (y1) is preferably a resin belonging to acrylic urethane-based resins or olefin-based resins and is more preferably an acrylic urethane-based resin.

When the non-pressure sensitive adhesive resin (y1) is a copolymer having two or more constitutional units, the form of the copolymer is not particularly limited, and the copolymer may be any of a block copolymer, a random copolymer, or a graft copolymer.

Furthermore, in an embodiment of the present invention, from the viewpoint of further improving the interfacial adhesion between the layer (Y) and the layer (X) and/or the interfacial adhesion between the layer (Y) and the layer (Z), the non-pressure sensitive adhesive resin (y1) contained in the composition (y) is preferably an ultraviolet non-curable resin having no polymerizable functional group.

The content of the non-pressure sensitive adhesive resin (y1) in the composition (y) is preferably from 50 to 100 mass %, more preferably from 65 to 100 mass %, even more preferably from 80 to 98 mass %, and still more preferably from 90 to 96 mass % in a total amount (100 mass %) of an active component(s) of the composition (y).

Acrylic Urethane-Based Resin

Examples of the acrylic urethane-based resin include a reaction product of an acrylic polyol compound and an isocyanate compound, and a copolymer formed by polymerization of a linear urethane prepolymer (UY) having ethylenically unsaturated groups at both ends and a vinyl compound (VY) containing a (meth)acrylic ester.

The acrylic urethane-based resin (hereinafter also referred to as the "acrylic urethane-based resin (I)"), which is a reaction product of an acrylic polyol compound and an isocyanate compound, has a chemical structure having main chains of the acrylic resin as backbones that are intermolecularly crosslinked by urethane bonds and cured.

The acrylic resin serving as the main chain has high rigidity, and thus, this makes the pressure sensitive adhesive laminate less likely to be broken by the tensile stress generated in the process of deformation of the peel detection label when the peel detection label is peeled. Thus, the acrylic urethane-based resin (I) can presumably contribute to improving the effect of preventing the occurrence of adhesive residue. Furthermore, the acrylic urethane-based resin (I) is also excellent in adhesion to the pressure sensitive adhesive resin contained in the layer (X) and/or the layer (Z) and thus can also presumably contribute to improving the interfacial adhesion to the layer (X) and/or the layer (Z). This effect can also presumably prevent the interfacial detachment between the layer (X) and the layer (Y) and/or the interfacial detachment between the layer (Z) and the layer (Y) in the pressure sensitive adhesive laminate and can presumably prevent the occurrence of adhesive residue more effectively.

From the same viewpoint, as described in the preferred embodiment of the layer (X), the layer in contact with the layer (Y) in the layer (X) is preferably the layer (XA).

On the other hand, the acrylic urethane-based resin (hereinafter also referred to as the "acrylic urethane-based resin (II)") that is a copolymer formed by polymerization of a linear urethane prepolymer (UY) having ethylenically unsaturated groups at both ends and a vinyl compound (VY) containing a (meth)acrylic ester is a copolymer having a main chain of the linear urethane prepolymer (UY) as a backbone and having constitutional units derived from the vinyl compound (VY) containing a (meth)acrylic ester at both ends of the linear urethane prepolymer (UY).

In the acrylic urethane-based resin (II), the moiety derived from the linear urethane prepolymer (UY) intervenes between the acrylic moieties in the main chain backbone, thus this makes the distance between the crosslinking points longer than that in the acrylic urethane-based resin (I), and the molecular structure is likely to be a two-dimensional structure (network structure).

In addition, the urethane prepolymer (UY) serving as the main chain is linear and thus has high stretching effect when an external force is applied. This makes the pressure sensitive adhesive laminate readily deformable conforming to the peel detection label in the process of deformation of the peel detection label when the peel detection label is peeled, and thus makes the pressure sensitive adhesive laminate less likely to break. Thus, the acrylic urethane-based resin (II) can presumably contribute to improving the effect of preventing the occurrence of adhesive residue.

Furthermore, a side chain of the constitutional unit derived from the vinyl compound (VY) containing a (meth) acrylic ester has a structure that are readily entangled with the pressure sensitive adhesive resin in the layer (X) and/or the layer (Z).

Thus, use of the acrylic urethane-based resin (II) as a material for forming the layer (Y) can presumably contribute to improving the interfacial adhesion to the layer (X) and/or the layer (Z). This effect can also presumably prevent the interfacial detachment between the layer (X) and the layer (Y) and/or the interfacial detachment between the layer (Z) and the layer (Y) in the pressure sensitive adhesive laminate and can presumably prevent the occurrence of adhesive residue more effectively.

The mass average molecular weight (Mw) of the acrylic urethane-based resin is preferably from 2000 to 500000, more preferably from 4000 to 300000, even more preferably from 5000 to 200000, and still more preferably from 10000 to 150000.

In an embodiment of the present invention, the acrylic urethane-based resin contained as the non-pressure sensitive adhesive resin (y1) in the composition (y) is preferably the acrylic urethane-based resin (II).

Hereinafter, the acrylic urethane-based resins (I) and (II) will be described.

Acrylic Urethane-Based Resin (I)

The acrylic polyol compound used as the raw material for the acrylic urethane-based resin (I) is preferably an acrylic copolymer (B1) having a constitutional unit (b1) derived from an alkyl (meth)acrylate (b1') (hereinafter also referred to as the "monomer (b1')") and a constitutional unit (b2) derived from a hydroxyl group-containing monomer (b2') (hereinafter also referred to as the "monomer (b2')").

The alkyl group contained in the monomer (b1') has preferably from 1 to 12, more preferably from 4 to 8, and even more preferably from 4 to 6 carbons.

The alkyl group contained in the monomer (b1') may be a linear alkyl group or a branched alkyl group.

Specific example of the monomer (b1') include the same as those for the monomer (a1') described above.

The monomer (b1') may be used alone or in combination of two or more.

However, the monomer (b1') is preferably butyl (meth) acrylate and 2-ethylhexyl (meth)acrylate, and more preferably butyl (meth)acrylate.

The content of the constitutional unit (b1) is preferably from 60 to 99.9 mass %, more preferably from 70 to 99.7 mass %, and even more preferably from 80 to 99.5 mass % relative to all constitutional units (100 mass %) of the acrylic copolymer (B1).

In addition, examples of the monomer (b2') include the same as the hydroxyl group-containing monomers that can be selected as the monomer (a2') described above.

The monomer (b2') may be used alone or in combination of two or more.

The content of the constitutional unit (b2) is preferably from 0.1 to 40 mass %, more preferably from 0.3 to 30 mass %, and even more preferably from 0.5 to 20 mass % in all constitutional units (100 mass %) of the acrylic copolymer (B1).

In addition, the acrylic copolymer (B1) may further have a constitutional unit (b3) derived from another monomer (b3') other than the monomers (b1') and (b2').

Examples of the monomer (b3') include functional group-containing monomers that can be selected as the monomer (a2') described above excluding the hydroxyl group-containing monomers, and the same as those for the monomer (a3') described above.

In the acrylic copolymer (B1), the content of the constitutional units (b1) and (b2) is preferably from 70 to 100 mass %, more preferably from 80 to 100 mass %, even more preferably from 90 to 100 mass %, and still more preferably from 95 to 100 mass % in all constitutional units (100 mass %) of the acrylic copolymer (B1).

On the other hand, examples of the isocyanate-based compound used as the raw material for the acrylic urethane-based resin (I) include the same as those for the polyvalent isocyanate compound used as the raw material for the urethane-based prepolymer (UX) described above.

However, from the viewpoint of stretchability when an external force is applied, the isocyanate-based compound is preferably an isocyanate-based compound having no aromatic ring, and more preferably an aliphatic polyisocyanate and an alicyclic polyisocyanate.

In the acrylic urethane-based resin (I), the ratio of the constitutional unit derived from the acrylic polyol compound to the constitutional unit derived from the isocyanate-based compound (acrylic polyol compound/isocyanate-based compound) in terms of mass ratio is preferably from 10/90 to 90/10, more preferably from 20/80 to 80/20, even more preferably from 30/70 to 70/30, and even more preferably from 40/60 to 60/40.

Acrylic Urethane-Based Resin (II)

Examples of the linear urethane prepolymer (UY) used as the raw material for the acrylic urethane-based resin (II) include reaction products of a diol and a diisocyanate compound.

The diol and the diisocyanate compound may be used alone or in combination of two or more.

The mass average molecular weight (Mw) of the linear urethane prepolymer (UY) is preferably from 1000 to 300000, more preferably from 3000 to 200000, even more preferably from 5000 to 100000, still more preferably from 10000 to 80000, and still even more preferably from 20000 to 60000.

Examples of the diol constituting the linear urethane prepolymer (UY) include alkylene glycols, polyether diols, polyester diols, polyester amide diols, polyester-polyether diols, and polycarbonate diols.

Of these, polycarbonate diols are preferred.

Examples of the diisocyanate compound constituting the linear urethane prepolymer (UY) include aromatic diisocyanates, aliphatic diisocyanates, and alicyclic diisocyanates, and alicyclic diisocyanates are preferred from the viewpoint of stretchability when an external force is applied.

Specific examples of the diisocyanate compound include compounds corresponding to a diisocyanate compound among compounds listed as examples of the polyvalent isocyanate used as the raw material for the urethane-based prepolymer (UX) described above.

In addition, the linear urethane prepolymer (UY) may be a compound obtained by performing a chain extension reaction using a chain extender together with a diol and a diisocyanate compound.

Examples of the chain extender include the same as those listed as examples of chain extenders that can be used in the synthesis of the urethane-based prepolymer (UX) described above.

In an embodiment of the present invention, the linear urethane prepolymer (UY) has ethylenically unsaturated groups at both ends.

Examples of the method for introducing ethylenically unsaturated groups to both ends of the linear urethane prepolymer (UY) include a method of reacting an NCO group at ends of the urethane prepolymer and a hydroxyalkyl (meth)acrylate, the urethane prepolymer obtained by reacting a diol and a diisocyanate compound.

Examples of the hydroxyalkyl (meth)acrylate include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

The vinyl compound (VY) used as the raw material for the acrylic urethane-based resin (II) contains at least a (meth)acrylic ester.

Examples of the (meth)acrylic ester include the same as those corresponding to a (meth)acrylic ester among the monomers (a1') to (a3') used as the raw material for the acrylic copolymer (A1) described above.

However, the (meth)acrylic ester is preferably one or more types selected from alkyl (meth)acrylates and hydroxyalkyl (meth)acrylates, and more preferably an alkyl (meth)acrylate and a hydroxyalkyl (meth)acrylate are used in combination.

When an alkyl (meth)acrylate and a hydroxyalkyl (meth)acrylate are used in combination, the blending proportion of the hydroxyalkyl (meth)acrylate to 100 parts by mass of the alkyl (meth)acrylate is preferably from 0.1 to 100 parts by mass, more preferably from 0.2 to 90 parts by mass, even more preferably from 0.5 to 30 parts by mass, still more preferably from 1.0 to 20 parts by mass, and still even more preferably from 1.5 to 10 parts by mass.

The alkyl group contained in the alkyl (meth)acrylate has preferably from 1 to 24, more preferably from 1 to 12, even more preferably from 1 to 8, and still more preferably from 1 to 3 carbons.

Examples of the alkyl (meth)acrylate include the same as those listed as examples of the monomer (a1') used as the raw material for the acrylic copolymer (A1) described above.

In addition, examples of the hydroxyalkyl (meth)acrylate include the same as those listed as examples of the hydroxyalkyl (meth)acrylate used to introduce ethylenically unsaturated groups to both ends of the linear urethane prepolymer (UY) described above.

Examples of vinyl compounds other than (meth)acrylic esters include aromatic hydrocarbon-based vinyl compounds, such as styrene, α-methylstyrene, and vinyl toluene; vinyl ethers, such as methyl vinyl ether and ethyl vinyl ether; and polar group-containing monomers, such as vinyl acetate, vinyl propionate, (meth)acrylonitrile, N-vinyl pyrrolidone, (meth)acrylic acid, maleic acid, fumaric acid, itaconic acid, and (meth)acrylamide.

These may be used alone or in combination of two or more.

In an embodiment of the present invention, the content of the (meth)acrylic ester in the vinyl compound(s) (VY) used as the raw material for the acrylic urethane-based resin (II) is preferably from 40 to 100 mass %, more preferably from 65 to 100 mass %, even more preferably from 80 to 100 mass %, and still more preferably 90 to 100 mass % in a total amount (100 mass %) of the vinyl compound(s) (VY).

In an embodiment of the present invention, the total content of the alkyl (meth)acrylate and the hydroxyalkyl (meth)acrylate in the vinyl compound(s) (VY) used as the raw material for the acrylic urethane-based resin (II) is preferably from 40 to 100 mass %, more preferably from 65 to 100 mass %, even more preferably from 80 to 100 mass %, and still more preferably from 90 to 100 mass % in a total amount (100 mass %) of the vinyl compound(s) (VY).

The acrylic urethane-based resin (II) can be obtained by polymerizing raw materials, a linear urethane prepolymer (UY) and a vinyl compound (VY).

Specific examples of the polymerization method include a method of synthesizing by blending a radical-generating agent together with raw materials, a linear urethane prepolymer (UY) and a vinyl compound (VY), in an organic solvent, followed by a radical polymerization reaction of the vinyl-based compound (VY) starting from the ethylenically unsaturated groups contained at both ends of the linear urethane prepolymer (UY).

Examples of the radical-generating agent used include diazo compounds, such as 2,2'-azobis(2-methylbutyronitrile) and azobisisobutyronitrile; and organic peroxides, such as benzoyl peroxide.

In this radical polymerization reaction, a chain transfer agent, such as a thiol group-containing compound, may be added to the solvent to adjust the degree of polymerization of the acryl.

In the acrylic urethane-based resin (II) used in an embodiment of the present invention, the content ratio of the constitutional unit derived from the linear urethane prepolymer (UY) to the constitutional unit derived from the vinyl compound (VY) [(UY)/(VY)] in terms of mass ratio is preferably from 10/90 to 80/20, more preferably from 20/80 to 70/30, even more preferably from 30/70 to 60/40, and still more preferably from 35/65 to 55/45.

Olefin-Based Resin

The olefin-based resin contained as the non-pressure sensitive adhesive resin (y1) in the composition (y) is a polymer having at least a constitutional unit derived from an olefin monomer.

The olefin monomer is preferably an α-olefin having from 2 to 8 carbons, and specifically, examples include ethylene, propylene, butylene, isobutylene, and 1-hexene.

Of these, ethylene and propylene are preferred.

Specific examples of the olefin-based resin include polyethylene resins, such as very low density polyethylenes (VLDPE, density: 880 kg/m$^3$ or greater and less than 910 kg/m$^3$), low density polyethylenes (LDPE, density: 910 kg/m$^3$ or greater and less than 915 kg/m$^3$), medium density polyethylenes (MDPE, density: 915 kg/m$^3$ or greater and less than 942 kg/m$^3$), high density polyethylenes (HDPE, density: 942 kg/m$^3$ or greater), and linear low density polyethylenes; polypropylene resins (PP); polybutene resins (PB); ethylene-propylene copolymers; olefin-based elastomers (TPO); ethylene-vinyl acetate copolymers (EVA); and olefin-based terpolymers, such as ethylene-propylene-(5-ethylidene-2-norbornene).

In an embodiment of the present invention, the olefin-based resin may be a modified olefin-based resin obtained by further subjecting to one or more types of modifications selected from an acid modification, a hydroxyl group modification, and an acrylic modification.

Examples of the acid-modified olefin-based resin obtained by acid-modifying the olefin-based resin include modified polymers obtained by graft polymerization of an unsaturated carboxylic acid or its anhydride to the unmodified olefin-based resin described above.

Examples of the unsaturated carboxylic acid or its anhydride include maleic acid, fumaric acid, itaconic acid, citraconic acid, glutaconic acid, tetrahydrophthalic acid, aconitic acid, (meth)acrylic acid, maleic anhydride, itaconic anhydride, glutaconic anhydride, citraconic anhydride, aconitic anhydride, norbornene dicarboxylic anhydride, and tetrahydrophthalic anhydride.

The unsaturated carboxylic acid or its anhydride may be used alone or in combination of two or more.

Examples of the acrylic-modified olefin-based resin obtained by acrylic-modifying the olefin-based resin include modified polymers obtained by graft polymerization of an alkyl (meth)acrylate as a side chain to the unmodified olefin-based resin described above, which is the main chain.

The alkyl group contained in the alkyl (meth)acrylate has preferably from 1 to 20, more preferably from 1 to 16, and even more preferably from 1 to 12 carbons.

Examples of the alkyl (meth)acrylate include the same as the compounds that can be selected as the monomer (a1') described above.

Examples of the hydroxyl group-modified olefin-based resin obtained by hydroxyl group-modifying the olefin-based resin include modified polymers obtained by graft polymerization of a hydroxyl group-containing compound to the unmodified olefin-based resin described above, which is the main chain.

Examples of the hydroxyl group-containing compound include the same as the hydroxyl group-containing monomers that can be selected as the monomer (a2') described above.

The mass average molecular weight (Mw) of the olefin-based resin is preferably from 2000 to 1000000, more preferably from 10000 to 500000, even more preferably from 20000 to 400000, and still more preferably from 50000 to 300000.

Resin Other than Acrylic Urethane-Based Resin and Olefin-Based Resin

In an embodiment of the present invention, the composition (y) may contain a resin other than the acrylic urethane-based resin and the olefin-based resin within a range where the effects of the present invention are not impaired.

Examples of such a resin include vinyl-based resins, such as poly(vinyl chloride)s, poly(vinylidene chloride)s, poly(vinyl alcohol)s, ethylene-vinyl acetate copolymers, and ethylene-vinyl alcohol copolymers; polyester-based resins, such as poly(ethylene terephthalate)s, poly(butylene terephthalate)s, and poly(ethylene naphthalate)s; polystyrenes; acrylonitrile-butadiene-styrene copolymers; cellulose triacetates; polycarbonates; polyurethanes not corresponding to the acrylic urethane-based resins; poly(methylpentene)s; polysulfones; poly(ether ether ketone)s; poly(ether sulfone)s; poly(phenylene sulfide)s; polyimide-based resins, such as poly(ether imide)s and polyimide; polyamide-based resins; acrylic resins; and fluorine-based resins.

However, from the viewpoint of further improving the interfacial adhesion between the layer (Y) and the layer (X) and/or the interfacial adhesion between the layer (Y) and the layer (Z), the content proportion of the resin other than the acrylic urethane-based resin and the olefin-based resin in the composition (y) is preferably low.

A specific content proportion of the resin other than the acrylic urethane-based resin and the olefin-based resin is preferably less than 30 parts by mass, more preferably less than 20 parts by mass, even more preferably less than 10 parts by mass, still more preferably less than 5 parts by mass, and still even more preferably less than 1 part by mass relative to a total amount 100 parts by mass of the non-pressure sensitive adhesive resin (y1) selected from the group consisting of the acrylic urethane-based resin and the olefin-based resin contained in the composition (y).

Crosslinking Agent

In an embodiment of the present invention, the composition (y) when containing an acrylic urethane-based resin preferably further contains a crosslinking agent to crosslink the acrylic urethane-based resin.

Examples of the crosslinking agent include isocyanate-based compounds as a crosslinking agent.

For the isocyanate-based compound as a crosslinking agent, an isocyanate-based compound of various types can be used provided that it reacts with a functional group of the acrylic urethane-based resin to form a crosslinked structure.

The isocyanate-based compound is preferably a polyisocyanate compound having two or more isocyanate groups per molecule.

Examples of the polyisocyanate compound include diisocyanate compounds, triisocyanate compounds, tetraisocyanate compounds, pentaisocyanate compounds, and hexaisocyanate compounds. More specifically, examples include aromatic polyisocyanate compounds, such as tolylene diisocyanate, diphenylmethane diisocyanate, and xylylene diisocyanate; alicyclic isocyanate compounds, such as dicyclohexylmethane-4,4-diisocyanate, bicycloheptane triisocyanate, cyclopentylene diisocyanate, cyclohexylene diisocyanate, methylcyclohexylene diisocyanate, and hydrogenated xylylene diisocyanate; aliphatic isocyanate compounds, such as pentamethylene diisocyanate, hexamethylene diisocyanate, heptamethylene diisocyanate, trimethylhexamethylene diisocyanate, and lysine diisocyanate.

In addition, modified products of these isocyanate compounds can also be used, including biuret products or isocyanurate products, or adducts that are reaction products of these isocyanate compounds with a non-aromatic low molecular weight active hydrogen-containing compound, such as ethylene glycol, trimethylolpropane, or castor oil.

Of these, the isocyanate-based compound is preferably an aliphatic isocyanate compound, more preferably an aliphatic diisocyanate compound, and even more preferably pentamethylene diisocyanate, hexamethylene diisocyanate, or heptamethylene diisocyanate.

In the composition (y), one of the isocyanate-based compounds may be used alone, or two or more may be used in combination.

For the content proportion of the acrylic urethane-based resin and the isocyanate-based compound as the crosslinking agent in the composition (y), the content proportion of the isocyanate-based compound as the crosslinking agent is preferably from 1 to 30 parts by mass, more preferably from 2 to 20 parts by mass, and even more preferably from 3 to 15 parts by mass relative to 100 parts by mass in total of the acrylic urethane-based resin in terms of solid content.

Catalyst

In an embodiment of the present invention, when the composition (y) contains an acrylic urethane-based resin and the crosslinking agent, the composition (y) preferably further contains a catalyst together with the crosslinking agent.

The catalyst is preferably a metal-based catalyst and more preferably a metal-based catalyst excluding tin-based compounds having a butyl group.

Examples of the metal-based catalyst include tin-based catalysts, bismuth-based catalysts, titanium-based catalysts, vanadium-based catalysts, zirconium-based catalysts, aluminum-based catalysts, and nickel-based catalysts. Of these, the metal-based catalyst is preferably a tin-based catalyst or a bismuth-based catalyst and more preferably a tin-based catalyst excluding tin-based compounds having a butyl group, or a bismuth-based catalyst.

The tin-based catalyst is an organometallic compound of tin, and examples include compounds having a structure, such as an alkoxide, a carboxylate, or a chelate; and preferably acetylacetone complexes, acetylacetonates, octylic acid compounds, or naphthenic acid compounds of those metals.

In addition, similarly, the bismuth-based catalyst, the titanium-based catalyst, the vanadium-based catalyst, the zirconium-based catalyst, the aluminum-based catalyst, or the nickel-based catalyst is an organometallic compound of bismuth, titanium, vanadium, zirconium, aluminum, or nickel, respectively. Examples include compounds having a structure, such as an alkoxide, a carboxylate, or a chelate; and preferably acetylacetone complexes, acetylacetonates, octylic acid compounds, or naphthenic acid compounds of those metals.

Specific examples of the acetylacetone complex of a metal include acetylacetone tin, acetylacetone titanium, acetylacetone vanadium, acetylacetone zirconium, acetylacetone aluminum, and acetylacetone nickel.

Specific examples of the acetylacetonate include tin acetylacetonate, bismuth acetylacetonate, titanium acetylacetonate, vanadium acetylacetonate, zirconium acetylacetonate, aluminum acetylacetonate, and nickel acetylacetonate.

Specific examples of the octylic acid compound include bismuth 2-ethylhexylate, nickel 2-ethylhexylate, zirconium 2-ethylhexylate, and tin 2-ethylhexylate.

Specific examples of the naphthenic acid compound include bismuth naphthenate, nickel naphthenate, zirconium naphthenate, and tin naphthenate.

The tin-based catalyst is preferably a tin compound represented by a general formula $R_pSn(L)_{(4-p)}$, where R is an alkyl group having from 1 to 25 carbons, preferably an alkyl group having from 1 to 3 or from 5 to 25 carbons, or an aryl group; L is an organic group other than an alkyl group or an aryl group, or an inorganic group; and p is 1, 2, or 4.

In the general formula $R_pSn(L)_{(4-p)}$, the alkyl group represented by R is more preferably an alkyl group having from 5 to 25 carbons and even more preferably an alkyl group having from 5 to 20 carbons; and the aryl group represented by R is not particularly limited with respect to the number of carbons but is preferably an aryl group having from 6 to 20 carbons. In the tin compound having a plurality of R's, two or more, per molecule, each R may be identical or different.

In addition, L is preferably an aliphatic carboxylic acid having from 2 to 20 carbons, an aromatic carboxylic acid, or an aromatic sulfonic acid, and more preferably an aliphatic carboxylic acid having from 2 to 20 carbons. Examples of the aliphatic carboxylic acid having from 2 to 20 carbons include an aliphatic monocarboxylic acid having from 2 to 20 carbons and an aliphatic dicarboxylic acid having from 2 to 20 carbons. In the tin compound having a plurality of L's, two or more, per molecule, each L may be identical or different.

In the composition (y1), one of the catalysts may be used alone, or two or more may be used in combination.

For the content proportion of the acrylic urethane-based resin and the catalyst in the composition (y1), the content proportion of the catalyst is preferably from 0.001 to 5 parts by mass, more preferably from 0.01 to 3 parts by mass, and even more preferably from 0.1 to 2 parts by mass relative to 100 parts by mass in total of the acrylic urethane-based resin in terms of solid content.

Additive

In an embodiment of the present invention, the composition (y) may contain an additive within a range where the effects of the present invention are not impaired. For example, the composition (y) may contain an additive for substrates, the additive contained in a substrate included in a typical pressure sensitive adhesive sheet.

Examples of such an additive include ultraviolet absorbers, light stabilizers, antioxidants, antistatic agents, slipping agents, and anti-blocking agents.

These additives may each be used alone or in combination of two or more.

When the composition (y) contains these additives, the content of each additive is preferably from 0.0001 to 20 parts by mass and more preferably from 0.001 to 10 parts by mass relative to 100 parts by mass of the non-pressure sensitive adhesive resin.

Diluent Solvent

In an embodiment of the present invention, the composition (y) may contain water or an organic solvent as a diluent solvent together with the various active components described above to be formed into a solution.

Examples of the organic solvent include the same as the organic solvent used in preparing the composition (x) described above in the form of a solution.

The diluent solvent contained in the composition (y) may be used alone or in combination of two or more.

When the composition (y) contains a diluent solvent and is in the form of a solution, the concentrations of the active components of the composition (y) are each independently preferably from 0.1 to 60 mass %, more preferably from 0.5 to 50 mass %, and even more preferably from 1.0 to 40 mass %.

Pressure Sensitive Adhesive Layer (Z)

The pressure sensitive adhesive layer (Z) is preferably a layer formed from a composition (z) containing a pressure sensitive adhesive resin and more preferably a layer formed by drying a coating (z') made from the composition (z) containing a pressure sensitive adhesive resin.

Composition (z)

The composition (z), which is a material for forming the pressure sensitive adhesive layer (Z), contains a pressure sensitive adhesive resin. For the pressure sensitive adhesive resin, the same as the pressure sensitive adhesive resin described for the composition (x) described above can be used, and preferred embodiment and formulation (content) of the composition (z) are also the same as those of the composition (x).

However, the monomer (a1') for the acrylic resin of a preferred example of the pressure sensitive adhesive resin to form the layer (Z) is more preferably one or more types selected from the group consisting of 2-ethylhexyl (meth)acrylate, methyl (meth)acrylate, ethyl (meth)acrylate, and butyl (meth)acrylate, and even more preferably one or more types selected from the group consisting of 2-ethylhexyl (meth)acrylate and butyl (meth)acrylate. Similarly, the monomer (a2') for the acrylic resin of a preferred example of the pressure sensitive adhesive resin to form the pressure sensitive adhesive layer (Z) preferably contains both 2-hydroxyethyl (meth)acrylate and (meth)acrylic acid. Also similarly, the monomer (a3') for the acrylic resin of a preferred example of the pressure sensitive adhesive resin to form the pressure sensitive adhesive layer (Z) is preferably vinyl acetate. The acrylic resin of a preferred example of the pressure sensitive adhesive resin to form the pressure sensitive adhesive layer (Z) may or may not have a constitutional unit (a3) derived from the monomer (a3').

In an embodiment of the present invention, a component other than the pressure sensitive adhesive resin contained in the composition (z) can be appropriately adjusted according to the intended use of the peel detection label of the present invention.

For example, in an embodiment of the present invention, from the viewpoint of adjusting the pressure sensitive adhesion strength to a desired range, the composition (z) may further contain one or more types selected from the group consisting of tackifiers and crosslinking agents. In addition to these, the composition (z) may contain one or more types selected from the group consisting of diluent solvents and additives for pressure sensitive adhesives used in typical pressure sensitive adhesives.

Also for the tackifier, the crosslinking agent, the diluent solvent, and the additive for pressure sensitive adhesives used in typical pressure sensitive adhesives, the same as those described in the section of the composition (x) described above can be used, and the preferred embodiment and content are also the same.

However, in a preferred embodiment of the present invention, as will be described later, the pressure sensitive adhesion strength of the layer (XA) is preferably not lower than the pressure sensitive adhesion strength of the layer (Z), and more preferably, the pressure sensitive adhesion strength of the layer (XA) is higher than the pressure sensitive adhesion strength of the layer (Z).

The pressure sensitive adhesion strength of the layer (Z) is preferably 1.0 N/25 mm or greater, more preferably 4.0 N/25 mm or greater, even more preferably 9.0 N/25 mm or greater, and still more preferably 12.0 N/25 mm or greater, and preferably 40.0 N/25 mm or less, more preferably 30.0 N/25 mm or less, even more preferably 25.0 N/25 mm or less, and still more preferably 18.0 N/25 mm or less.

With the pressure sensitive adhesion strength of the layer (Z) satisfying the above range, the peel detection label, for example, having a release material can more readily exhibit functions of not revealing a pattern when the peel detection label is peeled from the release material (hereinafter referred to as "pre-peeling") and enabling the pattern to be revealed when the peel detection label is peeled from an adherend; thus, this is preferred.

In addition, when the layer (XA) is present, the pressure sensitive adhesion strength of the layer (XA) is preferably greater than the pressure sensitive adhesion strength of the layer (Z). When the peel detection label is peeled, the detachment would occur, for example, at the interface between the backing and/or the pattern layer and the layer (XA), and/or at the interface between the layer (XA) and its adjacent layer before detaching the layer (Z) from an adherend, and the pressure sensitive adhesive laminate would remain on the adherend, and this would cause adhesive residue. The layer (XA) with a pressure sensitive adhesion strength greater than the pressure sensitive adhesion strength of the layer (Z) can more effectively prevent the occurrence of such a trouble; thus, this is preferred. In addition, the layer (XA) with a pressure sensitive adhesion strength greater than the pressure sensitive adhesion strength of the layer (Z) can more effectively prevent the occurrence of the interfacial detachment at a situation different from the situation originally assumed, for example, when the peel detection label is die cut or wound into a roll, or unwound during manufacturing or storage of the peel detection label, and when the peel detection label is pre-peeled from a release material immediately before use; thus, this is preferred.

The value of the pressure sensitive adhesion strength of the layer (Z) can be measured specifically by the method described in Examples.

In addition, the shear storage elastic modulus G' at 23° C. of the layer (Z) is preferably $1.5 \times 10^4$ Pa or greater, more preferably $2.5 \times 10^4$ Pa or greater, and even more preferably $5.0 \times 10^4$ Pa or greater, and preferably $2.0 \times 10^5$ Pa or less, more preferably $1.0 \times 10^5$ Pa or less, and even more preferably $8.0 \times 10^4$ Pa or less.

The layer (Z) with a shear storage elastic modulus G' at 23° C. satisfying the above range can more effectively prevent the occurrence of a trouble in which the layer (Z) would not sufficiently deform and not break when the peel detection label is peeled, causing adhesive residue; thus, this is preferred.

The value of the shear storage elastic modulus G' at 23° C. of the layer (Z) can be measured specifically by the method described in Examples.

Furthermore, the values of the pressure sensitive adhesion strength and the shear storage elastic modulus G' at 23° C. of the layer (Z) can also be adjusted, for example, by selecting the type of each component forming the layer (Z), such as the pressure sensitive adhesive resin, tackifier, crosslinking agent, and additive for pressure sensitive adhesives, described above, and adjusting their contents.

Colorant

In the peel detection label, at least one layer selected from the backing and/or each layer described above may further contain a colorant. The expression "at least one layer selected from each layer described above contains a colorant" also means that, for example, when the layer (C) is a laminate, at least one layer selected from each layer composing the layer (C) contains a colorant, and the same applies to the layer (X), the layer (Y), and the layer (Z).

When at least one layer selected from the backing and/or each layer described above contains an appropriate colorant selected in view of visibility and concealability, this further improves the visibility of the peel detection pattern, further facilitating the detection of presence or absence of peeling of the peel detection label. In addition, from the same viewpoint, when at least one layer selected from the backing and/or each layer described above contains a colorant, at least one layer selected from each layer described above more preferably contains a colorant.

The colorant may be either a pigment or a dye and is preferably a pigment.

The pigment may be either an inorganic pigment or an organic pigment but is preferably an organic pigment.

Examples of the inorganic pigment include carbon blacks and metal oxides. In a black ink, a carbon black is preferred.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments, and quinophthalone pigments.

Examples of the dye include acid dyes, reactive dyes, direct dyes, oil-soluble dyes, disperse dyes, and cationic dyes.

The hue is not particularly limited, and any chromatic pigment or dye, such as yellow, magenta, cyan, blue, red, orange, or green, can be used.

The colorant described above can be used alone or as a mixture of two or more in any proportion.

When each layer described above contains these colorants, the contents of the colorants are each independently preferably from 0.1 to 40 parts by mass, more preferably from 1.0 to 35 parts by mass, and even more preferably from 5.0 to 30 parts by mass relative to 100 parts by mass of the resin contained in each layer in terms of solid content.

In addition, when the layer (C) is a laminate including the layer (X) and the layer (Y), in which a layer in the layer (X), the layer in contact with the layer (Y) [when the layer (X) is a single layer, the layer is the layer (X), and when the layer (X) is the laminate (Ln), the layer is the layer (Xn)], is the layer (XA), the pressure sensitive adhesive laminate is more preferably a pressure sensitive adhesive laminate having a laminate (e.g., the layer (C) 3, which is a laminate composed of the layer (X) 5 and the layer (Y) 6 in the embodiment of FIG. 2, or the laminate, which is a laminate composed of the layer (X2) 8 and the layer (Y) 6 in the embodiment of FIG. 3) formed by directly laminating a coating (x') made from a composition (x), which is a material for forming the layer (XA), and a coating (y') in this order, and then simultaneously drying the coating (x') and the coating (y') to remove a volatile component(s). Furthermore, the pressure sensitive adhesive laminate is even more preferably a pressure sensitive adhesive laminate having a laminate formed by simultaneously applying the composition (x) and the composition (y), to directly laminate the coating (x') and the coating (y') in this order, and then simultaneously drying the coating (x') and the coating (y') to remove a volatile component(s).

When the pressure sensitive adhesive laminate is a pressure sensitive adhesive laminate having a laminate formed by directly laminating the coating (x) and the coating (y') in this order and then "simultaneously" drying the coating (x') and the coating (y'), the interfacial adhesion between the layer (X) and the layer (Y) becomes higher than that in the case where the layer in the layer (X), the layer in contact with the layer (Y), is subsequently formed on the layer (Y) formed in advance. Thus, such a pressure sensitive adhesive laminate is preferred from the viewpoint of more effectively preventing the occurrence of adhesive residue. This is presumably because when the layer in the layer (X), the layer in contact with the layer (Y), is the layer (XA), in the process of simultaneously drying the coating (x') made from the composition (x) containing a pressure sensitive adhesive resin, which is a material for forming the layer (XA) in the layer (X), the layer (XA) in contact with the layer (Y), and the coating (y') made from the composition (y), which is a material for forming the layer (Y), the molecular chains of the resins contained in each composition are entangled with each other while a mixed layer of the coatings is occurring in the vicinity of the interface, thus improving the interfacial adhesion between the layer (X) and the layer (Y).

Furthermore, in the pressure sensitive adhesive laminate having a laminate formed by simultaneously applying the composition (x) containing a pressure sensitive adhesive resin and the composition (y), a dry film of a thin film is less likely to be formed on each applied surface compared to a laminate formed by applying each composition one after another, thus resulting in excellent adhesion between respective layers. Thus, such a pressure sensitive adhesive laminate is more preferred from the viewpoint of more effectively preventing the occurrence of adhesive residue.

Similarly, when the layer (C) is a laminate including the layer (X) and the layer (Y), the pressure sensitive adhesive laminate is more preferably a pressure sensitive adhesive laminate in which a layer in the layer (X), the layer in contact with the layer (Y), is the layer (XA) and which has a laminate (e.g., the pressure sensitive adhesive laminate 11 composed of the layer (X) 5, the layer (Y) 6, and the layer (Z) 4 in the embodiment of FIG. 2, or the laminate composed of the layer (X2) 8, the layer (Y) 6, and the layer (Z) 4 in the embodiment of FIG. 3) formed by directly laminating the coating (x') made from the composition (x), which is a material for forming the layer (XA), a coating (y'), and a coating (z') in this order, and then simultaneously drying the coating (x'), the coating (y'), and the coating (z') to remove a volatile component(s). Furthermore, the pressure sensitive adhesive laminate is even more preferably a pressure sensitive adhesive laminate in which a layer in the layer (X), the layer in contact with the layer (Y), is the layer (XA) and which has a laminate formed by simultaneously applying the composition (x), which is a material for forming the layer (XA), the composition (y), and the composition (z) to directly laminate the coating (x'), the coating (y'), and the coating (z') in this order, and then simultaneously drying the coating (x'), the coating (y'), and the coating (z') to remove a volatile component(s).

Simultaneously applying the composition (x), the composition (y), and the composition (z) is less likely to form a dry film of a thin film on each applied surface compared to applying each composition one after another, thus resulting in excellent adhesion between respective layers. Thus, such a pressure sensitive adhesive laminate is preferred from the viewpoint of more effectively preventing the occurrence of adhesive residue.

For the same reason described above, when the pressure sensitive adhesive laminate is a pressure sensitive adhesive laminate having a laminate formed by directly laminating the coating (x'), the coating (y'), and the coating (z') in this order and then simultaneously drying the coating (x'), the coating (y'), and the coating (z'), not only the interfacial adhesion between the layer (X) and the layer (Y) but also the interfacial adhesion between the layer (Z) and the layer (Y) becomes higher than that in the case where the layer in the layer (X), the layer in contact with the layer (Y), and the layer (Z) are subsequently formed on the layer (Y) formed in advance, and in the case where a laminate of a layer in the layer (X), the layer in contact with the layer (Y), or the layer (Z) and the layer (Y) is produced in advance by the method described above, and then the remaining layer, either of the layer in the layer (X), the layer in contact with the layer (Y), or the layer (Z), is formed on an exposed surface of the layer (Y). Thus, such a pressure sensitive adhesive laminate is preferred from the viewpoint of more effectively preventing the occurrence of adhesive residue.

Furthermore, in the pressure sensitive adhesive laminate having a laminate formed by simultaneously applying the composition (x), the composition (y), and the composition (z), a dry film of a thin film is less likely to be formed on each applied surface compared to a laminate formed by applying each composition one after another, thus resulting in excellent adhesion between respective layers. Thus, such a pressure sensitive adhesive laminate is more preferred from the viewpoint of more effectively preventing the occurrence of adhesive residue.

In the present invention, with regard to forming each layer from the coating for the pressure sensitive adhesive laminate included in the peel detection label or each laminate having at least the layer (X) and the layer (Y) included in the pressure sensitive adhesive laminate, the laminate is specified by the manufacturing method as described above. In this case, certain circumstances are present, leaving no choice but to specify the laminate by such a manufacturing method.

Namely, for example, a method of measuring a surface roughness is conceivable, for example, for a method of judging whether the pressure sensitive adhesive laminate has been formed based on the method of the present invention from the viewpoint with subjective visual sense by observing the interface between the layer (Y) and the layer (X) using an electron microscope or the like in a cross section in the thickness direction obtained by cutting the laminate in the vertical direction to the surface of the layer (Y) of the laminate. However, when each layer is formed by simultaneously drying the coating, in particular, when each layer is formed by simultaneously applying and then simultaneously drying, the roughness of the interface is too fine to be precisely measured, and the roughness state largely varies depending on a region to be observed. This makes the evaluation by specific physical property values, such as surface roughness, extremely difficult.

From such circumstances, in the present invention, the pressure sensitive adhesive laminate included in the peel detection label or each laminate having at least the layer (X) and the layer (Y) included in the pressure sensitive adhesive laminate may have to be specified by the manufacturing method as described above.

The same applies to the relationship between the layer (Y) and the layer (X), as well as the relationship between the layer (Y) and the layer (Z) when the pressure sensitive adhesive laminate is a laminate formed by directly laminating the coating (x'), the coating (y'), and the coating (z') in this order and then simultaneously drying the coating (x'), the coating (y'), and the coating (z').

The thickness of the pressure sensitive adhesive laminate (total thickness of the pressure sensitive adhesive laminate) is preferably from 2 to 100 μm, more preferably from 4 to 80 μm, even more preferably from 5 to 50 μm, still more preferably from 10 to 40 μm, and still even more preferably from 15 to 35 μm.

The thickness (Xt) of the layer (X) is preferably from 0.5 to 50.0 μm, more preferably from 1.0 to 30.0 μm, even more preferably from 2.0 to 20.0 μm, still more preferably from 3.0 to 15.0 μm, and still even more preferably from 4.0 to 12.0 μm.

When the layer (X) is a laminate (Lm), the ratio [(X1$t$)/(Xm$t$)] of the thickness (Xm$t$) of the layer (Xm) to the thickness (X1$t$) of the layer (X1) is preferably from 1/100 to 200/100, more preferably from 2/100 to 150/100, even more preferably from 3/100 to 100/100, still more preferably from 5/100 to 50/100, and still even more preferably from 8/100 to 20/100.

For example, when the laminate (Ln) is a laminate (L2) composed of two layers, the ratio [(X1$t$)/(X2$t$)] of the thickness (X2$t$) of the layer (X2) to the thickness (X1$t$) of the layer (X1) is preferably from 1/100 to 200/100, more preferably from 2/100 to 150/100, even more preferably from 3/100 to 100/100, still more preferably from 5/100 to 50/100, and still even more preferably from 8/100 to 20/100.

The thickness (Yt) of the layer (Y) is preferably from 0.5 to 50.0 μm. The layer (Y) with a thickness (Yt) of 0.5 μm or greater becomes less likely to break when the peel detection label is peeled. This presumably allows the peel detection label to readily achieve both even better pattern expressibility and adhesive residue preventive properties. In addition, the layer (Y) with a thickness (Yt) of 50.0 μm or less reduces the peel angle when the peel detection label is peeled. This allows the stress to detach the backing and the pattern layer to easily transmit to the pattern layer side, resulting in better pattern expressibility. From such viewpoints, the thickness (Yt) of the layer (Y) is more preferably from 1.0 to 30.0 μm, even more preferably from 2.0 to 20.0 μm, still more preferably from 2.5 to 15.0 μm, still even more preferably from 3.0 to 12.0 μm, and yet even more preferably from 3.0 to 9.0 μm.

In the present specification, the total thickness of the pressure sensitive adhesive laminate is a value measured using a constant pressure thickness meter in accordance with JIS K6783-1994, Z1702-1994, and Z1709-1995, and specifically can be measured based on the method described in Examples.

In addition, the thickness of each layer composing the pressure sensitive adhesive laminate may be measured by the same method as that for the total thickness of the pressure sensitive adhesive laminate described above and can also be measured, for example, by the method described in Examples. Specifically, the cross section of the pressure sensitive adhesive laminate cut in the thickness direction is observed with a scanning electron microscope, and the ratio of the thickness of each layer is each measured, and the thickness may be calculated from the total thickness of the pressure sensitive adhesive laminate measured by the method described above.

In the peel detection label, the ratio [(Xt)/(Yt)] of the thickness (Xt) of the layer (X) to the thickness (Yt) of the layer (Y) is preferably from 20/100 to 500/100, more preferably from 80/100 to 400/100, and even more preferably from 180/100 to 300/100.

In the peel detection label, the ratio [(Zt)/(Yt)] of the thickness (Zt) of the layer (Z) to the thickness (Yt) of the layer (Y) is preferably from 10/100 to 500/100, more preferably from 100/100 to 400/100, and even more preferably from 200/100 to 300/100.

In addition, when the peel detection label has an additional pressure sensitive adhesive layer(s) (Wr) (r is an integer of 1 or more) described above, the thicknesses of these layers are each independently not particularly limited as long as the effects of the present invention are exhibited.

When the pressure sensitive adhesive laminate is a pressure sensitive adhesive laminate having the layer (X) and the layer (Y), the laminate formed by removing a volatile component(s) by simultaneously drying the coating (x') and the coating (y') as described above in forming the pressure sensitive adhesive laminate, a mixed layer occurs between the coatings of the layer (X) and the layer (Y) in the drying process of the coatings, and the interface between the layer (X) and the layer (Y) may become unclear to an extent that the interface is invisible.

When a mixed layer occurs between each coating and between the formed layers, for example, when a cross section of the pressure sensitive adhesive laminate cut in the thickness direction is observed with a scanning electron microscope to measure the ratio of each layer and a mixed layer occurs between the layer (X) and the layer (Y), the thickness ratio of each layer may be measured by assuming that an interface is present on a surface passing through an intermediate point in the thickness direction of the mixed layer and parallel to the surface of the layer (X), the surface on the opposite side from the layer (Y). The same applies to a case where a mixed layer occurs between the layer (Y) and the layer (Z). In addition, the same applies to a case where, for example, a mixed layer occurs between each layer constituting each layer, like the layer (X1) and the layer (X2) in the layer (X).

Release Material

As described above, the peel detection label of an embodiment of the present invention may be configured to further have a release material on the attachment surfaces 10a to 12a of the pressure sensitive adhesive laminate from the viewpoint of handleability in such embodiments as illustrated in FIGS. 1 to 3. In addition, in any of the embodiments of FIGS. 1 to 3, the peel detection label may further have an embodiment in which a release material is further provided on the surface of the backing 1, the surface on the opposite side from the pressure sensitive adhesive laminate, and the pressure sensitive adhesive laminate is sandwiched by two release materials. When two release materials are used, respective release materials may be identical to each other or different from each other.

For the release material, a release sheet subjected to a double-sided release treatment, a release sheet subjected to a single-sided release treatment, or the like is used. Examples include a material prepared by applying a release agent onto a substrate for release materials.

Examples of the substrate for release materials include papers, such as woodfree papers, glassine papers, and kraft papers; and plastic films, such as polyester resin films of a poly(ethylene terephthalate) resin, a poly(butylene terephthalate) resin, a poly(ethylene naphthalate) resin or the like, and olefin resin films of a polypropylene resin, a polyethylene resin, or the like.

Examples of the release agent include rubber-based elastomers, such as silicone-based resins, olefin-based resins, isoprene-based resins, and butadiene-based resins; long-chain alkyl-based resins; alkyd-based resins; and fluorine-based resins.

When a release material is used on the surface of the attachment surface of the pressure sensitive adhesive laminate, the release material is preferably a release material having a release strength not revealing the pattern layer when the release material is pre-peeled from the peel detection label, for example, a release material with a release strength adjusted so as not to cause the interfacial detachment between the backing and the pattern layer and/or between the pattern layer and the layer (X).

Examples of a method for effectively preventing the occurrence of the interfacial detachment when the release material is pre-peeled include methods of satin-finishing the backing surface as described above. Although the means of adjusting the release strength of the release material and the method of satin-finishing may each be used alone or used in combination, these are more preferably used in combination.

The thickness of the release material is not particularly limited, but is preferably from 10 to 200 μm, more preferably from 25 to 170 μm, even more preferably from 30 to 125 μm, and still more preferably from 50 to 100 μm.

Method of Manufacturing Peel Detection Label

As for a method of manufacturing the peel detection label, for example, the peel detection label can be manufactured by obtaining a backing provided with a pattern layer on one surface of the backing (hereinafter also referred to as the "backing with a pattern layer") by the method described above, and then forming the pressure sensitive adhesive laminate on the backing on the side where the pattern layer is provided.

A more specific method of forming the pressure sensitive adhesive laminate is exemplified by methods shown below. In the following descriptions, a case of manufacturing an example of the configuration of the peel detection label illustrated in FIGS. 1 to 3 will be described as an example.

For the peel detection label 101 of an embodiment of the present invention illustrated in FIG. 1, the backing 1 on which the pattern layer 2 is formed in advance using a printing method of various types is prepared, for example, as described above in the description of the peel detection label.

Then, the pressure sensitive adhesive laminate 10 including the layer (Z) 4 and the layer (C) 3 laminated in this order is formed on a release material (not illustrated).

Then, an exposed surface of the layer (C) 3 of the pressure sensitive adhesive laminate 10 is bonded to an exposed surface of the backing 1, the exposed surface on the side of the pattern layer 2 of the backing with a pattern layer formed thereon, and to exposed surfaces of the pattern layer 2 so as to cover the pattern layer 2, whereby the peel detection label 101 having the backing 1, the pattern layer 2, the layer (C) 3, and the layer (Z) 4 in this order from the backing 1 side can be manufactured.

The layer (C) 3 is preferably a resin layer formed from the composition (c) containing a resin. The layer (C) 3 may be formed, for example, by heat-melting and extrusion-laminating the composition (c) on the surface of the layer (Z) 4, or by applying the coating (c') made from the composition (c) onto the surface of the layer (Z) 4 and drying. In addition, for example, a layer produced in advance by extrusion molding or drying the coating (c') may be directly attached as the layer (C) 3 onto the exposed surface of the layer (Z) 4.

In forming the layer (Z) 4 on the release material, the layer (Z) may be formed, for example, by heat-melting and extrusion-laminating the composition (z) containing a pressure sensitive adhesive resin on the release material, or by applying the coating (z') made from the composition (z) onto the release material and drying.

In addition, in forming the pressure sensitive adhesive laminate 10 including the layer (Z) 4 and the layer (C) 3 directly laminated in this order from the release material side on the release material, the pressure sensitive adhesive laminate 10 is preferably formed by directly laminating the coating (z') and the coating (c') in this order, and then simultaneously drying the coating (z') and the coating (c') to remove a volatile component(s). Furthermore, the pressure sensitive adhesive laminate 10 is more preferably formed by simultaneously applying the composition (z) and the composition (c) on the release material to directly laminate the coating (z') and the coating (c') in this order from the release material side, and then simultaneously drying the coating (z') and the coating (c') to remove a volatile component(s).

Moreover, as another embodiment of the method of manufacturing the peel detection label 101, the layer (C) 3 may be formed on the exposed surface of the backing 1, the exposed surface on the side of the pattern layer 2 of the backing with a pattern layer formed thereon, and to the exposed surfaces of the pattern layer 2 so as to cover the pattern layer 2. The layer (C) 3 may be formed, for example, by heat-melting and extrusion-laminating the composition (c) on the surface where the pattern layer 2 of the backing with a pattern layer is formed, or by subsequently applying the coating (c') made from the composition (c) onto the surface where the pattern layer 2 of the backing with a pattern layer is formed and drying.

In this case, the layer (Z) 4 is then formed on the surface of the formed layer (C) 3, the surface on the opposite side from the backing side. In forming the layer (Z) 4, the layer (Z) 4 may be formed, for example, by heat-melting and extrusion-laminating the composition (z) containing a pressure sensitive adhesive resin on the layer (C) 3, or by subsequently applying the coating (z') made from the composition (z) onto the layer (C) 3 and drying. In addition, for example, a layer produced on the release material or the like in advance by extrusion molding or drying the coating (z') may be directly attached as the layer (Z) 4 onto the exposed surface of the layer (C) 3.

Furthermore, in forming the pressure sensitive adhesive laminate 10 including the layer (C) 3 and the layer (Z) 4 directly laminated in this order, the pressure sensitive adhesive laminate 10 is preferably formed by directly laminating the coating (c') and the coating (z') in this order on the exposed surface of the backing 1, the exposed surface on the side of the pattern layer 2 of the backing with a pattern layer formed thereon, and to the exposed surfaces of the pattern layer 2, and then simultaneously drying the coating (c') and the coating (z') to remove a volatile component(s). Moreover, the pressure sensitive adhesive laminate 10 is more preferably formed by simultaneously applying the composition (c) and the composition (z) to the exposed surface of the backing 1 in which the pattern layer 2 of the backing with a pattern layer is formed and to the exposed surfaces of the pattern layer 2 to directly laminate the coating (c') and the coating (z') in this order, and then simultaneously drying the coating (c') and the coating (z') to remove a volatile component(s).

Still more, a preferred example of the method of manufacturing the peel detection label 101 is preferably a method of manufacturing by bonding the exposed surface of the layer (C) 3 of the pressure sensitive adhesive laminate 10 manufactured in advance to the exposed surface of the backing 1, the exposed surface on the side of the pattern layer 2 of the backing with a pattern layer formed thereon, the backing with a pattern layer separately manufactured, and to the exposed surfaces of the pattern layer 2 so as to cover the pattern layer 2. Using the manufacturing method of the present embodiment, for example, eliminates the need for setting the drying temperature or the like in forming the layer (C) 3 and the layer (Z) 4 in consideration of the heat resistance or the like of the material used in the backing 1 or the pattern layer 2. Thus, consequently, this method is preferred also from the viewpoint of increasing the options of materials that can be used in the backing 1 and each layer of the pattern layer 2, the layer (C) 3, and the layer (Z) 4 as long as the effects of the present invention are exhibited.

In the method of manufacturing the peel detection label 101, in any of the methods described above, when the layer (C) 3 is formed on the exposed surface of the backing 1, the exposed surface on the side of the pattern layer 2 of the backing with a pattern layer formed thereon, and on the exposed surfaces of the pattern layer 2, the layer (C) 3 is preferably formed so as to completely cover the pattern layer 2.

In addition, before forming the layer (C) 3 on the exposed surface of the backing 1, the exposed surface on the side of the pattern layer 2 of the backing with a pattern layer formed thereon, and on the exposed surfaces of the pattern layer 2 so as to cover the pattern layer 2, the exposed surface on the surface where the pattern layer 2 of the backing with a pattern layer is formed is preferably surface-modified using the oxidation method, such as a corona discharge treatment method, described above. That is, in FIG. 1, the exposed surface (in a state before forming the layer (C) 3) of the surface 1a on the pattern layer side of the backing and the exposed surface (in a state before forming the layer (C) 3) of the surface 2a on the layer (C) 3 side of the pattern layer 2 are preferably surface-modified using the oxidation method described above. The surface modification by the oxidation method is more preferably performed on the surface where the pattern layer 2 of the backing with a pattern layer is formed, immediately before forming the layer (C) 3.

In addition, also for the peel detection label 102 of an embodiment of the present invention illustrated in FIG. 2, a backing with a pattern layer, which is the backing 1 in which the pattern layer 2 has been formed in advance, is prepared in a similar manner as described above.

Then, the pressure sensitive adhesive laminate 11 including the layer (Z) 4, the layer (Y) 6, and the layer (X) 5 laminated in this order is formed on a release material (not illustrated).

Then, an exposed surface of the layer (X) 5 of the pressure sensitive adhesive laminate 11 is bonded to the exposed surface of the backing 1, the exposed surface on the side of the pattern layer 2 of the backing with a pattern layer formed thereon, and to the exposed surfaces of the pattern layer 2 so as to cover the pattern layer 2, whereby the peel detection label 102 having the backing 1, the pattern layer 2, the layer (X) 5, the layer (Y) 6, and the layer (Z) 4 in this order from the backing 1 side can be manufactured.

The layer (X) 5 is preferably the layer (XA) formed from the composition (x) containing a pressure sensitive adhesive resin and may be formed, for example, by heat-melting and extrusion-laminating the composition (x) on the surface of the layer (Y) 6, or by applying the coating (x') made from the composition (x) containing a pressure sensitive adhesive resin onto the surface of the layer (Y) 6 and drying. In addition, for example, a layer produced on the release material or the like in advance by extrusion molding or drying the coating (x') may be directly attached as the layer (X) 5 onto the exposed surface of the layer (Y) 6.

As for the method of forming the layer (Y) 6, the layer (Y) 6 may be formed, for example, by heat-melting and extrusion-laminating a raw material for forming the layer (Y) 6 on the layer (Z) 4, or by applying the coating (y') made from the composition (y) onto the layer (Z) 4 and drying. In addition, for example, a layer produced on the release material or the like in advance by extrusion molding or drying the coating (y') may be directly attached as the layer (Y) 6 onto the layer (Z) 4. Furthermore, for example, the exposed surface of the layer (Y) 6 of the laminate in which the layer (Y) 6 is produced by a method similar to that described above on the exposed surface of the layer (X) 5 formed on the release material in advance may be directly attached onto the layer (Z) 4.

In forming the laminate of the layer (X) 5 and the layer (Y) 6, such a laminate is preferably formed by directly laminating the coating (y') and the coating (x') in this order on the surface where the layer (Z) 4 is formed, and then simultaneously drying the coating (y') and the coating (x') to remove a volatile component(s). In addition, such a laminate is more preferably formed by simultaneously applying the composition (y) and the composition (x) onto the surface of the layer (Z) 4 to directly laminate the coating (y') and the coating (x') in this order, and then simultaneously drying the coating (y') and the coating (x') to remove a volatile component(s). Furthermore, for example, after the coating (x') and the coating (y') are directly laminated in this order on the release material in advance, the laminate of the layer (X) 5 and the layer (Y) 6 is produced by a method similar to that described above, and then the exposed surface of the layer (Y) 6 of the laminate may be directly attached onto the layer (Z) 4.

As for the method of forming the layer (Z) 4 on the release material, the layer (Z) 4 may be formed, for example, by heat-melting and extrusion-laminating the composition (z) containing a pressure sensitive adhesive resin on the release material, or by applying the coating (z') made from the composition (z) onto the release material and drying.

In addition, in forming the pressure sensitive adhesive laminate 11 formed of the layer (X) 5, the layer (Y) 6, and the layer (Z) 4, the pressure sensitive adhesive laminate 11 is even more preferably formed by directly laminating the coating (z'), the coating (y'), and the coating (x') in this order on the release material, and then simultaneously drying the coating (z'), the coating (y'), and the coating (x') to remove a volatile component(s). Furthermore, the pressure sensitive adhesive laminate 11 is still more preferably formed by simultaneously applying the composition (z), the composition (y), and the composition (x) on the release material to directly laminate the coating (z'), the coating (y'), and the coating (x') in this order, and then simultaneously drying the coating (z'), the coating (y'), and the coating (x') to remove a volatile component(s).

Moreover, as another embodiment of the method of manufacturing the peel detection label 102, a backing with a pattern layer, which is the backing 1 in which the pattern layer 2 has been formed in advance, is prepared in a similar manner as described above.

Then, the layer (X) 5 is formed on the exposed surface of the backing 1, the exposed surface on the side of the pattern layer 2 of the backing with a pattern layer formed thereon, and on the exposed surfaces of the pattern layer 2 so as to cover the pattern layer 2. For the method of forming the layer (X) 5, a method similar to that described above can be used.

The layer (Y) 6 is then formed on a surface of the formed layer (X) 5, the surface on the opposite side from the backing with a pattern layer. For the method of forming the layer (Y) 6, for example, a method similar to that described above can be used.

In directly forming the laminate of the layer (X) 5 and the layer (Y) 6, such a laminate is preferably formed by directly laminating the coating (x') and the coating (y') in this order on the exposed surface of the backing 1, the exposed surface on the side of the pattern layer 2 of the backing with a pattern layer formed thereon and on the exposed surfaces of the pattern layer 2, and then simultaneously drying the coating (x') and the coating (y') to remove a volatile component(s). In addition, such a laminate is more preferably formed by simultaneously applying the composition (x) and the composition (y) to the exposed surface of the backing 1, the exposed surface on the side of the pattern layer 2 of the backing with a pattern layer formed thereon, and to the exposed surfaces of the pattern layer 2 to directly laminate the coating (x') and the coating (y') in this order, and then simultaneously drying the coating (x') and the coating (y') to remove a volatile component(s).

The layer (Z) 4 is then formed on the surface of the formed layer (Y) 6, the surface on the opposite side from the layer (X) 5. For the method of forming the layer (Z), for example, a method similar to that described above can be used.

In forming the pressure sensitive adhesive laminate 11 formed of the layer (X) 5, the layer (Y) 6, and the layer (Z) 4, the pressure sensitive adhesive laminate 11 is even more preferably formed by directly laminating the coating (x'), the coating (y'), and the coating (z') in this order on the exposed surface of the backing 1, the exposed surface on the side of the pattern layer 2 of the backing with a pattern layer formed thereon, and on the exposed surfaces of the pattern layer 2, and then simultaneously drying the coating (x'), the coating (y'), and the coating (z') to remove a volatile component(s). In addition, the pressure sensitive adhesive laminate 11 is still more preferably formed by simultaneously applying the composition (x), the composition (y), and the composition (z) to the exposed surface of the backing 1, the exposed surface on the side of the pattern layer 2 of the backing with a pattern layer formed thereon, and to the exposed surfaces of the pattern layer 2 to directly laminate the coating (x'), the coating (y'), and the coating (z') in this order, and then simultaneously drying the coating (x'), the coating (y'), and the coating (z') to remove a volatile component(s).

Furthermore, as another embodiment of the method of manufacturing the peel detection label 102, a backing with a pattern layer, which is the backing 1 in which the pattern layer 2 has been formed in advance, is prepared as described above.

Then, the layer (X) 5 is formed on the exposed surface of the backing 1, the exposed surface on the side of the pattern layer 2 of the backing with a pattern layer formed thereon, and on the exposed surfaces of the pattern layer 2 so as to cover the pattern layer 2, and a laminate including the backing 1, the pattern layer 2, and the layer (X) 5 in this order from the backing side is prepared. The layer (X) 5 is as described above, and for the method of forming the layer (X) 5, a method similar to that described above can be used.

Then, a laminate including the layer (Z) 4 and the layer (Y) 6 laminated in this order is formed on a release material (not illustrated). As for the method of forming the laminate including the layer (Z) 4 and the layer (Y) 6 laminated in this order, the layer (Z) 4 is formed by the method described above on the release material separately prepared in advance, and a laminate in which the layer (Y) 6 is formed by a method similar to that described above on the surface of the layer (Z) 4, the surface on the opposite side from the release material, can be prepared in advance. In addition, a laminate can also be obtained by forming the layer (Y) 6 by the method described above on a release material separately prepared in advance, and bonding an exposed surface of the layer (Y) 6 to an exposed surface of the layer (ZZ) in which the layer (Z) 4 is formed by the method described above on a release material separately prepared in advance.

Then, an exposed surface of the layer (Y) 6 of the laminate is bonded to the exposed surface of the layer (X) 5 covering the pattern layer 2 of the backing with a pattern layer, whereby the peel detection label 102 having the backing 1, the pattern layer 2, the layer (X) 5, the layer (Y) 6, and the layer (Z) 4 in this order from the backing 1 side can also be manufactured.

Here, as described above, in forming the laminate of the layer (Z) 4 and the layer (Y) 6 on a release material, such a laminate is preferably formed by directly laminating the coating (z') and the coating (y') in this order on the release material, and then simultaneously drying the coating (z') and the coating (y') to remove a volatile component(s). In addition, such a laminate is more preferably formed by simultaneously applying the composition (z) and the composition (y) to directly laminate the coating (z') and the coating (y') in this order, and then simultaneously drying the coating (z') and the coating (y') to remove a volatile component(s).

A preferred example of the method of manufacturing the peel detection label 102 is preferably a method of manufacturing by bonding the exposed surface of the layer (X) 5 of the pressure sensitive adhesive laminate 11 described above manufactured in advance to the exposed surface of the backing 1, the exposed surface on the side of the pattern layer 2 of the backing with a pattern layer formed thereon, the backing with a pattern layer separately manufactured, and to the exposed surfaces of the pattern layer 2 so as to cover the pattern layer 2. The manufacturing method of the present embodiment, for example, eliminates the need for setting the drying temperature or the like in forming the layer (X) 5, layer (Y) 6, or the layer (Z) 4 in consideration of the heat resistance or the like of the material used in the backing 1 or the pattern layer 2. Thus, consequently, this method is preferred also from the viewpoint of increasing the options of materials that can be used in the backing 1 and each layer of the pattern layer 2, the layer (X) 5, layer (Y) 6, and the layer (Z) 4.

In the method of manufacturing the peel detection label 102, in any of the methods described above, when the pressure sensitive adhesive laminate 11 is formed, the layer (X) 5 is preferably formed so as to completely cover the pattern layer 2.

In addition, in the same manner as in the manufacturing method related to the peel detection label 101 of FIG. 1, as an embodiment of the manufacturing method related to the peel detection label 102 of FIG. 2, before forming the layer (X) 5 on the exposed surface of the backing 1, the exposed surface on the side of the pattern layer 2 of the backing with a pattern layer formed thereon, and on the exposed surfaces of the pattern layer 2 so as to cover the pattern layer 2, the exposed surface on the surface where the pattern layer 2 of the backing with a pattern layer is formed is preferably surface-modified using the oxidation method, such as a corona discharge treatment method, described above.

In addition, also for the peel detection label 103 of an embodiment of the present invention illustrated in FIG. 3, a backing with a pattern layer, which is the backing 1 in which the pattern layer 2 has been formed in advance, is prepared in a similar manner as described above.

Then, the layer (X1) 7 is formed on the exposed surface of the backing 1, the exposed surface on the side of the pattern layer 2 of the backing with a pattern layer formed thereon, and on the exposed surfaces of the pattern layer 2 so as to cover the pattern layer 2. The method of forming the layer (X1) 7 is not particularly limited as long as the method is capable of forming the layer (X1) 7 on the backing 1 and on the pattern layer 2. For example, as in the method of forming the pattern layer 2, the layer (X1) 7 can be formed using an ink containing each raw material and the solvent described above by a typical printing method, such as, for example, gravure printing, screen printing, offset printing, or flexographic printing. In addition, when the layer (X1) 7 is the layer (XQ) described above and an energy ray-curable resin is used, the energy ray curing is preferably performed after printing. The type of the energy ray includes ultraviolet light and/or an electron beam, but ultraviolet light is preferred. Examples of the light source include high-pressure mercury lamps, metal halide lamps, and UV-LEDs.

Furthermore, when the layer (X1) 7 is the layer (XA) formed from the composition (x) containing a pressure sensitive adhesive resin, or the layer (XQ) described above and a layer formed from a resin composition, the layer (X1) 7 may be formed, for example, by heat-melting and extrusion-laminating a composition (x1) containing a raw material resin for the layer (X1) 7 on the surface where the pattern layer 2 of the backing with a pattern layer is formed, or by subsequently applying a coating (x1') made from the composition (x) onto the surface where the pattern layer 2 of the backing with a pattern layer is formed and drying.

A laminate in which the pattern layer 2 on the backing 1 is covered by the layer (X1) 7 is thus formed in advance.

Then, a laminate including the layer (Z) 4, the layer (Y) 6, and the layer (X2) 8 laminated in this order is formed on a release material (not illustrated).

Then, an exposed surface of the layer (X2) 8 of the laminate is bonded to an exposed surface of the layer (X1) 7, whereby the peel detection label 103 having the backing 1, the pattern layer 2, the layer (X1) 7, the layer (X2) 8, the layer (Y) 6, and the layer (Z) 4 in this order from the backing 1 side can be manufactured.

In this case, the layer (X2) 8 is a layer formed from a composition (x2) containing a raw material resin for the layer (X2) 8, and more preferably the layer (XA) formed from the composition (x) containing a pressure sensitive adhesive resin. The layer (X2) 8 may be formed, for example, by heat-melting and extrusion-laminating the composition (x2) on the surface of the layer (Y) 6, or by applying the coating (x2') made from the composition (x2) onto the surface of the layer (Y) 6 and drying. In addition, for example, a layer produced on the release material or the like in advance by extrusion molding or drying the coating (x2') may be directly attached as the layer (X2) 8 onto the exposed surface of the layer (Y) 6.

As for the method of forming the layer (Y) 6, the layer (Y) 6 may be formed, for example, by heat-melting and extrusion-laminating a raw material for forming the layer (Y) 6 on the layer (Z) 4, or by applying the coating (y') made from the composition (y) onto the layer (Z) 4 and drying. In addition, for example, a layer produced on the release material or the like in advance by extrusion molding or drying the coating (y') may be directly attached as the layer (Y) 6 onto the layer (Z) 4. Furthermore, for example, the exposed surface of the layer (Y) 6 of the laminate in which the layer (Y) 6 is produced by a method similar to that described above on the exposed surface of the layer (X2) 8 formed on the release material in advance may be directly attached onto the layer (Z) 4.

In forming the laminate of the layer (X2) 8 and the layer (Y) 6, such a laminate is preferably formed by directly laminating the coating (y') and the coating (x2') in this order on the surface where the layer (Z) 4 is formed, and then simultaneously drying the coating (y') and the coating (x2') to remove a volatile component(s). In addition, such a laminate is more preferably formed by simultaneously applying the composition (y) and the composition (x2) onto the surface of the layer (Z) 4 to directly laminate the coating (y') and the coating (x2') in this order, and then simultaneously drying the coating (y') and the coating (x2') to remove a volatile component(s).

Furthermore, for example, after the coating (x2') and the coating (y') are directly laminated in this order on the release material in advance, the laminate of the layer (X2) 8 and the layer (Y) 6 is produced by a method similar to that described above, and the exposed surface of the layer (Y) 6 of the laminate may be directly attached onto the layer (Z) 4.

As for the method of forming the layer (Z) 4 on the release material, the layer (Z) 4 may be formed, for example, by heat-melting and extrusion-laminating the composition (z) containing a pressure sensitive adhesive resin on the release material, or by applying the coating (z') made from the composition (z) onto the release material and drying.

In addition, in forming the laminate formed of the layer (X2) 8, the layer (Y) 6, and the layer (Z) 4, such a laminate is even more preferably formed by directly laminating the coating (z'), the coating (y'), and the coating (x2') in this order on the release material, and then simultaneously drying the coating (z'), the coating (y'), and the coating (x2') to remove a volatile component(s). Furthermore, such a laminate is still more preferably formed by simultaneously applying the composition (z), the composition (y), and the composition (x2) on the release material to directly laminate the coating (z'), the coating (y'), and the coating (x2') in this order, and then simultaneously drying the coating (z'), the coating (y'), and the coating (x2') to remove a volatile component(s).

Then, the exposed surface of the layer (X2) 8 in the resulting laminate is bonded to the exposed surface of the layer (X1) 7 of the laminate in which the pattern layer 2 on the backing 1 is covered by the layer (X1) 7, whereby the peel detection label 103 having the backing 1, the pattern layer 2, the layer (X1) 7, the layer (X2) 8, the layer (Y) 6, and the layer (Z) 4 in this order from the backing 1 side can be manufactured.

In addition, as another embodiment of the method of manufacturing the peel detection label 103, a laminate in which the pattern layer 2 on the backing 1 is covered by the layer (X1) 7 is formed in advance in a similar manner as described above.

The layer (X2) 8 is then formed on an exposed surface of the formed layer (X1) 7, the surface on the opposite side from the backing 1. The layer (X2) 8 is preferably the layer (XA) formed from the composition (x) containing a pressure sensitive adhesive resin. For the method of forming the layer (X2) 8, a method similar to that described above can be used except for forming the layer (X2) 8 on the exposed surface of the layer (X1) 7.

In addition, as described above, also in forming a laminate of the layer (X2) 8 and the layer (Y) 6, such a laminate can be formed using a method similar to that described above except for forming the layer (X2) 8 and the layer (Y) 6 on the exposed surface of the layer (X1) 7 in this order from the layer (X1) 7 side.

The layer (Z) 4 is then formed on the surface of the formed layer (Y) 6, the surface on the opposite side from the layer (X2) 8. For the method of forming the layer (Z) 4, a method similar to that described above can be used except for forming the layer (Z) 4 on the exposed surface of the layer (Y) 6.

Furthermore, as described above, also in directly forming a laminate of the layer (X2) 8, the layer (Y) 6, and the layer (Z) 4, such a laminate can be formed using a method similar to that described above except for forming the layer (X2) 8, the layer (Y) 6, and the layer (Z) 4 in this order on the exposed surface of the layer (X1) 7 from the layer (X1) 7 side.

Moreover, as another embodiment of the method of manufacturing the peel detection label 103, a backing with a pattern layer, which is the backing 1 in which the pattern layer 2 has been formed in advance, is prepared in a similar manner as described above.

Still more, when the layer (X1) 7 is also a layer formed from a resin composition, the laminate can also be formed by directly laminating a coating (x1') made from a composition (x1) containing a raw material resin for the layer (X1) 7, a coating (x2') made from a composition (x2) containing a raw material resin for the layer (X2) 8, and the coating (y') made from the composition (y) in this order on the exposed surface of the backing 1, the exposed surface on the side of the pattern layer 2 of the backing with a pattern layer formed thereon, and on the exposed surfaces of the pattern layer 2, and then simultaneously drying the coating (x1'), the coating (x2'), and the coating (y') to remove a volatile component(s). Similarly, the laminate can also be formed by simultaneously applying the composition (x1), the composition (x2), and the composition (y) to the exposed surface of the backing 1, the exposed surface on the side of the pattern layer 2 of the backing with a pattern layer formed thereon, and to the exposed surfaces of the pattern layer 2 to directly laminate the coating (x1'), the coating (x2'), and the coating (y') in this order, and then simultaneously drying the coating (x1'), the coating (x2'), and the coating (y') to remove a volatile component(s).

The layer (Z) 4 is then formed on the surface of the formed layer (Y) 6, the surface on the opposite side from the layer (X) 5. For the method of forming the layer (Z) 4, a method similar to that described above can be used.

In addition, as another embodiment of the method of manufacturing the peel detection label 103, a backing with a pattern layer, which is the backing 1 in which the pattern layer 2 has been formed in advance, is prepared in a similar manner as described above.

Furthermore, when the layer (X1) 7 is also a layer formed from a resin composition, the pressure sensitive adhesive laminate 12 can also be formed by directly laminating the coating (x1') made from the composition (x1) containing a raw material resin for the layer (X1) 7, the coating (x2') made from the composition (x2) containing a raw material resin for the layer (X2) 8, the coating (y') made from the composition (y), and the coating (z') made from the composition (z) in this order on the exposed surface of the backing 1, the exposed surface on the side of the pattern layer 2 of the backing with a pattern layer formed thereon, and on the exposed surfaces of the pattern layer 2, and then simultaneously drying the coating (x1'), the coating (x2'), the coating (y'), and the coating (z') to remove a volatile component(s). Similarly, the pressure sensitive adhesive laminate 12 can also be formed by simultaneously applying the composition (x1), the composition (x2), the composition (y), and the composition (z) to the exposed surface of the backing 1, the exposed surface on the side of the pattern layer 2 of the backing with a pattern layer formed thereon, and to the exposed surfaces of the pattern layer 2 to directly laminate the coating (x1'), the coating (x2'), the coating (y'), and the coating (z') in this order, and then simultaneously drying the coating (x1'), the coating (x2'), the coating (y'), and the coating (z') to remove a volatile component(s).

In addition, as another embodiment of the method of manufacturing the peel detection label 103, a backing with a pattern layer, which is the backing 1 in which the pattern layer 2 has been formed in advance, is prepared in a similar manner as described above.

Then, the pressure sensitive adhesive laminate 12 can also be formed by directly laminating the coating (z') made from the composition (z), the coating (y') made form the composition (y), the coating (x2') made from the composition (x2) containing a raw material resin for the layer (X2) 8, and the coating (x1') made from the composition (x1) containing a raw material resin for the layer (X1) 7 in this order on the release material separately prepared in advance, and then simultaneously drying the coating (z'), the coating (y'), the coating (x2'), and the coating (x1') to remove a volatile component(s).

An exposed surface of the layer (X1) of the pressure sensitive adhesive laminate 12 is then bonded to the exposed surface of the backing 1, the exposed surface on the side of the pattern layer 2 of the backing with a pattern layer formed thereon, and to the exposed surfaces of the pattern layer 2 so as to cover the pattern layer 2, whereby the peel detection label 103 having the backing 1, the pattern layer 2, the layer (X1) 7, the layer (X2) 8, the layer (Y) 6, and the layer (Z) 4 in this order from the backing 1 side can also be manufactured.

A preferred example of the method of manufacturing the peel detection label 103 is preferably a method of manufacturing the peel detection label 103 by bonding the exposed surface of the layer (X1) 7 of the pressure sensitive adhesive laminate 12 described above manufactured in advance to the exposed surface of the backing 1, the exposed surface on the side of the pattern layer 2 of the backing with a pattern layer formed thereon separately manufactured and to the exposed surfaces of the pattern layer 2 so as to cover the pattern layer 2. Using the manufacturing method of the present embodiment, for example, eliminates the need for setting the drying temperature or the like in forming the layer (X1) 7, the layer (X2) 8, the layer (Y) 6, or the layer (Z) 4 in consideration of the heat resistance or the like of the material used in the backing 1 or the pattern layer 2. Thus, consequently, this method is preferred also from the viewpoint of increasing the options of materials that can be used in the backing 1 and each layer of the pattern layer 2, the layer (X1) 7, the layer (X2) 8, the layer (Y) 6, and the layer (Z) 4 as long as the effects of the present invention are achieved.

In addition, as another preferred example of the method of manufacturing the peel detection label 103, the following method is preferably used: the exposed surface of the layer (X2) 8 in the laminate obtained by laminating the layer (Z) 4, the layer (Y) 6, and the layer (X2) 8 in this order on a release material is bonded to the exposed surface of the layer (X1) 7 of the laminate in which the pattern layer 2 on the backing 1 is covered by the layer (X1) 7, whereby the peel detection label 103 having the backing 1, the pattern layer 2, the layer (X1) 7, the layer (X2) 8, the layer (Y) 6, and the layer (Z) 4 in this order from the backing 1 side is manufactured.

In this case, the laminate in which the pattern layer 2 on the backing 1 is covered by the layer (X1) 7 is preferred from the viewpoint that such a laminate can prevent the pattern layer 2 from detaching from the backing and a portion of the pattern layer 2 from missing up to the process of bonding the laminate obtained by laminating the layer (Z) 4, the layer (Y) 6, and the layer (X2) 8 in this order on a release material.

Furthermore, the present embodiment is more preferred when the layer (X1) 7 is the layer (XQ) described above, and an energy ray-curable resin is used as described above. In this case, in addition to the viewpoint of protecting the pattern layer 2 described above, the embodiment eliminates the need for considering the drying temperature of the layer (X1) 7 and thus, for example, eliminates the need for setting the drying temperature or the like in forming the layer (X1) 7, the layer (X2) 8, the layer (Y) 6, or the layer (Z) 4 in consideration of the heat resistance or the like of the material used in the backing 1 or the pattern layer 2. Thus, such an embodiment is preferred from the viewpoint that the pattern layer can be protected in the manufacturing process and also from the viewpoint of increasing the options of materials that can be used in the backing 1 and each layer of the pattern layer 2, the layer (X1) 7, the layer (X2) 8, the layer (Y) 6, and the layer (Z) 4.

In the method of manufacturing the peel detection label 103, in any of the methods described above, when the layer (X1) 7 is formed, the layer (X1) 7 is preferably formed so as to completely cover the pattern layer 2.

In addition, before forming the layer (X1) 7 on the surface where the pattern layer 2 of the backing with a pattern layer is formed so as to cover the pattern layer 2, the exposed surface on the surface where the pattern layer 2 of the backing with a pattern layer is formed is preferably surface-modified using the oxidation method, such as a corona discharge treatment method, described above. That is, in FIG. 3, the exposed surface (in a state before forming the layer (X1) 7) of the surface 1*a* on the pattern layer side of the backing and the exposed surface (in a state before forming the layer (X1) 7) of the surface 2*a* on the layer (X1) 7 side of the pattern layer are preferably surface-modified using the oxidation method described above. The surface modification by the oxidation method is more preferably performed immediately before forming the layer (X1) 7 (e.g., immediately before applying the coating (x1')).

Examples of the coater used for applying each composition in forming each coating described above one after another include spin coaters, spray coaters, bar coaters, knife coaters, roll coaters, knife roll coaters, blade coaters, gravure coaters, curtain coaters, and die coaters.

In addition, examples of the coater used in simultaneously applying respective compositions include multilayer coaters and specifically include multilayer curtain coaters and multilayer die coaters. Among these, a multilayer die coater is preferred from the viewpoint of operability.

From the viewpoint of facilitating the formation of each coating and improving productivity, respective compositions each independently further contain a diluent solvent.

For the diluent solvent, the diluent solvent described in the section of the peel detection label can be used.

In addition, the active component concentration of the solution obtained by blending the diluent solvent in each composition is as described above in the section of the peel detection label.

In the manufacturing process described above, in applying a plurality of coatings one after another and then simultaneously drying them, before the simultaneous drying treatment, a pre-drying treatment may be performed to an extent that a curing reaction of the coating does not proceed after one or more coatings are formed.

For example, the pre-drying treatment may be performed for each formation of each coating of the coating (x') and the coating (y'), or the pre-drying treatment may be performed simultaneously on the two layers after forming the two layers of the coatings of the coating (x') and the coating (y'). In performing the pre-drying, from the viewpoint of achieving better interfacial adhesion between the layer (X) 5 and the layer (Y) 6, the pre-drying treatment is more preferably performed simultaneously on the two layers after forming the two layers of the coatings of the coating (x') and the coating (y').

Drying temperature in performing the pre-drying treatment is typically appropriately set within a temperature range to an extent that curing of the formed coating does not proceed, but the drying temperature is preferably lower than the drying temperature in performing the simultaneous drying treatment. Specific drying temperature is, for example, preferably from 10 to 45° C., more preferably from 10 to 34° C., and even more preferably from 15 to 30° C.

In addition, drying temperature in simultaneously drying the plurality of coatings is, for example, preferably from 60 to 150° C., more preferably from 70 to 145° C., even more preferably from 80 to 140° C., and still more preferably from 90 to 135° C.

Use of Peel Detection Label

The peel detection label causes no adhesive residue to an adherend when used as described above and thus can be suitably used in applications in which the occurrence of adhesive residue to an adherend is undesirable in peeling the peel detection label when peeling is necessary, and peel detection is necessary.

Applications are assumed, for example, in tampering prevention of labeled contents of automobile components, electrical/electronic components, or precision machines; prevention of improper packing or opening of articles in consignation or packing of articles; seal labels for assuring virginity of contents of pharmaceutical products, cosmetic products, or food products; prevention of peeling or tampering of identification or certification labels of various certificates, such as passports, or product certificates; prevention of improper opening and closing of various switching hatches equipped in vehicles, such as various passenger cars, aircrafts, trains, and ships (e.g., prevention of improper admixture of foreign matter into a cargo entrance or a fuel tank); and security measures for prevention of improper invasion into vehicles, such as various passenger cars, aircrafts, trains, and ships, or prevention of improper invasion into various buildings.

The peel detection label can be used by attaching to an object (adherend) in these applications. As described above, when the peel detection label is peeled from the adherend, interfacial detachment occurs between the backing and the pattern layer, whereby presence or absence of peeling of the peel detection label from the adherend becomes visually detectable.

EXAMPLES

The present invention will be specifically described with reference to the following examples, but the present invention is not limited to the following examples. Physical property values in the following manufacturing examples and examples are values measured by the following methods.

Mass Average Molecular Weight (Mw)

Mass average molecular weight (Mw) was measured using a gel permeation chromatograph (product name "HLC-8020", available from Tosoh Corporation) under the following conditions, and values measured in terms of standard polystyrene were used.

Measurement Conditions

Column: "TSK guard column HXL-L", "TSK gel G2500HXL", "TSK gel G2000HXL", and "TSK gel G1000HXL" (all available from Tosoh Corporation) connected in sequence Column temperature: 40° C.

Developing solvent: tetrahydrofuran

Flow rate: 1.0 mL/min

Thicknesses of Backing, Pattern Layer, Pressure Sensitive Adhesive Laminate, and Peel Detection Label These were measured using a constant pressure thickness meter (Model number: "PG-02J", standard specifications: in accordance with JIS K6783-1994, Z1702-1994, and Z1709-1995).

For the thickness of the pattern layer, a value obtained as follows was determined as the "thickness of the pattern layer": on the way of preparing a peel detection label used as a measurement object, a total thickness was measured at a location where the backing and the pattern layer were laminated in a state of the backing with a pattern layer, in which the pattern layer was formed on the backing, and then a thickness of the backing measured in advance was subtracted from the total thickness.

For the thickness of the pressure sensitive adhesive laminate, a value obtained as follows was determined as the "thickness (total thickness) of the pressure sensitive adhesive laminate": a total thickness of a peel detection label used as a measurement object was measured, and then a thickness of the backing (at a location where the pattern layer was not laminated) measured in advance was subtracted from the total thickness.

A total thickness of the peel detection label was measured as a value obtained by removing the release material on the pressure sensitive adhesive layer (Z).

Thickness Ratio Between Respective Layers in Pressure Sensitive Adhesive Laminate A poly(ethyleneterephthalate) (PET) film (product name "DIAFOIL" (trade name) T-100", available from Mitsubishi Chemical Corporation, a thickness of 50 µm) was bonded to an attachment surface of the pressure sensitive adhesive layer (Z) of a peel detection label produced in Examples and Comparative Examples, and the resulting laminate was used as a measurement sample.

A cross section in the thickness direction obtained by cutting the laminate in the vertical direction to the surface of the pressure sensitive adhesive layer (Z) of the measurement sample was observed with a scanning electron microscope (product name "S-4700", available from Hitachi, Ltd.). A ratio of a thickness (thickness ratio) of each of the cover layer (X), the substrate layer (Y), and the pressure sensitive adhesive layer (Z) to a total thickness of the cover layer (X), the substrate layer (Y), and the pressure sensitive adhesive layer (Z) was measured.

In Examples, the thickness of each layer of the layers (X1) and (X2) in the cover layer (X) was also measured in the same manner.

In addition, the thickness of each layer was calculated from the measured value of the "thickness of the pressure sensitive adhesive laminate" measured by the method described above based on the thickness ratio of each layer. The thickness ratio between respective layers when the thickness (Yt) of the layer (Y) is taken as 100 is shown in Table 1.

Tensile Modulus Et at 23° C. of Backing

The tensile modulus Et at 23° C. of the backing was measured using the following method.

A test sample was obtained by cutting the backing into 150 mm in the MD direction×15 mm in the TD direction. The test sample was measured for the tensile modulus Et in an environment of 23° C. and 50% RH (relative humidity) in accordance with JIS K 7161-1: 2014 and JIS K 7127: 1999. Specifically, a tensile test was performed on the test sample using a tensile tester (product name "Autograph (trade name) AG-IS 500N", available from Shimadzu Corporation) at a speed of 200 mm/min after setting a distance between chucks set to 100 mm, and the tensile modulus (MPa) in the MD direction of the backing was measured.

MD in the MD direction is an abbreviation for the machine direction, and for example, the MD direction of the peel detection label means the longitudinal direction at the time of molding the peel detection label. In addition, TD in the TD direction is an abbreviation for the transverse direction, and for example, the TD direction of the peel detection label means the width direction at the time of molding the peel detection label.

Here, the "MD direction" in the backing refers to the longitudinal direction when the backing is molded.

Bending Resistance of Backing

The bending resistance of the backing was measured using the following method.

A test sample was obtained by cutting the backing into 38 mm in the MD direction×25 mm in the TD direction. The test sample was measured for the bending resistance in the MD direction in accordance with the Gurley method specified in JIS L1096: 2010. For the measurement, a bending resistance tester (product name "Gurley Bending Resistance Tester", available from Toyo Seiki Seisaku-sho, Ltd.) was used, and the bending resistance was measured.

Tear Strength of Backing

The backing was evaluated by a cut tear test using the following method.

A test sample was obtained by cutting the backing into 150 mm in the MD direction×50 mm in the TD direction. The test sample was measured for the tear strength in accordance with the Trouser method specified in JIS K7128-1: 1998. The measurement direction of the sample was the MD direction. The test speed was 200 mm/min.

Shear Storage Elastic Moduli G' at 23° C. of Layers (X1) and (X2) in Cover Layer (X) and Pressure Sensitive Adhesive Layer (Z)

The shear storage elastic moduli G' at 23° C. of the layers (X1) and (X2) in the cover layer (X) and pressure sensitive adhesive layer (Z) were measured using the following method.

A test sample having a diameter of 8 mm×a thickness of 3 mm formed from a composition the same as the composition for forming the layer to be measured was produced. The shear storage elastic modulus G' at 23° C. of the test sample was measured by the torsional shear method using a viscoelasticity measurement device (device name "MCR300", available from Anton Paar Co., Ltd.) under conditions of a test start temperature: −20° C., a test end temperature: 150° C., a temperature increase rate: 3° C./min, and a frequency: 1 Hz.

Thickness Average Shear Storage Elastic Modulus of Cover Layer (X)

The thickness average shear storage elastic modulus of the cover layer (X) was measured using the following method.

The thickness average shear storage elastic modulus was calculated by Formula (1) below using a value of a shear storage elastic modulus G' (Xk) at 23° C. of each layer in the cover layer (X) obtained by the method described above and a thickness ratio T (Xk) of each layer.

[Equation 2]

$$\sum_{k=1}^{n} (G'(Xk) \times T(Xk)) \qquad (1)$$

where G'(Xk) represents a shear storage elastic modulus G' at 23° C. of the k-th layer (Xk) from the backing side in the cover layer (X); T(Xk) represents a thickness ratio of the layer (Xk)=[a thickness of the layer (Xk)/a total thickness of the cover layer (X)]; and n represents an integer preferably of 2 to 10.

Specifically, the thickness average shear storage elastic modulus of the cover layer (X) was calculated by the calculations shown below for values shown in Table 1 below.

The thickness average shear storage elastic modulus of the cover layer (X)={G'(X1)×T (X1)}+{G'(X2)×T (X2)}={a shear storage elastic modulus G' at 23° C. of the layer (X1)×a thickness ratio of the layer (X1)}+{a shear storage elastic modulus G' at 23° C. of the layer (X2)×a thickness ratio of the layer (X2)}={6.44×10$^5$ (Pa)×1 (μm)/11 (μm)}+{6.57×10$^4$ (Pa)×10 (μm)/11 (μm)}=1.18×10$^5$ (Pa)

Tensile Storage Elastic Modulus E' at 23° C. of Substrate Layer (Y)

The tensile storage elastic modulus E' at 23° C. of the substrate layer (Y) was measured using the following method.

Measurement of a Sample with a Tensile Storage Elastic Modulus E' at 23° C. Resulting in a Value Greater than 100 MPa A test sample separately formed from a composition the same as the composition forming the layer to be measured and cut into a size of 30 mm in the MD direction×5 mm in the TD direction×200 μm in thickness was measured for a tensile storage elastic modulus E' at 23° C. in the MD direction of the test sample by the tensile method using a dynamic viscoelasticity automatic measuring device (product name "Rheovibron (trade name) DDV-01FD", available from Orientec Co., Ltd.) under conditions of a test start temperature: −50° C., a test end temperature: 200° C., a temperature increase rate: 3° C./min, an amplitude: 5 μm, and a frequency: 1 Hz.

Here, the "MD direction" in the substrate layer (Y) refers to the direction in which the composition was applied when the coating was formed.

When the tensile storage elastic modulus E' at 23° C. measured by the measurement method is 100 MPa or less, the tensile storage elastic modulus E' at 23° C. is measured using the following method.

Measurement of a Sample with a Tensile Storage Elastic Modulus E' at 23° C. Resulting in a Value of 100 MPa or Less A test sample having a diameter of 8 mm×a thickness of 3 mm formed from a composition the same as the composition for forming the layer to be measured is produced. The shear storage elastic modulus G' at 23° C. of the test sample is measured by the torsional shear method using a viscoelasticity measurement device (device name "MCR300", available from Anton Paar Co., Ltd.) under conditions of a test start temperature: −20° C., a test end temperature: 150° C., a temperature increase rate: 3° C./min, and a frequency: 1 Hz.

Then, the value of the tensile storage elastic modulus E' at 23° C. is calculated from the value of the shear storage elastic modulus G' at 23° C. using the approximation equation "E'=3G'".

Pressure Sensitive Adhesion Strengths of Pressure Sensitive Adhesive Layer (XA) and Pressure Sensitive Adhesive Layer (Z)

The pressure sensitive adhesion strengths of the pressure sensitive adhesive layer (XA) and the pressure sensitive adhesive layer (Z) were measured using the following method.

Procedure (1): A pressure sensitive adhesive layer having a thickness of 25 μm formed from a composition the same as the composition forming the pressure sensitive adhesive layer to be measured is provided on a poly(ethylene terephthalate) (PET) film having a thickness of 25 μm, and a test piece cut into a size of 300 mm in length (MD)×25 mm in width (TD) was produced.

Procedure (2): The surface of the test piece, the surface on the side of the pressure sensitive adhesive layer exposed thereon, was attached to a stainless steel plate (SUS304, polished with #360) in an environment of 23° C. and 50% RH (relative humidity), and this was allowed to stand in the same environment for 24 hours.

Procedure (3): After Procedure (2), the test piece was measured for pressure sensitive adhesion strength of the pressure sensitive adhesive layer in an environment of 23° C. and 50% RH (relative humidity) by the 180° peel method based on JIS Z0237: 2000 at a tensile speed (peeling speed) of 300 mm/min. The measurement result was determined as the pressure sensitive adhesion strength of the pressure sensitive adhesive layer to be measured.

Manufacturing Example 1

Preparation of Composition (x-a)

To 100 parts by mass (solid content ratio) of an acrylic copolymer (1) (acrylic copolymer having a constitutional unit derived from raw material monomers composed of n-butyl acrylate (BA)/methyl methacrylate (MMA)/vinyl acetate (VAc)/2-hydroxyethyl acrylate (2HEA)=80.0/10.0/9.0/1.0 (mass ratio), mass average molecular weight (Mw): 1000000, diluent solvent:ethyl acetate, solid content concentration: 45 mass %), which is a pressure sensitive adhesive resin, were blended and mixed 25 parts by mass (solid content ratio) of a hydrogenated rosin-based resin (product name "KE-359", available from Arakawa Chemical Industries, Ltd., softening point: from 94 to 104° C.) as a tackifier and 1.62 parts by mass (solid content ratio) of an isocyanate-based crosslinking agent (product name "Takenate (trade name) D-110N", available from Mitsui Chemicals, Inc.) as a crosslinking agent. The mixture was further diluted with toluene and uniformly stirred, and a composition (x-a) with a solid content concentration (active component concentration) of 40 mass % was prepared.

Manufacturing Example 2

Preparation of Composition (y)

(1) Synthesis of Linear Urethane Prepolymer (UY)

In a reaction vessel under a nitrogen atmosphere, isophorone diisocyanate was blended to 100 parts by mass (solid content ratio) of a polycarbonate diol with a mass average molecular weight (Mw) of 1000 so as to give an equivalent ratio of hydroxyl groups of the polycarbonate diol and isocyanate groups of the isophorone diisocyanate of 1/1, 160 parts by mass of toluene was further added. The mixture was reacted at 80° C. for 6 hours or longer with stirring under a nitrogen atmosphere until the isocyanate group concentration reached a theoretical amount.

Then, a solution in which 1.44 parts by mass (solid content ratio) of 2-hydroxyethyl methacrylate (2-HEMA) was diluted in 30 parts by mass of toluene was added, the mixture was further reacted at 80° C. for 6 hours until the isocyanate groups at both ends disappeared, and a linear urethane prepolymer (UY) with a mass average molecular weight (Mw) of 29000 was obtained.

(2) Synthesis of Acrylic Urethane-Based Resin (II)

Into a reaction vessel under a nitrogen atmosphere were added 100 parts by mass (solid content ratio) of the linear urethane prepolymer (UY) obtained in (1) described above, 117 parts by mass (solid content ratio) of methyl methacrylate (MMA), 5.1 parts by mass (solid content ratio) of 2-hydroxyethyl methacrylate (2-HEMA), 1.1 parts by mass (solid content ratio) of 1-thioglycerol, and 50 parts by mass of toluene, and the temperature of the mixture was increased to 105° C. with stirring.

Then, a solution in which 2.2 parts by mass (solid content ratio) of a radical initiator (product name "ABN-E", available from Japan Finechem Company, Inc.) was diluted with 210 parts by mass of toluene was added dropwise over 4 hours while the mixture was maintained at 105° C.

After completion of the dropwise addition of the solution, the mixture was reacted at 105° C. for 6 hours, and a solution of an acrylic urethane-based resin (II) with a mass average molecular weight (Mw) of 105000 was obtained.

(3) Preparation of Composition (y)

To 100 parts by mass (solid content ratio) of the solution of the acrylic urethane-based resin (II) obtained in (2) described above, which is a non-pressure sensitive adhesive resin (y1), were blended and mixed 6.3 parts by mass (solid content ratio) of a hexamethylene diisocyanate-based crosslinking agent (product name "Coronate (trade name) HL", available from Tosoh Corporation) as a crosslinking agent and 1.4 parts by mass (solid content ratio) of dioctyltin bis(2-ethylhexanoate) as a catalyst. Furthermore, the mixture was diluted with toluene and uniformly stirred, and a composition (y) with a solid content concentration (active component concentration) of 30 mass % was prepared.

Manufacturing Example 3

Preparation of Composition (z)

To 100 parts by mass (solid content ratio) of an acrylic copolymer (2) (acrylic copolymer having a constitutional unit derived from raw material monomers composed of n-butyl acrylate (BA)/2-ethylhexyl acrylate (2EHA)/acrylic acid (AAc)/2-hydroxyethyl acrylate (2HEA)=47.0/47.0/5.5/0.5 (mass ratio), mass average molecular weight (Mw): 550000, diluent solvent:ethyl acetate, solid content concentration: 40 mass %), which is a pressure sensitive adhesive resin, were blended and mixed 2 parts by mass (solid content ratio) of an isocyanate-based crosslinking agent (product name "Coronate (trade name) L", available from Tosoh Corporation) as a crosslinking agent. The mixture was further diluted with toluene and uniformly stirred, and a composition (z) with a solid content concentration (active component concentration) of 30 mass % was prepared.

Details of backings used in the following Examples and Comparative Examples are shown below. An abbreviation for each backing shown below corresponds to the abbreviation shown in Table 2 below.

Backings Used in Examples

EMAA (1): an ethylene-methacrylic acid copolymer (an acid content of 9 mass %) film (available from OG Film Co., Ltd., a product in which one surface is satin-finished by embossing, thickness: 80 μm)

EMAA (2): an ethylene-methacrylic acid copolymer (an acid content of 9 mass %) film (available from Riken Technos Corp., a product in which one surface is satin-finished by embossing, thickness: 80 μm)

PE (1): a polyethylene film (a product in which one surface is satin-finished by embossing, thickness: 100 μm)

PE (2): a polyethylene film (available from OG Film Co., Ltd., a product in which one surface is satin-finished by embossing, thickness: 80 μm)

PP (1): a polypropylene film (a product in which one surface is satin-finished by embossing, thickness: 70 μm)

PP (2): a polypropylene film (available from OG Film Co., Ltd., a product in which one surface is satin-finished by embossing, thickness: 80 μm)

EVA: an ethylene-vinyl acetate copolymer film (a product in which one surface is satin-finished by embossing, thickness: 90 μm)

Backings Used in Comparative Examples

PET: a poly(ethylene terephthalate) film (available from Toray Industries, Inc., a product in which one surface is satin-finished by embossing, thickness: 38 μm)

OPP: a biaxially oriented polypropylene film (a product in which one surface is satin-finished by embossing, thickness: 60 μm)

PVC: a polyvinyl chloride film (available from Achilles Corporation, a product in which one surface is satin-finished by embossing, thickness: 80 μm)

St-P: a styrene-based thermoplastic elastomer film (a product in which one surface is satin-finished by embossing, thickness: 80 μm)

As the release material used in the following Examples and Comparative Examples, a product name "SP-8LK Blue" available from Lintec Corporation (thickness: 88 μm, a product prepared by coating a glassine paper with a polyolefin and then subjecting the coated paper to silicone release treatment) was used.

Example 1

(1) Formation of Backing with Pattern Layer

Using the EMAA (1) as the backing, on a surface of a satin-finished side of the backing was gravure-printed a letter pattern "VOID" (the area of the pattern layer was 38% in 100% of the area on a surface of the backing where the pattern layer was formed) with a resin solution containing an acrylic resin (an acrylic polymer containing methyl methacrylate as the main monomer), dried to form a pattern layer having a thickness of 5 μm, and a backing with a pattern layer was obtained.

Then, corona discharge treatment was performed on the entire surface on the side where the pattern layer of the backing with a pattern layer was formed (the entire exposed surface of the backing and the entire exposed surfaces of the pattern layer).

(2) Formation of Layer (X1) in Cover Layer (X)

An ultraviolet-curable ink (product name "UV 161 Magenta S", available from T&K TOKA Corporation) as a composition (x-b) was gravure-printed on the corona discharge-treated entire surface on the side where the pattern layer of the backing with a pattern layer was formed to form a coating (x-b'), the ink was cured by irradiation with ultraviolet light with a high-pressure mercury lamp to provide a layer (X1) having a thickness of 1 μm, and a laminate (M1) including the backing, the pattern layer, and the layer (X1) in the layer (X) directly laminated in this order from the backing side was formed.

(3) Formation of Laminate Composed of Layer (X2) in Cover Layer (X), Substrate Layer (Y), and Pressure Sensitive Adhesive Layer (Z)

Separately from the above, the following three layers were simultaneously applied using a multilayer die coater (width: 250 mm): a coating (z') made from the composition (z) prepared in Manufacturing Example 3 onto a release paper (product name "SP-8LK Blue", available from Lintec Corporation, thickness: 88 μm, a product prepared by coating a glassine paper with a polyolefin and then subjecting to silicone release treatment), a coating (y') made from the composition (y) prepared in Manufacturing Example 2 onto the coating (z'), and a coating (x-a') made from the composition (x-a) prepared in Manufacturing Example 1 onto the coating (y').

The application rate and the application amount of the respective compositions for forming the coating (x-a'), the coating (y-a'), and the coating (z') were adjusted so as to give a thickness of the pressure sensitive adhesive laminate and thicknesses of respective layers (the layer (X2) in the cover layer (X), the substrate layer (Y), and the pressure sensitive adhesive layer (Z)) shown in Table 1 below.

The formed coating (x-a'), coating (y'), and coating (z') were simultaneously dried at a drying temperature of 125° C. for 60 seconds, and a laminate (M2) including the release paper, the pressure sensitive adhesive layer (Z), the layer (Y), and the layer (X2) in the layer (X) directly laminated in this order from the release paper side was formed.

(4) Manufacture of Peel Detection Label

The laminate (M2) and the laminate (M1) were then laminated so as to bond an exposed surface of the layer (X2) of the laminate (M2) and an exposed surface of the layer (X1) of the laminate (M1).

A laminate including the backing, the pattern layer, the layer (X1) in the layer (X), the layer (X2) in the layer (X), the layer (Y), the pressure sensitive adhesive layer (Z), and the release paper directly laminated in this order was thus formed, and a peel detection label was obtained. In the resulting peel detection label, the layer (X2) is the pressure sensitive adhesive layer (XA).

Examples 2 to 7 and Comparative Examples 1 to 4

Peel detection labels were each obtained using the same method as in Example 1 except for changing the backing from the EMAA (1) to each backing shown in Table 2 below.

The thickness of the pressure sensitive adhesive laminate included in the peel detection labels produced in Examples and the Comparative Examples and the thicknesses (thickness ratios between respective layers) of the layer (X1) in the layer (X), the layer (X2) in the layer (X), the layer (Y), and the layer (Z) composing the pressure sensitive adhesive laminate, and the shear storage elastic modulus G' or tensile storage elastic modulus E' at 23° C. of each layer, as well as the pressure sensitive adhesion strength of each layer were measured in accordance with the methods described above. The measurement results are shown in Table 1 below.

of 23° C. and 50% RH (relative humidity) and allowed to stand in the same environment for 24 hours.

After allowed to stand for 24 hours, the peel detection label was peeled by the 900 peel method at a tensile speed of 10 mm/min in accordance with JIS Z0237: 2000, and the pressure sensitive adhesion strength of the peel detection label was measured.

Evaluation of Pattern Expressibility and Adhesive Residue

The samples measured for the pressure sensitive adhesion strength of the peel detection label were each visually evaluated for pattern expressibility and presence or absence of adhesive residue on the adherend after peeling according to the following criteria. Pattern expressibility was evaluated according to the following criteria.

Evaluation Criteria for Pattern Expressibility
- A: a pattern was expressed in an area of 80% or greater in a total area of 100% of the surface on which the pattern layer was formed and clearly expressed.
- B: a pattern was expressed in an area of 80% or greater in a total area of 100% of the surface on which the pattern layer was formed.
- C: a pattern was expressed in an area of 50% or greater and less than 80% in a total area of 100% of the surface on which the pattern layer was formed.
- D: a pattern was expressed in an area of 30% or greater and less than 50% in a total area of 100% of the surface on which the pattern layer was formed.
- E: a pattern was expressed in an area of less than 30% in a total area of 100% of the surface on which the pattern layer was formed.
- F: Pattern was not expressed.

TABLE 1

| Pressure sensitive adhesive laminate | | | | | | | | | | | | |
|---|---|---|---|---|---|---|---|---|---|---|---|---|
| Layer configuration of pressure sensitive adhesive laminate | | | | Thickness ratio between respective layers | | Total thickness [μm] | Shear storage elastic modulus G' [× 10$^5$ Pa] | | | Thickness average shear storage elastic modulus (X) [× 10$^5$ Pa] | Tensile storage elastic modulus E' of layer (Y) [MPa] | Pressure sensitive adhesion strength [N/25 mm] | |
| Layer (X1) | Layer (X2) | Layer (Y) | Layer (Z) | (Xt):(Yt):(Zt) | (X1t):(X2t) | | Layer (X1) | Layer (X2) | Layer (Z) | | | Layer (XA) | Layer (Z) |
| Composition (x-b) | Composition (x-a) | Composition (y) | Composition (z) | 220:100:250[*1] | 10:100 | 29 | 6.44 | 0.657 | 0.548 | 1.18 | 250.8 | 20.8 | 15.2 |

[*1]The value of (Xt) related to the value of (Xt):(Yt):(Zt) is a total value of the value of the thickness (X1t) of the layer (X1) and the value of the thickness (X2t) of the layer (X2).

The peel detection labels produced in Examples and Comparative Examples were measured and evaluated for various physical properties and characteristics using the methods described below. The results obtained are shown in Table 2.

Pressure Sensitive Adhesion Strength of Peel Detection Label

The peel detection labels produced in Examples and Comparative Examples were each cut into a size of 200 mm in length (MD direction)×25 mm in width (TD direction), further, the release material on the pressure sensitive adhesive layer (Z) was removed, and the resulting laminate was used as a test sample.

The exposed surface of the pressure sensitive adhesive layer (Z) of the test sample was press-bonded to an acrylic-coated plate ("SPCC-SD acrylic-coated one face/white" available from Paltec Co., Ltd., size: 150 mm in length×70 mm in width×0.4 mm in thickness) serving as an adherend by reciprocating a 2-kg rubber roll once in an environment Evaluation Criteria for Adhesive Residue
- A: No adhesive residue (adhesive transfer) onto the adherend occurred.
- F: Adhesive residue onto the adherend (adhesive transfer) occurred.

Curved Surface Conformability

The peel detection labels produced in Examples and Comparative Examples were each cut into a size of 22 mm in length (MD direction)×25 mm in width (TD direction), further, the release paper serving as the release material on the pressure sensitive adhesive layer (Z) was removed, and the resulting laminate was used as a test sample.

Then, the exposed surface of the pressure sensitive adhesive layer (Z) after removing the release paper on the pressure sensitive adhesive layer (Z) was attached to a circular cylindrical adherend [diameter: φ10 mm, material: polypropylene (PP) and polyethylene (PE)] in an environment of 23° C. and 50% RH (relative humidity). Then, after the sample was allowed to stand in an environment of 23° C. and 50% RH (relative humidity) for 7 days, the amount of floating peeling from the adherend was measured. The measurement was performed four times, and the average was calculated. The curved surface conformability was evaluated according to the following criteria.
  A: The amount of lifting peeling was 2 mm or less.
  B: The amount of lifting peeling was greater than 2 mm and 6 mm or less.
  C: The amount of lifting peeling was greater than 6 mm.
[Table 2]

TABLE 2

|  |  | Physical properties of backing | | | | Evaluation results of peel detection label | | | | |
| --- | --- | --- | --- | --- | --- | --- | --- | --- | --- | --- |
|  |  |  |  |  |  | Tensile rate: 10 mm/min, Peel angle: 90° | | | Curved surface conformability | |
|  |  |  |  |  |  |  |  | Pressure sensitive | PP | PE |
|  | Type | Thickness [μm] | Tensile modulus Et [MPa] | Bending resistance [mN] | Tear strength [N/mm] | Pattern expressibility | Adhesive residue | adhesion strength [N/25 mm] | curved surface [mm] | curved surface [mm] |
| Example 1 | EMAA (1) | 80 | 154 | 120 | 80.0 | A | A | 1.07 | A | A |
| Example 2 | EMAA (2) | 80 | 140 | 110 | 61.3 | A | A | 0.74 | A | A |
| Example 3 | PE (1) | 100 | 551 | 174 | 12.5 | A | A | 0.89 | B | A |
| Example 4 | PE (2) | 80 | 330 | 76 | 5.1 | A | A | 1.51 | B | A |
| Example 5 | PP (1) | 70 | 992 | 102 | 17.8 | A | A | 1.76 | B | A |
| Example 6 | PP (2) | 80 | 457 | 99 | 85.4 | A | A | 1.23 | B | A |
| Example 7 | EVA | 90 | 302 | 230 | 3.1 | A | A | 1.20 | B | A |
| Comparative Example 1 | PET | 38 | 4538 | 133 | 4.3 | B | A | 1.35 | C | C |
| Comparative Example 2 | OPP | 60 | 3765 | 120 | 1.7 | D | A | 1.54 | C | C |
| Comparative Example 3 | PVC | 80 | 1107 | 271 | 8.1 | F | A | 1.78 | C | C |
| Comparative Example 4 | St-P | 80 | 42 | — | — | — | — | — | — | — |

As shown in Table 2, the peel detection labels obtained in Examples 1 to 7 were confirmed to have excellent pattern expressibility also when peeled at a low speed condition of 10 mm/min and not to cause adhesive residue to the adherend. Furthermore, the texture of the expressed letter pattern "VOID" was found to be mat-like. This is presumably because the surface of the backing, the surface being on the side of the pattern layer formed thereon, is a satin-finished surface. In this regard, the pattern was confirmed to be expressed by the occurrence of interfacial detachment between the backing and the pattern layer, that is, Requirement (1) described above was also confirmed to be satisfied. Furthermore, the peel detection labels obtained in Examples 1 to 7 were confirmed to have also excellent curved surface conformability. In addition, the peel detection labels of Examples 1 and 2 were found to exhibit even better curved surface conformability compared to other Examples.

On the other hand, the peel detection labels of Comparative Examples 1 to 3 had a tensile modulus Et of the backing of greater than 1000 MPa and thus were confirmed to have poorer pattern expressibility than the peel detection labels of Examples when peeled at a low speed condition. Moreover, the peel detection label of Comparative Example 4 had a tensile modulus Et of the backing of less than 50 MPa, thus the tension applied when the peel detection label was manufactured with a die coater revealed the letter pattern "VOID", and the peel detection label was unevaluable.

INDUSTRIAL APPLICABILITY

The peel detection label of the present invention causes no adhesive residue and exhibits excellent pattern expressibility also when peeled at a low speed and thus is useful as a peel detection label used in detection of presence or absence of opening of various containers and the like; detection of presence or absence of peeling, or detection of presence or absence of tampering of labels for identification or certification, such as various certificates, such as passports, and product certificates; or detection of improper invasion into various vehicles, buildings, and the like.

Furthermore, the peel detection label of the present invention also has excellent curved surface conformability and thus is also useful as a peel detection label used at a location where curved surface conformability is required in each application described above.

REFERENCE SIGNS LIST 101, 102, 103 Peel detection label
1 Backing
2 Pattern layer
3 Intermediate layer (C)
4 Pressure sensitive adhesive layer (Z)
5 Cover layer (X)
6 Substrate layer (Y)
7 First layer (X1) in cover layer (X)
8 Second layer (X2) in cover layer (X)

10, 11, 12 Pressure sensitive adhesive laminate
1a Surface of backing, the surface on pattern layer side
2a Surface of pattern layer, the surface on intermediate layer (C) side
10a, 11a, 12a Attachment surface of pressure sensitive adhesive laminate
40 Adherend
50 Void generated when peel detection label is peeled from adherend

The invention claimed is:

1. A peel detection label that is a laminate, comprising, in this order:
a backing;
a pattern layer formed on a part of a surface of the backing; and
a pressure sensitive adhesive laminate,
wherein the pressure sensitive adhesive laminate comprises at least an intermediate layer and a pressure sensitive adhesive layer, and
wherein a tensile modulus Et at 23° C. of the backing is 50 MPa or greater and 200 MPa or less, and
wherein a bending resistance of the backing is 50 mN or greater and 150 mN or less.

2. The peel detection label of claim 1, wherein when the pressure sensitive adhesive layer of the peel detection label is attached to an adherend and then the peel detection label is peeled from the adherend, an interfacial detachment occurs between the backing and the pattern layer, wherein presence or absence of peeling of the peel detection label from the adherend becomes visually detectable.

3. The peel detection label of claim 1, wherein the backing is at least one selected from the group consisting of a polyethylene-based resin film, a polypropylene-based resin film, an ethylene-vinyl acetate copolymer-based resin film, and an ethylene-(meth)acrylic acid copolymer-based resin film.

4. The peel detection label of claim 1, wherein a bending resistance of the backing is 75 mN or greater and 150 mN or less.

5. The peel detection label of claim 1, wherein a thickness of the backing is 1 μm or greater and 200 μm or less.

6. The peel detection label of claim 1, wherein a surface of the backing, the surface of the backing being on a side of the pattern layer formed thereon, is a satin-finished surface.

7. The peel detection label of claim 1, wherein the surface of the backing, the surface of the backing being on the side of the pattern layer formed thereon, and a surface of the pattern layer, the surface of the pattern layer being on a side of the intermediate layer formed thereon, are surface-modified using an oxidation method.

8. The peel detection label of claim 1, wherein the intermediate layer comprises at least a cover layer and a substrate layer, and
wherein the substrate layer comprises a surface in contact with the pressure sensitive adhesive layer.

9. The peel detection label of claim 8, wherein the cover layer is a laminate comprising at least a first layer and a second layer,
wherein the first layer is a layer in contact with the surface of the backing and the pattern layer, and
wherein the second layer is a layer in contact with the substrate layer.

10. The peel detection label of claim 8, wherein the cover layer comprises at least a pressure sensitive adhesive layer.

11. The peel detection label of claim 8, wherein a tensile storage elastic modulus E' at 23° C. of the substrate layer is 10 MPa or greater and 800 MPa or less.

12. The peel detection label of claim 8, wherein the substrate layer is a layer formed from a composition comprising one or more types of non-pressure sensitive adhesive resins selected from the group consisting of acrylic urethane-based resins and olefin-based resins.

13. The peel detection label of claim 1, wherein the tensile modulus Et at 23° C. of the backing is 80 MPa or greater and 200 MPa or less.

14. The peel detection label of claim 1, wherein the tensile modulus Et at 23° C. of the backing is 100 MPa or greater and 200 MPa or less.

15. The peel detection label of claim 1, wherein the backing comprises polyethylene.

16. The peel detection label of claim 1, wherein the backing comprises polypropylene.

17. The peel detection label of claim 1, wherein the backing comprises an ethylene-vinyl acetate copolymer.

18. The peel detection label of claim 1, wherein the backing comprises an ethylene-(meth)acrylic acid copolymer.

19. The peel detection label of claim 1, wherein the backing comprises ethylene-(meth)acrylic acid copolymer in at least 80 mass %, relative to total backing mass.

20. The peel detection label of claim 1, wherein the pressure sensitive adhesive laminate comprises a pressure sensitive adhesive comprising, in polymerized form,
n-butyl acrylate, methyl methacrylate, vinyl acetate, and 2-hydroxyethyl acrylate,
or
n-butyl acrylate, 2-ethylhexyl acrylate, acrylic acid, and -hydroxyethyl acrylate.

* * * * *